United States Patent
Reed et al.

(10) Patent No.: US 9,558,350 B2
(45) Date of Patent: Jan. 31, 2017

(54) USING POWER FINGERPRINTING (PFP) TO MONITOR THE INTEGRITY AND ENHANCE SECURITY OF COMPUTER BASED SYSTEMS

(71) Applicants: Jeffrey H. Reed, Blacksburg, VA (US); Carlos R. Aguayo Gonzalez, Blacksburg, VA (US)

(72) Inventors: Jeffrey H. Reed, Blacksburg, VA (US); Carlos R. Aguayo Gonzalez, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 14/950,676

(22) Filed: Nov. 24, 2015

(65) Prior Publication Data

US 2016/0117503 A1 Apr. 28, 2016

Related U.S. Application Data

(63) Continuation of application No. 13/883,105, filed as application No. PCT/US2011/059244 on Nov. 3, 2011, now Pat. No. 9,262,632.

(Continued)

(51) Int. Cl.
*G06F 11/00* (2006.01)
*G06F 21/52* (2013.01)
(Continued)

(52) U.S. Cl.
CPC .......... *G06F 21/52* (2013.01); *G06F 11/3062* (2013.01); *G06F 11/3093* (2013.01); *G06F 21/56* (2013.01);
(Continued)

(58) Field of Classification Search
CPC .................. G06F 21/50; G06F 21/55
(Continued)

(56) References Cited

U.S. PATENT DOCUMENTS

| 7,093,147 B2 | 8/2006 | Farkas et al. |
| 2003/0070105 A1 | 4/2003 | Launiainen |

(Continued)

FOREIGN PATENT DOCUMENTS

| CN | 201170900 Y | 12/2008 |
| WO | 94/11801 | 5/1994 |

(Continued)

OTHER PUBLICATIONS

Tehranipoor et al., "A Survey of Hardware Trojan Taxonomy and Detection", IEEE Design & Test of Mar. 1, 2010, p. 10-25.

(Continued)

*Primary Examiner* — Anthony Brown
(74) *Attorney, Agent, or Firm* — Whitham, Curtis & Cook, P.C.

(57) ABSTRACT

Procedures are described for enhancing target system execution integrity determined by power fingerprinting (PFP): by integrating PFP into the detection phase of comprehensive defense-in-depth security; by deploying a network of PFP enabled nodes executing untrusted devices with predefined inputs forcing a specific state sequence and specific software execution; by embedding module identification information into synchronization signaling; by combining signals from different board elements; by using malware signatures to enhance PFP performance; by automatic characterization and signature extraction; by providing secure signature updates; by protecting against side-channel attacks; performing real-time integrity assessment in embedded platform by monitoring their dynamic power consumption and comparing it against signatures from trusted code, including (Continued)

pre-characterizing power consumption of the platform by concentrating on trace sections carrying the most information about the internal execution status; by using PFP from sequence of bit transitions to detect deviations from authorized execution of software in a digital processor.

20 Claims, 38 Drawing Sheets

Related U.S. Application Data

(60) Provisional application No. 61/409,670, filed on Nov. 3, 2010, provisional application No. 61/475,713, filed on Apr. 15, 2011.

(51) Int. Cl.
  *G06F 11/30* (2006.01)
  *G06F 21/56* (2013.01)

(52) U.S. Cl.
  CPC ... *G06F 2221/033* (2013.01); *G06F 2221/034* (2013.01)

(58) Field of Classification Search
  USPC .................................................. 726/22–25
  See application file for complete search history.

(56) References Cited

U.S. PATENT DOCUMENTS

| | | | |
|---|---|---|---|
| 2006/0082488 A1 | 4/2006 | Keller, III | |
| 2007/0028129 A1 | 2/2007 | Schumacher et al. | |
| 2007/0220263 A1* | 9/2007 | Ziener ............... | G06F 17/5045 713/176 |
| 2008/0091975 A1 | 4/2008 | Kladko et al. | |
| 2008/0115001 A1 | 5/2008 | Schuette | |
| 2008/0276111 A1 | 11/2008 | Jacoby et al. | |
| 2009/0019546 A1 | 1/2009 | Park et al. | |
| 2009/0049549 A1 | 2/2009 | Park et al. | |
| 2009/0099830 A1 | 4/2009 | Gross et al. | |
| 2009/0216498 A1 | 8/2009 | Seguin et al. | |
| 2009/0306920 A1 | 12/2009 | Zwinger et al. | |
| 2010/0033386 A1 | 2/2010 | Lewis et al. | |
| 2010/0123453 A1 | 5/2010 | Pauly et al. | |
| 2010/0161525 A1 | 6/2010 | Gross et al. | |
| 2010/0237854 A1 | 9/2010 | Kumhyr et al. | |
| 2010/0313270 A1 | 12/2010 | Kim et al. | |
| 2011/0095934 A1 | 4/2011 | Freeman et al. | |
| 2012/0179812 A1 | 7/2012 | Keller, III | |
| 2012/0223403 A1 | 9/2012 | Keller, III et al. | |
| 2012/0226463 A1 | 9/2012 | Keller, III et al. | |
| 2013/0063179 A1 | 3/2013 | Myers et al. | |
| 2013/0127442 A1 | 5/2013 | Satoh et al. | |
| 2014/0218229 A1 | 8/2014 | Pauly et al. | |
| 2015/0009073 A1 | 1/2015 | Keller, III | |

FOREIGN PATENT DOCUMENTS

| | | |
|---|---|---|
| WO | 96/18934 | 6/1996 |
| WO | 2010044069 A1 | 4/2010 |
| WO | 2013131073 A1 | 9/2013 |

OTHER PUBLICATIONS

Agrawal et al., "Trojan Detection Using IC Fingerprinting" IEEE Synposium on Security and Privacy, 2007, Whole Document.

Plusquellic et al., "Digital Integrated Circuit Testing Using Transient Signal Analysis", IEEE Test Conference Proceedings, 1996, Whole Document.

Germida et al., "Defect Detection Using Power Supply Transient Signal Analysis", IEEE Test Conference Proceedings, 1999, Whole Document.

Gonzalez et al., "Power Fingerprinting in SDR & CR Integrity Assessment", IEEE, 2009, Whole Document.

Gonzalez et al., "Dynamic power consumption monitoring in SDR and CR regulatory compliance", SDR Forum Conference, DC, 2009.

Baturone et al., "Supply current monitoring for testing CMOS analog circuits", Proc. XI Conference on Design of Circuits and Integrated Systems (DCIS), Sitges. 1996.

Stone et al., "Radio-frequency-based anomaly detection for programmable logic controllers in the critical infrastructure", International Journal of Critical Infrastructure Protection 5 (2012): 66-73.

\* cited by examiner

USING POWER FINGERPRINTING (PFP) TO MONITOR THE INTEGRITY AND ENHANCE SECURITY OF COMPUTER BASED SYSTEMS

BACKGROUND OF THE INVENTION

Field of the Invention

The present invention generally relates to power fingerprinting and more particularly to use of power fingerprinting as a technique for improving the security and monitoring the integrity of computer processing and software used on computer-based systems.

Background Description

In CMOS digital circuits, with every bit transition there is a transient current drain resulting from a brief short circuit in the gates and the charge and discharge of parasitic capacitance at the outputs of the circuit. In a processor, the intensity of these transient currents, hence, the total power consumed in a specific clock cycle, is determined by the total number of bit transitions that take place in that cycle. The number of bit transitions is determined by the specific instruction sequence executed, as well as their addresses and parameters. Power fingerprinting is an integrity assessment and intrusion detection solution for critical cyber systems based on taking fine-grained measurement of a processor's power consumption and comparing them against trusted signatures (patterns that result from the specific sequence of bit transitions during execution) for anomaly detection. The basic approach behind power fingerprinting is to characterize the execution of trusted software and extract its power signatures and use them as reference to compare test traces to determine whether the same code is executing.

A power fingerprinting (PFP) monitor consists of three main elements common to all pattern recognition systems, as shown in FIG. 1: sensing 110, feature extraction 120, and detection/classification 130. Sensing involves measuring the instantaneous current drain of digital hardware, which can be accomplished using a commercial current probe and a high-performance oscilloscope. Feature extraction is a critical aspect for PFP and involves the identification of statistical and temporal properties of the power consumption that uniquely identify the execution of a given software routine. This is a challenging task that requires deep understanding of the processor's architecture and the structure of the software, but which can be facilitated by building the software itself with certain characteristics that enhance signatures and improve determinism. Ideally, a signature is extracted from every execution path in the code. In cases where this is not feasible, only a few critical sections are characterized and monitored, such as OS kernel modules and core applications.

In the general power fingerprinting approach, a sensor 110 is placed on the processor's board as close to the power pins as possible. The sensor captures the instantaneous current drain of the processor. The sensor can be a commercial current probe, a shunt resistor, or a current mirror. The signal from the sensor has to be digitized at a rate higher than the processor's main clock rate. If the processor has an internal phase-locked loop to increase the operating frequency, then this becomes the effective clock frequency. Satisfactory results have been obtained using 3.5× the effective clock frequency, but this does not represent a lower bound. Several mechanisms can be used to reduce the sampling requirements.

After the instantaneous current drain has been digitized into a power trace, different signal processing techniques are applied to extract discriminatory features from the traces. After the features have been extracted, they are passed through a supervised classifier, or detector, 130 that has been previously trained using traces 140 from trusted software. This detector ultimately makes the decision of whether the software execution corresponds to the authorized software or not. A pictographic description of the general power fingerprinting approach in the prior art is presented in FIG. 1.

The decision of whether features from a specific power trace correspond to authorized execution is performed by a carefully designed detector, which compares incoming power traces against all stored signatures 140 from authorized code. When the observed traces cannot be matched with any of the stored signatures, within a reasonable tolerance, it is determined that an intrusion has occurred. Although the difference for each feature may be small, the confidence in judging an intrusion can be very high and arbitrarily set because of the large number of features.

However, current techniques and procedures must be enhanced and improved to keep pace with technology and practices being developed and used by those seeking to overcome or defeat safeguards that rely on power fingerprinting for execution integrity of computer systems.

SUMMARY OF THE INVENTION

It is therefore an object of the present invention to provide procedures for enhancing target system execution integrity assessment determined by power fingerprinting (PFP): by integrating PFP into the detection phase of comprehensive defense-in-depth security; by deploying a network of PFP enabled nodes; by executing untrusted devices with pre-defined inputs forcing a specific state sequence and specific software execution; by embedding module identification information into synchronization signaling; by combining signals from different board elements; by using malware signatures to enhance PFP performance; by automatic characterization and signature extraction; by providing secure signature updates; by protecting against side-channel attacks; performing real-time integrity assessment in embedded platform by monitoring their dynamic power consumption and comparing it against signatures from trusted code; by pre-characterizing power consumption of the platform and concentrating on trace sections carrying the most information about the internal execution status; by improving the ability of PFP to detect deviations from authorized execution in commercial embedded platforms.

An aspect of the invention is a method for performing real-time integrity assessment of execution of a routine in a computer processing platform. This is accomplished by monitoring execution of the routine by tracing power consumption of a processor, by sampling the processor during execution of the routine. A platform characterization technique is employed that detects sections of the traces, that is, those sections that display the largest dependence on state transitions in the processor. These sections are used to select features carrying the most information. This platform characterization applies to the platform and can be used for all routines run on the platform. The next step is to obtain, from a characterization of selected features of the routine, as contained in the sections identified in the platform characterization, a set of trusted power fingerprints of the routine. Then there is established a threshold for a specific false alarm rate based on the probability distribution of distance from a signature comprised of the trusted fingerprints. A library of the trusted fingerprints is then compared to features extracted from traces from the execution of untrusted code, and there is then determined a distance between the fingerprints in the library and the features extracted from execution of the untrusted code. An exception is reported if the distance exceeds the threshold.

Various procedures for improving the operation, effectiveness, usability, and performance of integrity assessment and intrusion detection systems based on power fingerprinting (PFP) are described. The different procedures include:
- Embedding module identification information into synchronization signaling
- Improved PFP monitoring by combining signals from different board elements
- Using malware signatures to enhance PFP performance, generalizing on existing battery monitoring technology.
- Automatic characterization and signature extraction
- Secure signature updates
- Response to integrity violations and layered security
- Protection against side-channel attacks Also described are methods and apparatus for:
- Distributed PFP monitor network to monitor malware dynamics and behavior
- Application of PFP to Supply-Chain Trust Analysis
- Digital rights management and execution limited leases
- Failure prediction based on PFP

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF A PREFERRED EMBODIMENT OF THE INVENTION

Power fingerprinting (PFP) is a technique that enables an external monitor to assess the execution integrity of a cyber system. PFP relies on the execution status information carried by the dynamic power consumption of a processor.

Using this information, along with pre-characterized signatures from trusted references, PFP is able to determine execution integrity in target systems. For practical application of PFP, it is necessary to implement specific apparatus and follow specific procedures to provide an effective monitoring solution. In this work, we describe various procedures for improving the operation, effectiveness, usability, and performance of a PFP monitoring solution.

Applying PFP to Detect Software Modifications in Smart Phones and Other Embedded Devices.

Cyber security has become a critical element for national security. Microprocessors are ubiquitous in almost every aspect of modern life. Technology developments in the information technology areas are moving forward at a faster pace than the security solutions necessary to protect them. The threat of cyber attacks remains constant with potential devastating consequences to critical infrastructure and national security. Cyber infrastructure has become so important that cyber space is now considered a new warfare domain and an element critical for national security that needs to be protected from all kinds of threats, including state-sponsored adversaries.

We describe a technique to perform real-time integrity assessment in smart phones and other embedded platforms by monitoring their dynamic power consumption and comparing it against signatures from trusted code. The method and technology described build from the general concept of power fingerprinting and provide enhancements for general application on complex commercial devices. We present examples of preferred embodiments of the general techniques to be used as references and examples. The techniques, however, are general and can be adapted to any cyber platform.

As part of the approach, we also describe a methodology to pre-characterize the way a specific platform and processor consume power to improve the performance of the approach by concentrating classification efforts on the sections of the traces that carry the most information about the internal execution status of the processor and ignore redundant or extremely noisy features that can hamper performance.

Figure 1:
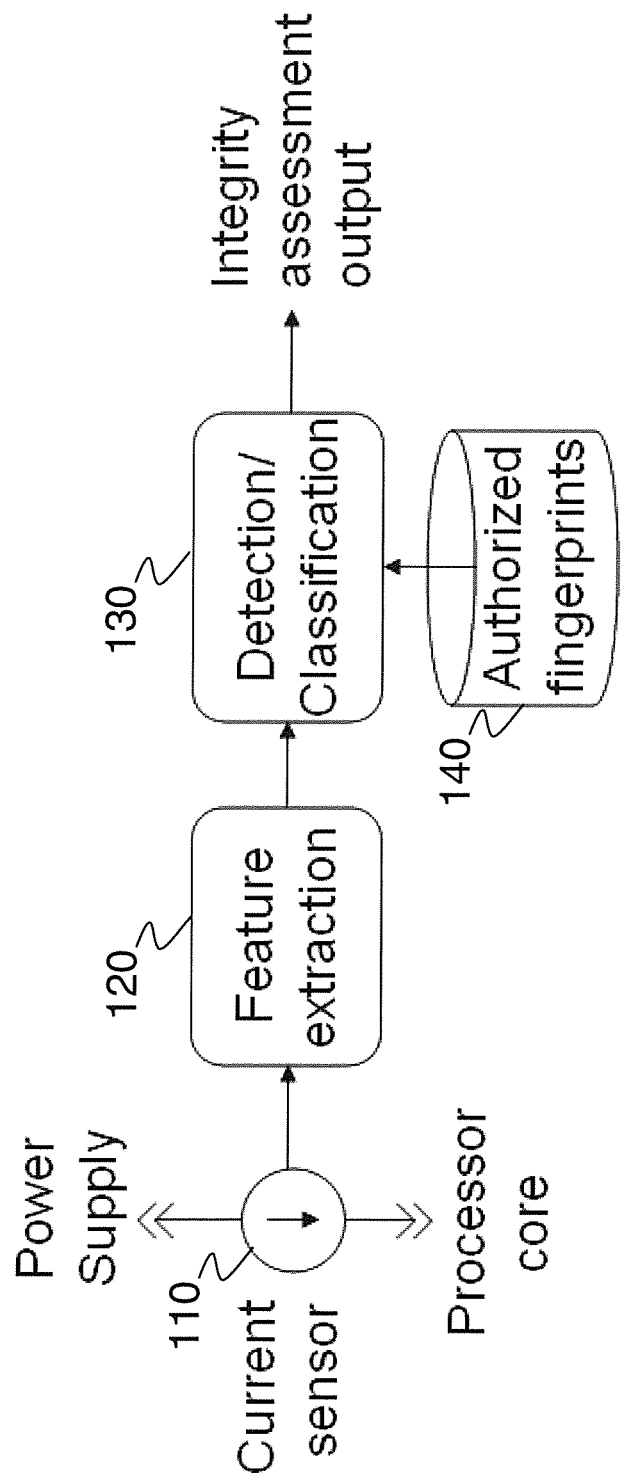
FIG. 1 is a general block diagram of power fingerprinting.

The goal is to enhance the general power fingerprinting (PFP) approach to define a reliable technique to detect unauthorized software modifications in smart phones, embedded systems, and general information systems. The general prior art approach is depicted in FIG. 1.

The general PFP method begins by collecting fine-grained measurements from the power consumption during the execution of trusted code. The sensor 110 needs to collect a direct or indirect metric representation of the dynamic power consumption or instantaneous current drain of the processor. The sensor 110 can be implemented by means of a commercial current probe, a Hall effect sensor, piezoelectric/magnetostrictive, composite magnetic field sensor, Rogowski coil, a high-bandwidth current mirror, or a simple low-resistance precision shunt resistor. Notice that the sensors need to meet the requirements set by the specific feature extraction techniques selected.

Figure 2:
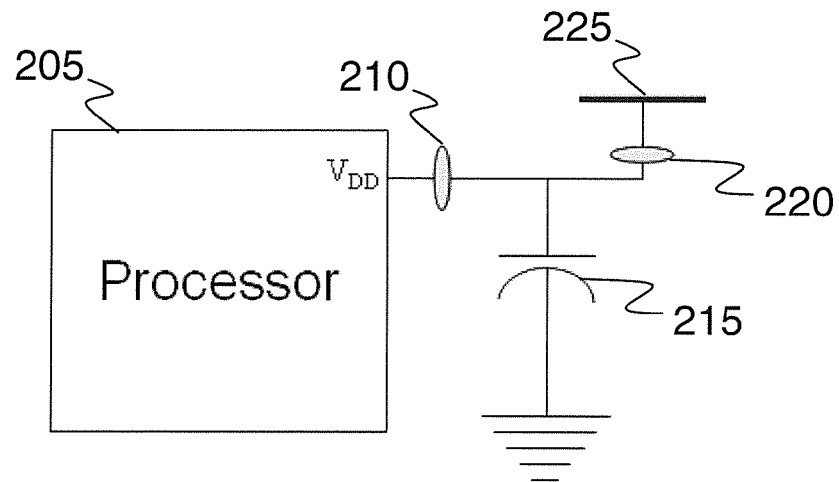
FIG. 2 is a diagram showing ideal sensor locations for a PFP monitor.

The physical location of the sensor is a critical element for the success of this approach. The ideal location 210 is shown in FIG. 2 at the $V_{DD}$ signal of the processor 205. If this location is not feasible, or introduces excessive power supply noise, then the second best location 220 is also shown. If the sensor 220 is placed in the second location the copper traces with their parasitic capacitance and inductance along with the decoupling capacitors 215 create a low-pass (LP) RLC filter that affects the current traces. For PFP it is beneficial to pre-characterize this hardware effect by identifying the transfer function, H, of the LP filter using a commercial Network Analyzer or another system identification technique. The effect of the inherent LP filter can be minimized by passing the traces through another filter with the inverse transfer function, $H_{inv}$. It is recommended to implement the inverse filter digitally. Since the direct inversion of H can lead to a unstable filter, it is necessary to select an the closest stable approximation of $H_{inv}$.

In FIG. 2, $V_{DD\_core}$ 225 can be provided by different sources. For simple processors, it comes directly from the voltage regulators. For more sophisticated platforms, it can come from a power and peripheral management system, which is a complex circuit that provides a wide array of services including delivering different voltage levels required, reset and interrupt handling, and other peripheral management. Power managers are complex systems that merge different signals and add interference from the PFP perspective and tend to hide the power signatures. For system with a power management circuit, it is recommended to design the system board with the necessary provisions to place the current sensor after the power management system to avoid the extra interference and facilitate signature extraction. In a best case scenario, the power sensor would be included in the power management system as another service provided, facilitating the integration of PFP.

Figure 3:
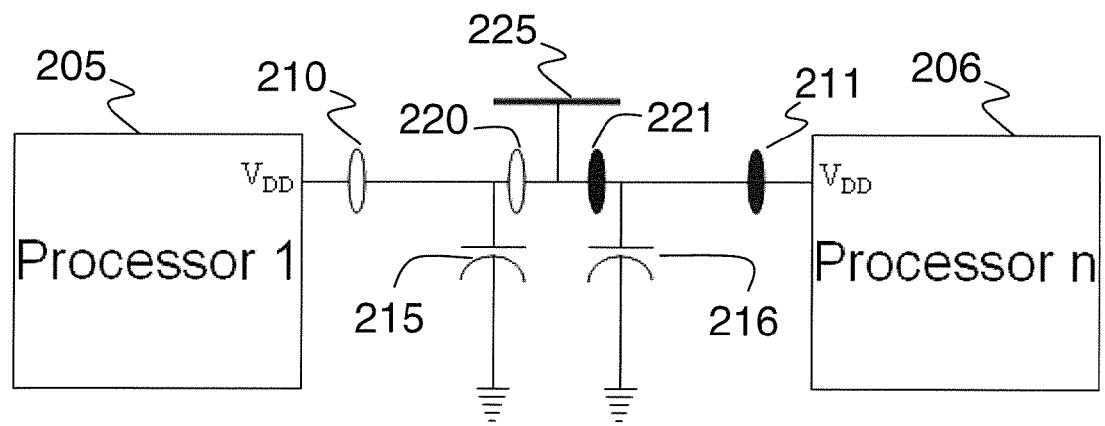
FIG. 3 is a diagram showing ideal sensor locations for multi-processor boards.

In the case of multiple processors in the board, the same principle can be repeated for each processor, as shown in FIG. 3, where the nth processor 206 is preferably monitored at 211 or at second best location 221 after decoupling capacitor 216. In this case, the detector must be designed to combine and consider traces from both sensors. For multi-core processors in the same package, the same principles apply as in the multi-processor example, but the location and feasibility will depend on the architecture of the processor, the number of cores powered by each rail, and decoupling requirements.

Figure 4:
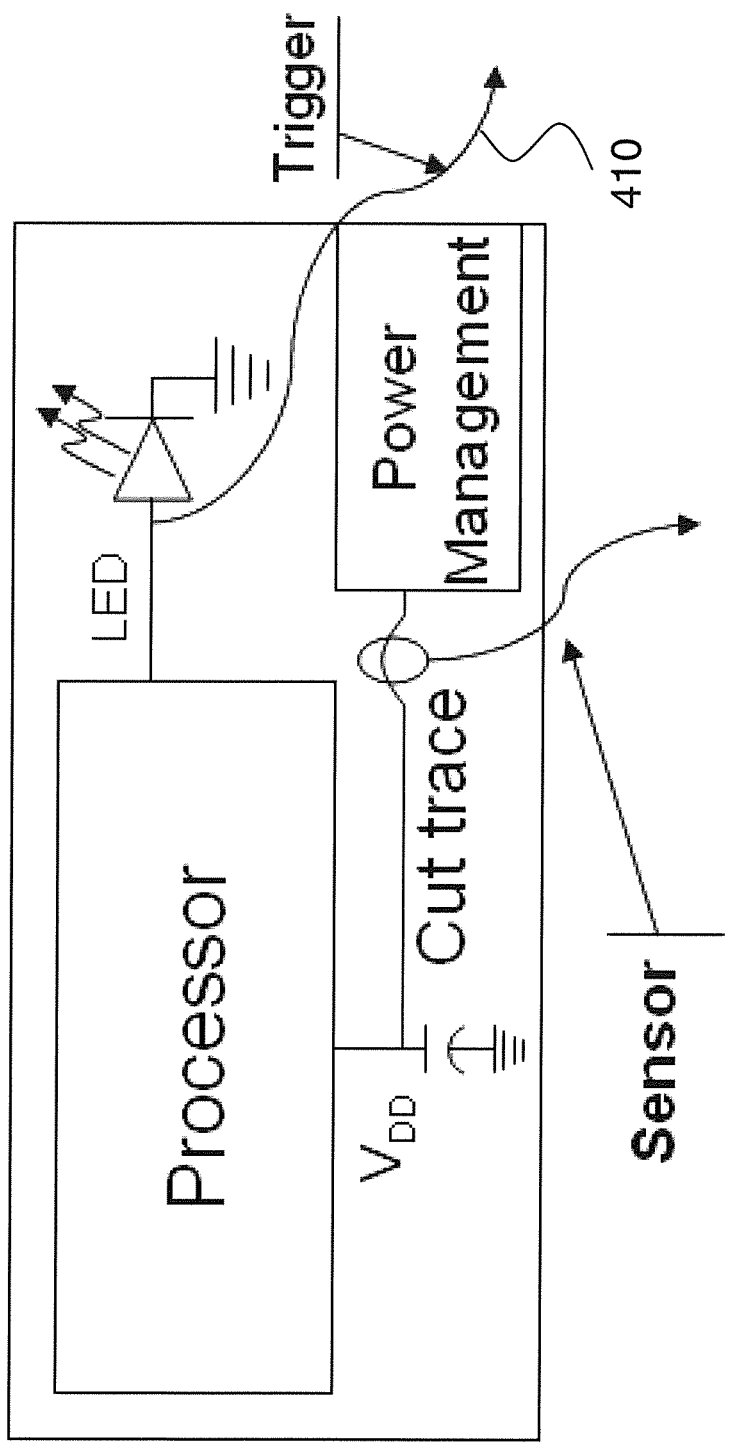
FIG. 4 is a diagram showing an example of triggering with a physical signal.
Figure 5:
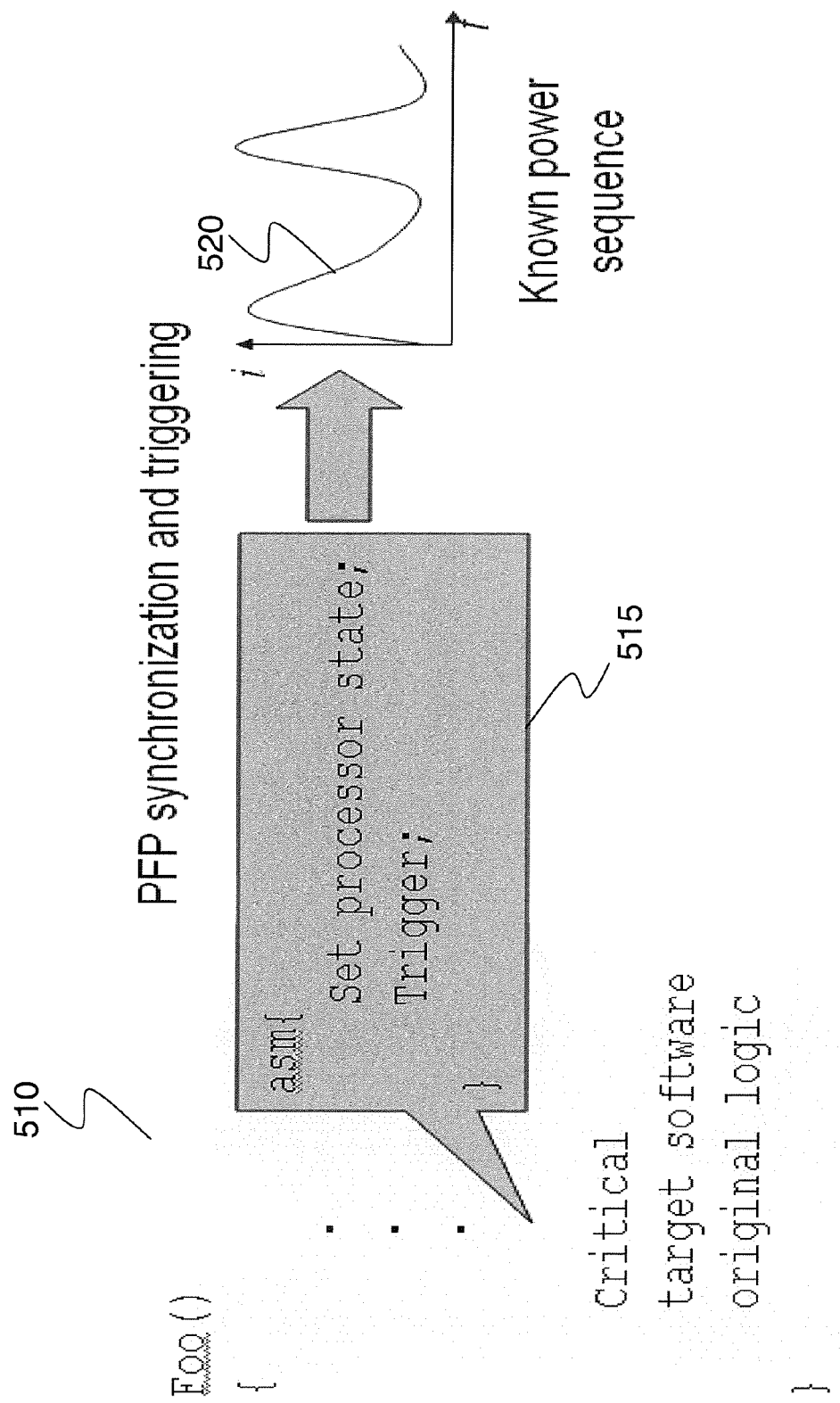
FIG. 5 is a schematic diagram showing PFP strategic instruction insertion for synchronization and triggering.

With the sensor in place, the next step is to characterize trusted code. This process is accomplished by repeatedly executing the target trusted code in a controlled environment (including isolation of the target software, set inputs used during execution, and insertion of specific markers that help synchronizing traces). Markers can be of different nature and help with triggering and synchronization. Potential markers include physical signals (as changing the voltage level of a pin) or a specific sequence of instructions that yields a known power consumption sequence. An example of a physical trigger signal 410 is shown in FIG. 4. The concept of instruction insertion for triggering is depicted in FIG. 5. In this case the extra assembly instructions 515 are chosen to yield a known pattern 510 in the traces, usually strong variation in the current drain for a short period of time to help indicate when a specific code 510 is executed.

Figure 6:
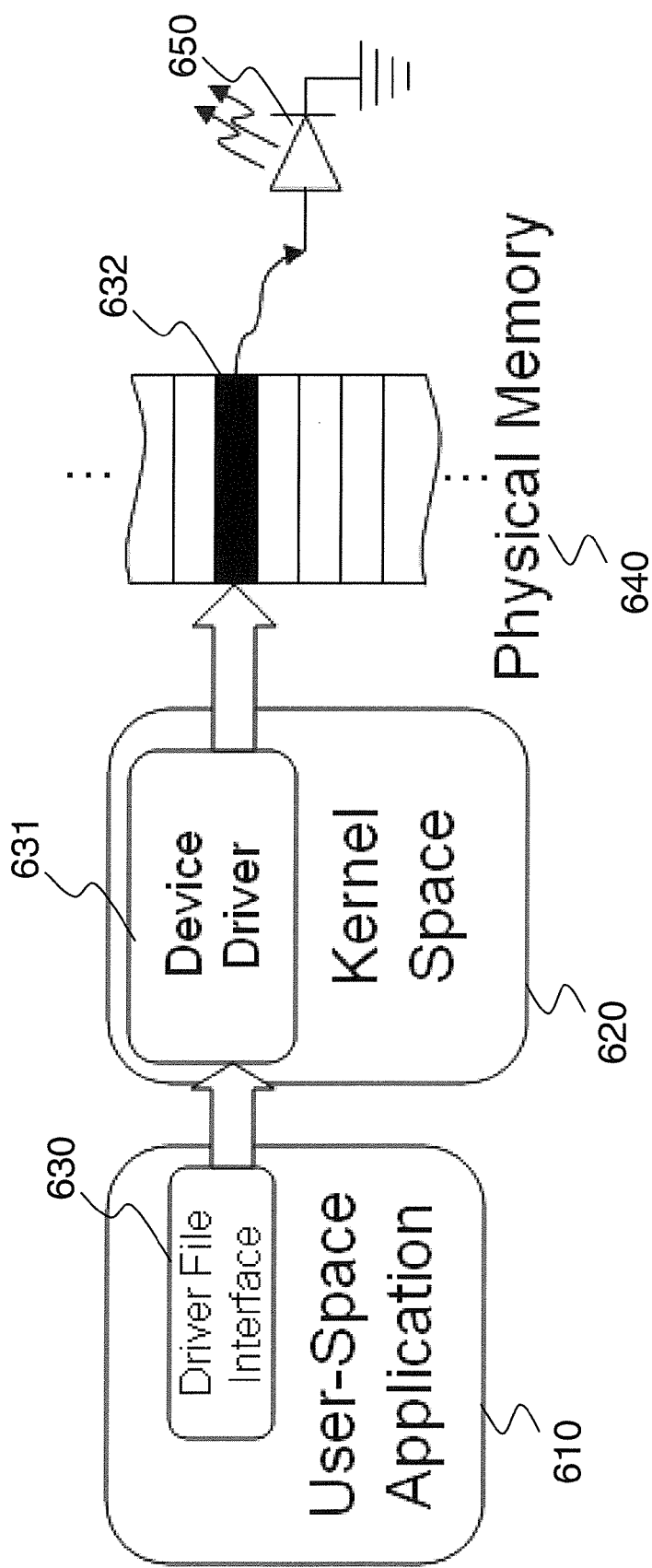
FIG. 6 is a schematic diagram showing indirect access to physical resources in the Linux device driver paradigm.

When the target application 610 is running on the User Space in a platform that implements the Linux device driver paradigm, or in any other operating system with indirect access to physical signals, as described in FIG. 6, it is necessary to account for the inherent uncertainties in execution and timing caused by the indirect access. In this case, the trigger instructions 515 will be executed in the User Space 610 which has no direct access to Physical Memory 640, and can only access the registers 632 necessary to create the physical signal 650 by means of a device driver 631 located in the Kernel Space 620. Uncertainties in execution and timing exist because file access requires the process to wait (block execution) for the appropriate synchronization signaling during which the kernel 620 schedules other process to run.

Even though the markers 630 are not required to remain in the final code, the process of run-time assessment is facilitated if they remain in place. In the case when the markers are left on the deployed version, it is necessary to ensure that the facilities or services used for the markers will still remain in the deployed platform (e.g. if the marker is supposed to turn on a LED 640, that LED 640 must exist on the deployed platform).

It is important to note that during characterization the exact code that will be deployed needs to be used. This includes using the exact same tools to build the software, with the same level of optimization, etc.

For better performance, the characterization should be an iterative, interdependent process, during which the source code structure along with the respective markers are co-developed to yield the strongest signatures with the smallest variance across different execution instances.

Figure 7:
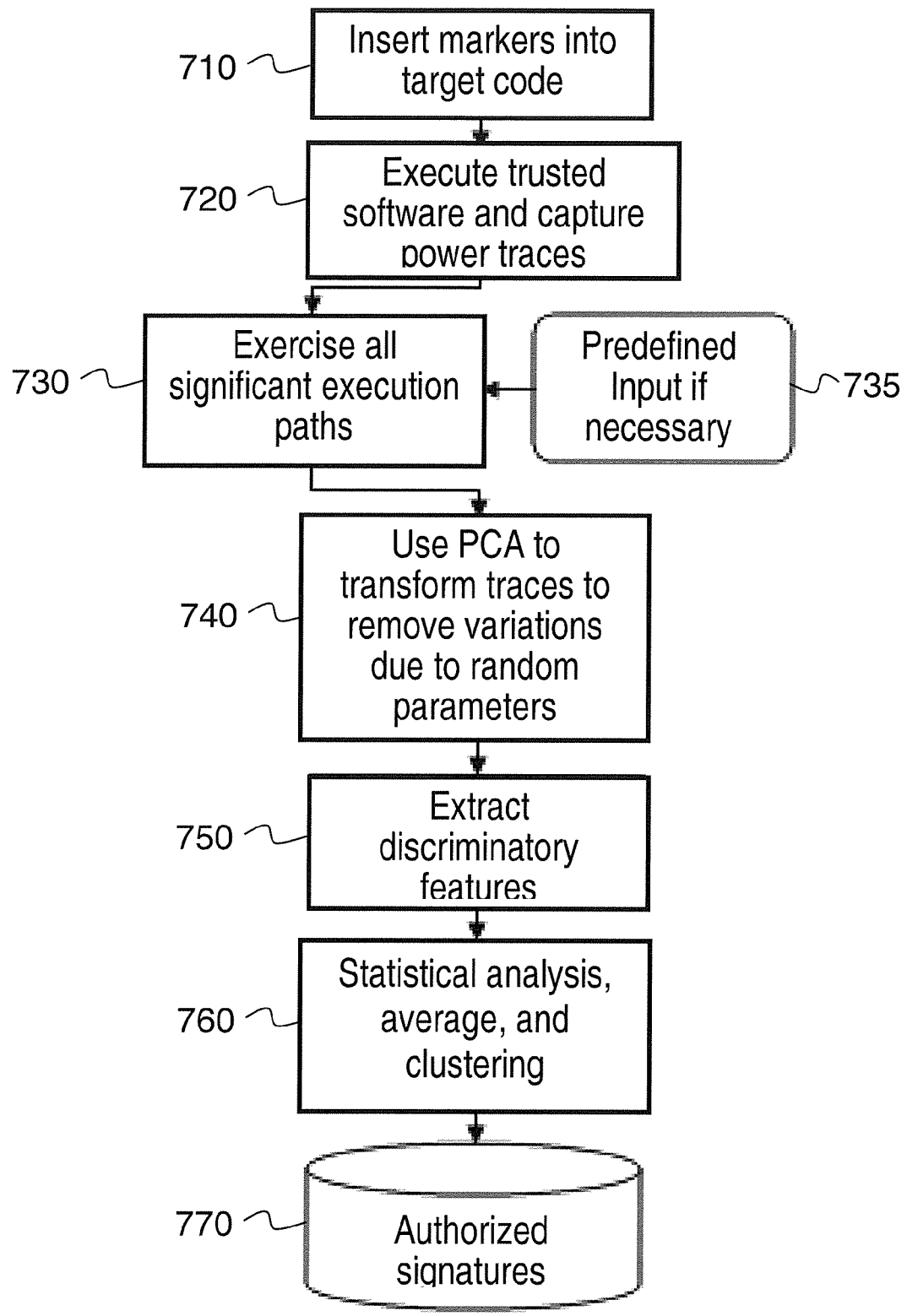
FIG. 7 is a flow chart showing the trusted code characterization process.

Several traces from the execution of the trusted code may need to be collected in order to average them and reduce the impact of random noise inherent to any physical system. The characterization process is depicted in FIG. 7. After inserting 710 markers into the code, the trusted software is executed and the resulting power traces are captured 720. This is done for all the significant execution paths 730, using predefined input 735 if necessary. The variations due to random parameters are removed using PCA (principal component analysis) 740. Discriminatory features are extracted 750 and statistical analysis, averaging and clustering 760 is done to generate a set of authorized signatures 770.

The signatures can be extracted from different signal domains and be multidimensional. Furthermore, multiple signatures can be used to identify a single piece of code.

Trace Processing and Feature Extraction

Figure 8:
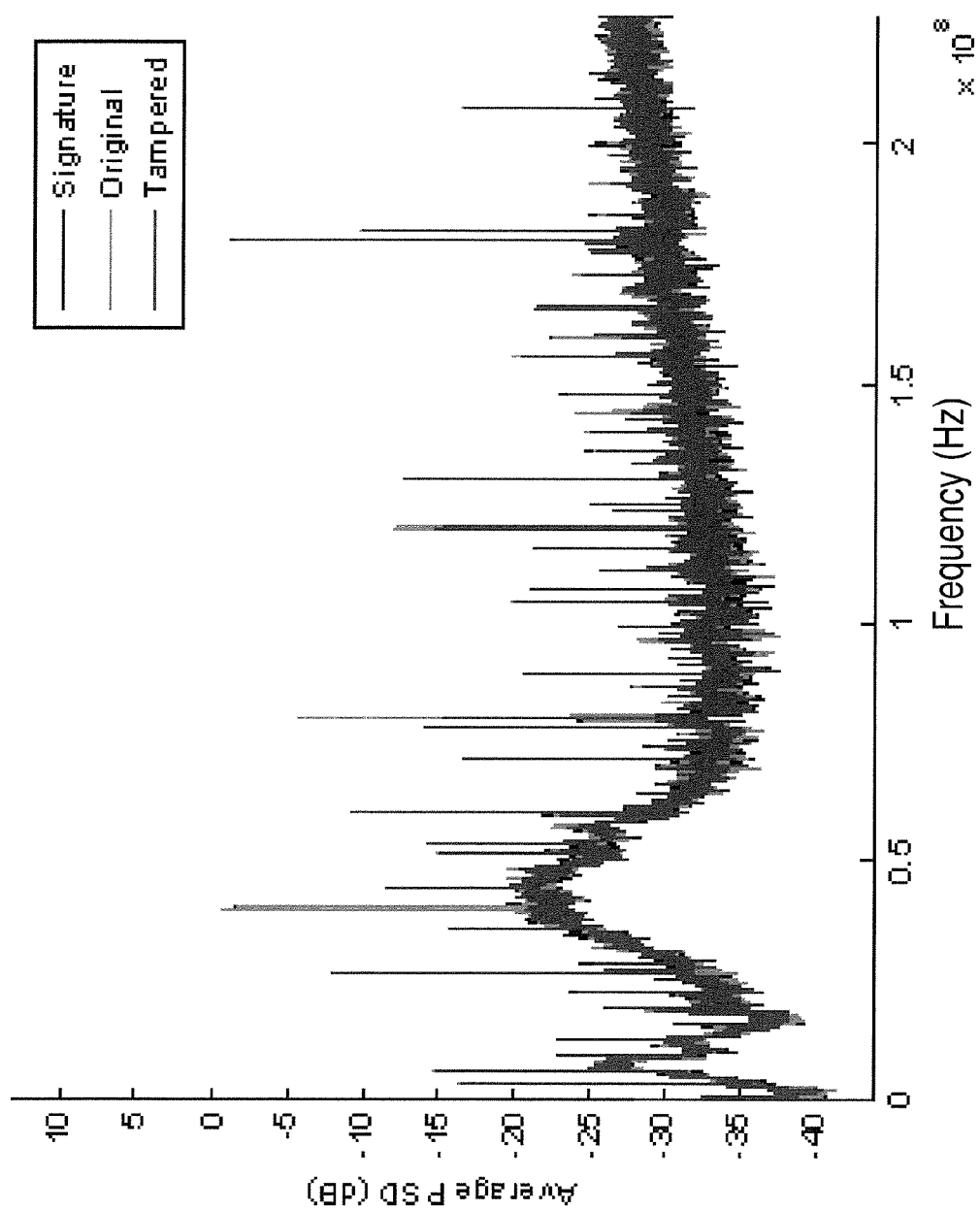
FIG. 8 is a graph showing an example of preprocessing of traces by calculating their power spectral density.

The process of preparing test traces to be compared against the stored signature is known as preprocessing and feature extraction. Trace preprocessing involves general tasks to condition the traces to extract the selected discriminatory features, e.g. converting the traces to the appropriate domain or aligning the traces in reference to a specific marker. An example of trace preprocessing is shown in FIG. 8, in which time-domain traces from the execution of test software in a BeagleBoard with an OMAP3 processor are first converted to the frequency domain by calculating their power spectral density.

Figure 9:
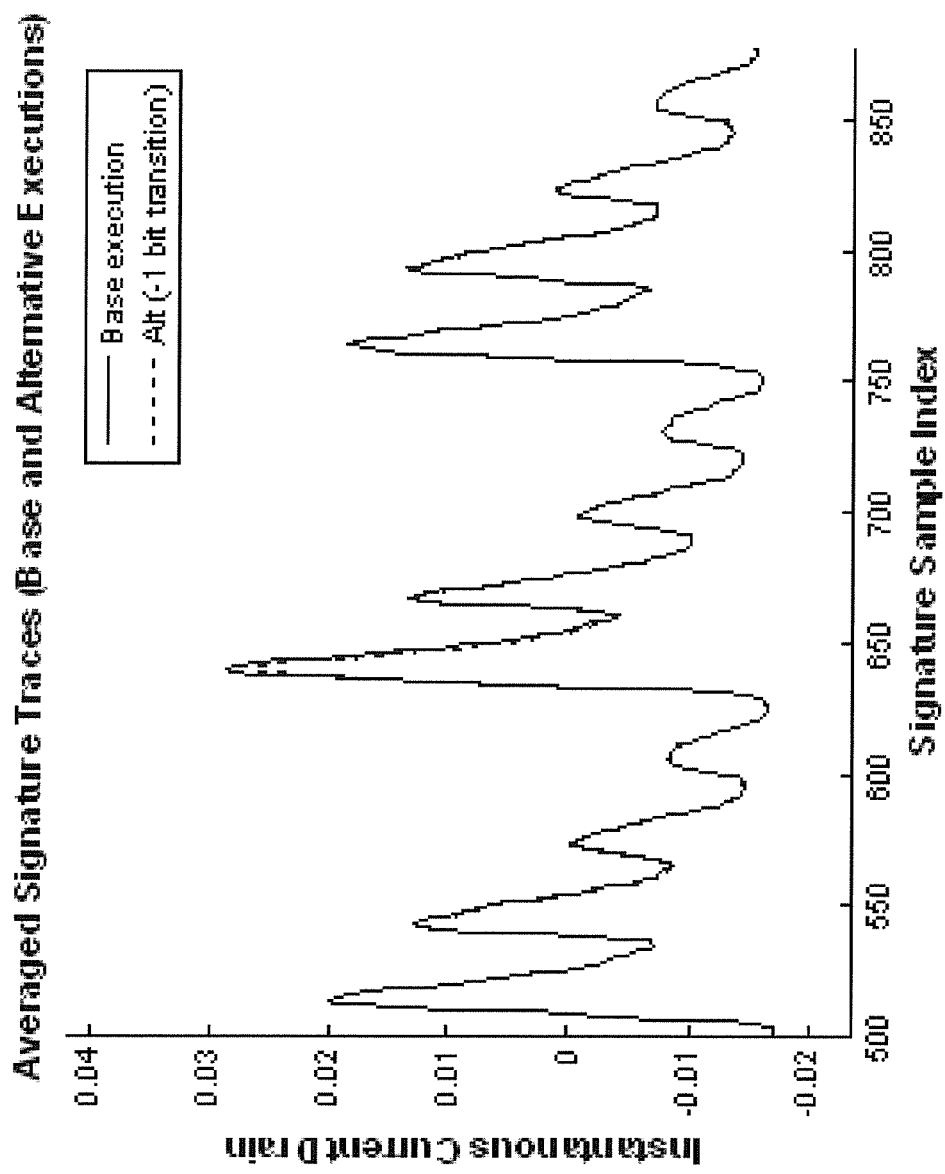
FIG. 9 is a graph showing sample preprocessing of traces in the time domain.

Another example of basic preprocessing is to align time-domain traces, as shown by the alignment of the base execution and alternate (−1 bit transition) traces in FIG. 9, before being passed to a correlation detector. In this example, each trace of N samples is considered as a point in a multidimensional Euclidean space.

Figure 10:
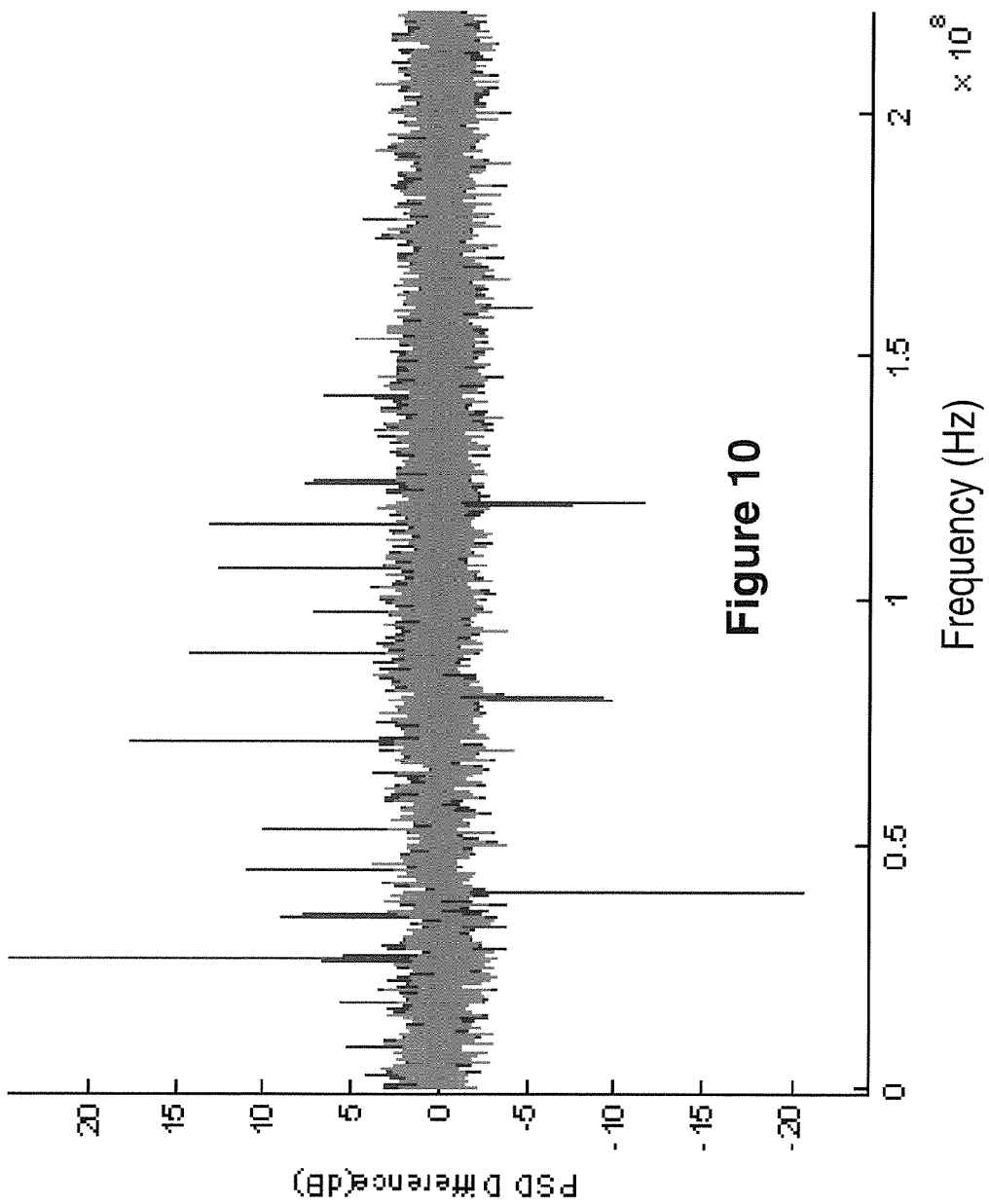
FIG. 10 is a graph showing PSD difference from the execution of test traces against a stored signature.

Feature extraction is the process of calculating the final test statistic (from new traces) which is passed to the detectors and used to determine integrity. This process is unique to each selected feature. For example, in basic time domain correlation analysis, preprocessing could include coarse synchronization and compensation for specific platform power consumption patterns, while feature extraction involves comparing against the stored signature by calculating the correlation factor or the Euclidean distance. An example of feature extraction is shown in FIG. 10, which shows the PSD error in dBs of test traces corresponding to the execution of the trusted code and tampered code in the BeagleBoard's OMAP3 processor following the PSD example in FIG. 8. Using this difference vector, the final test statistic or discriminatory feature passed to the detector can be represented by the mean squared error or any other distance or error metric.

Detector Design

Figure 11:
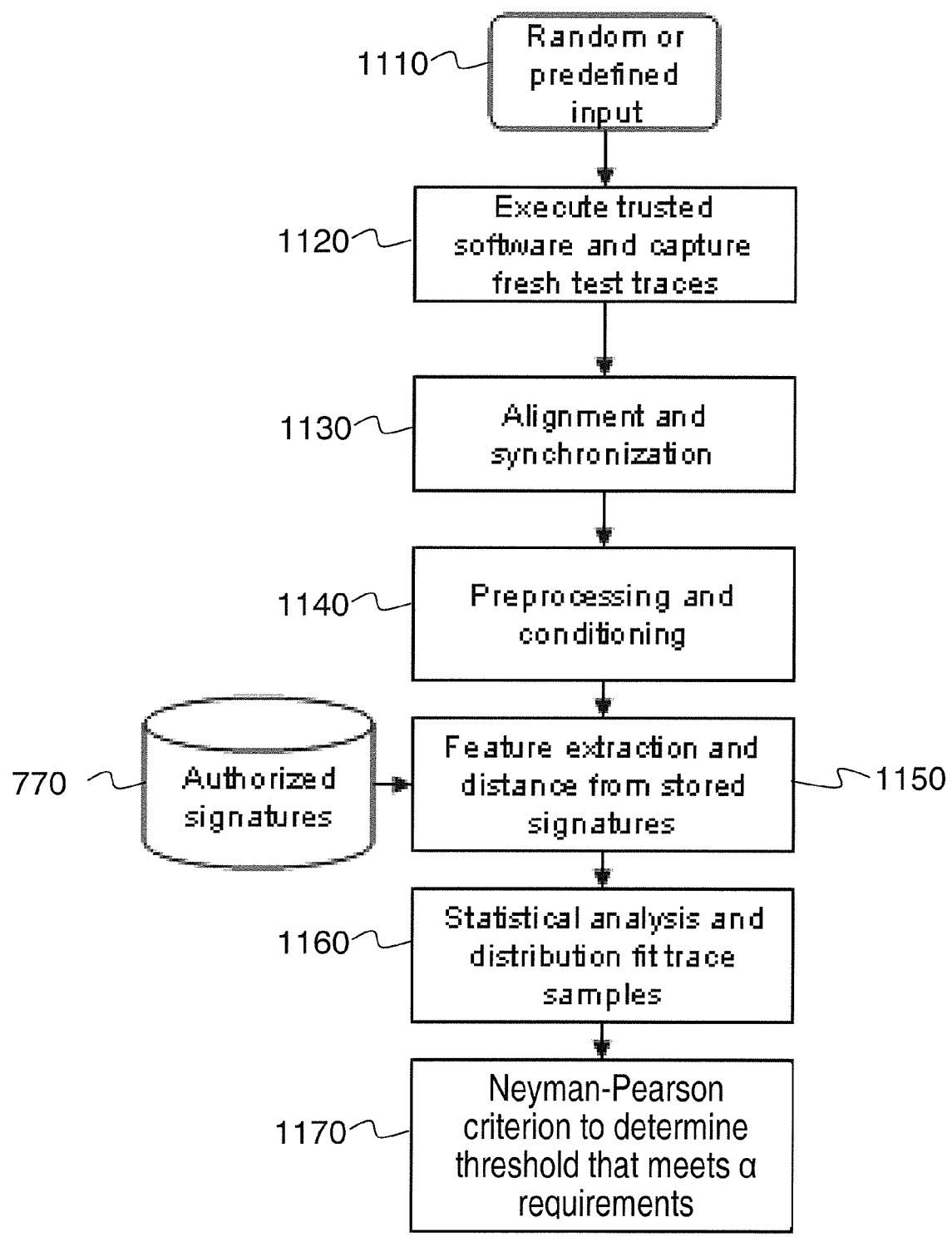
FIG. 11 is a flow chart showing the process of detector design.

Once the signatures have been extracted and the discriminatory features have been selected, the next step in the PFP process is to design optimal detectors to perform the final integrity assessment. These detectors will make the final decision of whether a test trace should be considered an intrusion during monitoring operation. The process of detector design and normal monitoring operation are very similar. In detector design, test traces from the execution of trusted software are captured and processed to extract the selected discriminatory features and compared against the stored signatures. Several traces are collected and processed and their statistical sample distributions are used to identify a threshold that yields the expected performance targets. The process of detector design is shown in FIG. 11. Random or predefined input 1110 is provided to trusted software 1120 and fresh test traces are captured from its execution. The results are aligned and synchronized 1130, and the traces are preprocessed and conditioned 1140. Using authorized signatures 770 for comparison, the selected discriminatory features are extracted and a distance metric is generated 1150. Then statistical analysis and distribution fitting is done 1160 on the resulting metrics. Finally, the Neyman-Pearson criterion is applied 1170 to determine a threshold that meets expected performance targets.

Figure 12:
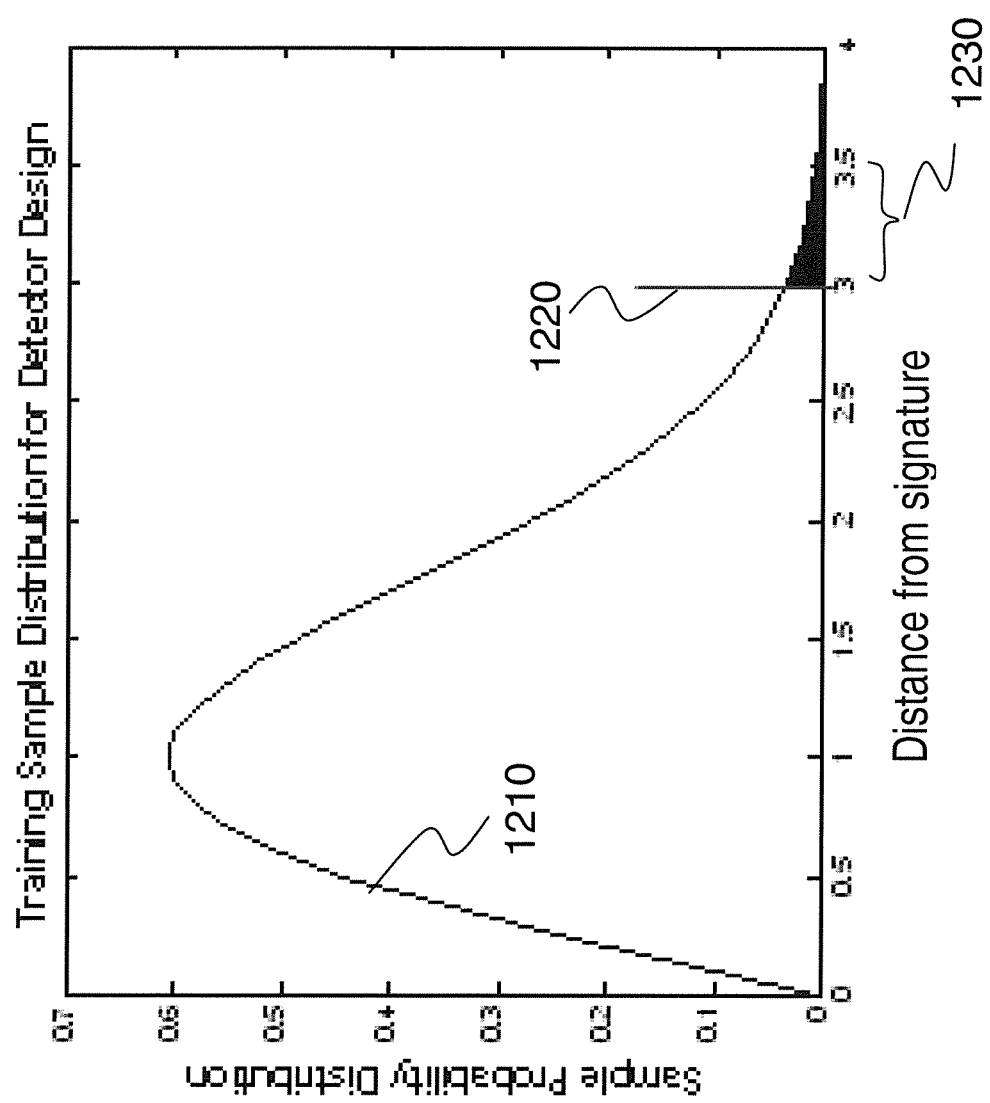
FIG. 12 is a graph showing sample probability distribution from trusted code execution used for detector design and threshold selection.

A common approach to create optimal detectors involves the application of the Neyman-Pearson criterion to maximize the probability of detection for a given probability of false alarm. As a brief reminder of this criterion, which is spawned from basic hypothesis testing theory, a target probability of false alarm is set based on the tolerance and estimated cost of making a mistake in the final decision. Using an estimate of the probability distribution of the discriminatory features from the trusted code, a distance threshold is calculated that yields the expected probability of false alarm while maximizing the probability of correct detection. An example of this process is shown in FIG. 12, in which a distance threshold 1220 is calculated for a probability distribution 1210 that yields an expected probability of false alarms 1230.

It is important to note, however, that there are different techniques that can yield improved results depending on the nature of the selected discriminatory features. Other techniques for detector design and machine training include: Neural Networks, Support Vector Machines, and Hidden Markov Models.

Monitoring Operation

Figure 13:
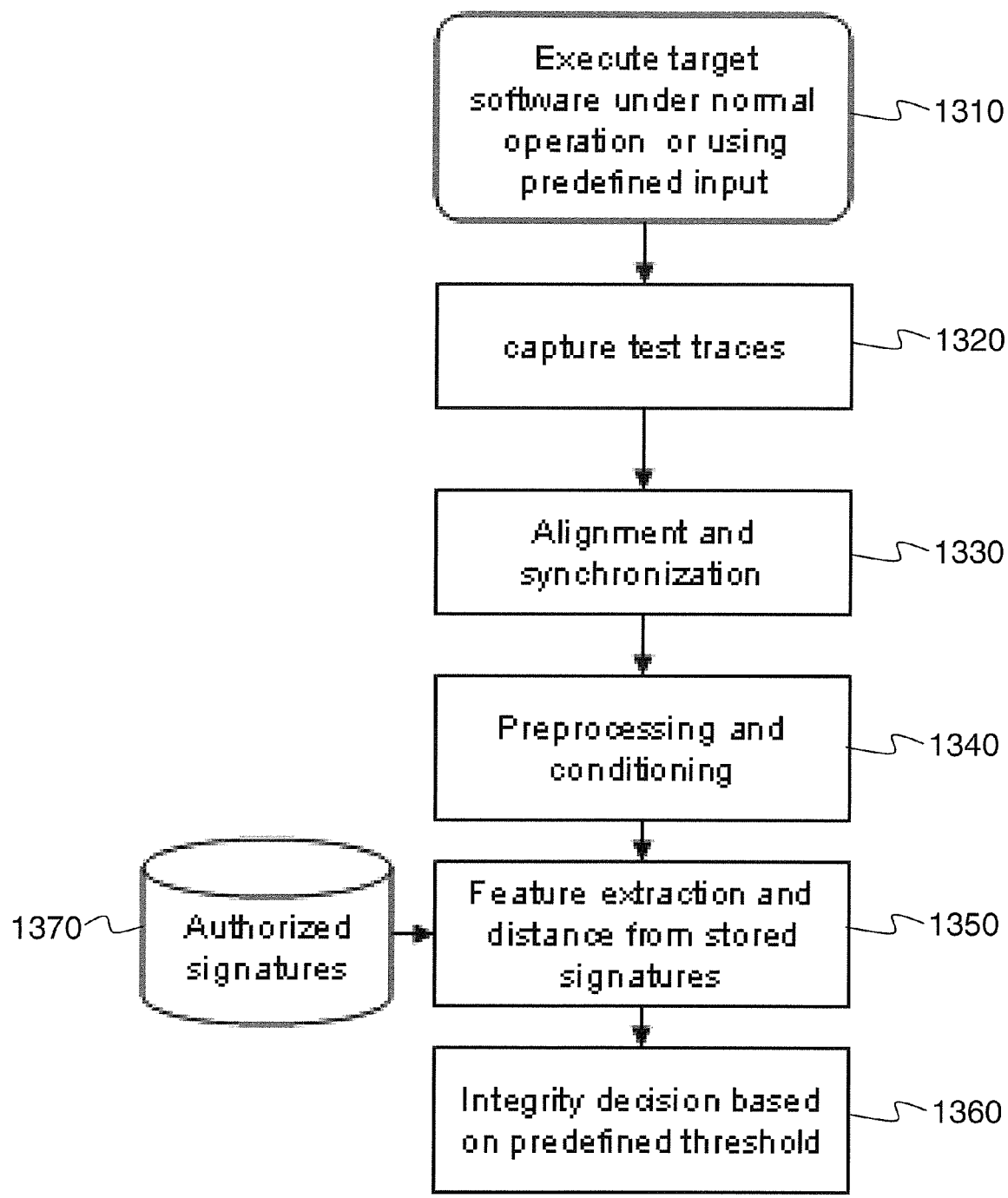
FIG. 13 is a flow chart showing the PFP integrity assessment operation process.

Once signatures have been extracted from the execution of trusted code, discriminatory features have been selected, and optimal detectors have been designed, the PFP monitor is ready to assess the integrity of test software. As mentioned before, the normal integrity assessment process is very similar to the detector design process. During normal operation, the monitor also extracts the selected discriminatory features from power traces after the necessary preprocessing, but instead of collecting the statistics from several traces as was done for detector design, they are passed through the appropriate detector to compare against the respective thresholds and determine the integrity status of the test code execution. The detector compares the test traces against all known signatures and, if no single test statistic is enough to determine that authorized code has executed, then an intrusion is reported. This process is depicted in the diagram shown in FIG. 13. The target software is executed 1310 during normal operation or using predefined input to capture test traces 1320, which are then aligned and synchronized 1330, and then preprocessed and conditioned 1340. The detector then compares 1350 the extracted features against the known signatures 1370 to determine a distance, using the predefined threshold 1220 to make an integrity assessment decision 1360.

Sample Results

Figure 14:
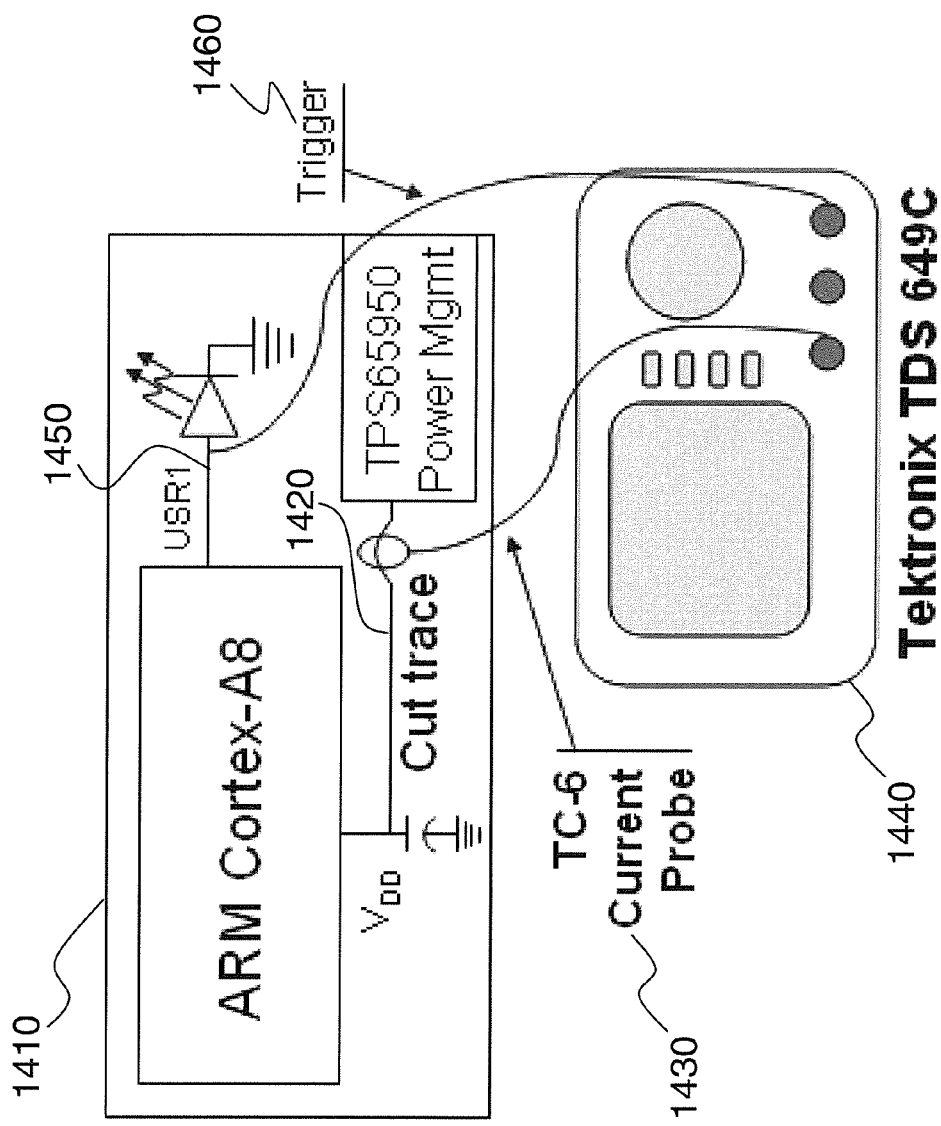
FIG. 14 is a schematic diagram showing a sample embodiment setup for the Android platform.

In order to exemplify the PFP process on smart phones and other embedded platforms, we describe a reference implementation of this technique using a BeagleBoard revision C4 with the ARM processor (OMAP3 @ 720 MHz) running the Android platform. The BeagleBoard 1410 is slightly modified by cutting the main traces 1420 providing power to the core power rail in order to connect a current probe 1430. The capture system is implemented using a commercial real-time oscilloscope 1440 and current probe 1430. The oscilloscope is configured to a sampling rate of 2.5 GSps and a total of 30K samples are collected in every trace initiated by the trigger 1450. The setup is described in FIG. 14.

A basic test app was developed to demonstrate the process and show feasibility. This basic app consists of a simple counter that displays an increasing integer on the device screen. The operation of the app is described in LISTING 1 and consists of a typical Android Java application structure with an initialization routine that prepares the screen for showing a text box and sets an integer variable used as a counter. There is also a routine called DisplayCounter in charge of incrementing the value of the counter and displaying it on the screen. This routine is configured as a recurrent task that is called every second.

LISTING 1. Pseudo-code of Android Test App

```
Initialize
DisplayCounter( )
{
    counter = IncrementValue(counter);
    Display data
}
Sleep for one sec
DisplayCounter at wake up
```

The critical IncrementValue routine was implemented in native C code and included as an external library by Android's NDK toolset, instead of the traditional Java implementation. Before the critical section, a physical trigger 1450 is set to signal 1460 the capture systems to start collecting power traces.

We only characterize and monitor the critical IncrementValue routine shown in Listing 2.

LISTING 2. Pseudo-code of monitored native routine in C

```
/*Critical native routine*/
int incrementValue(int Val)
{
    /*trigger LED usr1*/
    Open device driver control file
    Write 1 into file
    /*Increment Val*/
    Val++;
    /*General extra processing*/
    i = 1000;
    while(i)i--;
    /*Reset LED usr1 Trigger*/
    Write 0 into file
    Close driver control file
    return Val;
}
```

Signature extraction is performed in the frequency domain by simply averaging the PSD of several traces from trusted code execution. The phase information of the trace is ignored. The PSD of two hundred traces is averaged together to yield the signature.

The discriminatory features are extracted in the frequency domain as well by a mean-squared error between the signature and the PSD of test traces (in dBs). The PSD of the latest three test traces are averaged together before calculating the MSE. Only the first 200 MHz of the PSD are used in the MSE calculation.

This process for signature extraction yields a mono-dimensional discriminatory feature.

Detector design was performed using the Neyman-Pearson criterion described earlier using a target probability of false alarm, $P_{FA}$, of 1%. The sample statistics of the trace are extracted from a sample of 200 traces from the execution of the trusted code.

The sample distribution was fit to a Rayleigh distribution with mean and variance equal to the training sample distribution mean and variance. Using this distribution, the inverse probability distribution is calculated to find the threshold that yields the target 1% $P_{FA}$.

In order to test the ability to detect execution deviations from trusted code, we test the previously designed monitor using a slightly tampered version of the app. The tampered app, shown in LISTING 3, is designed to emulate a covert attack in which the intrusion remains inactive until a specific condition is met. The intrusion consists of a very simple modification in which a file is written only when the value of a counter reaches a specific value (the condition).

LISTING 3. Pseudo code of tampered critical native routine

```
/*Critical native routine*/
Int incrementValue(int Val)
{
    /*trigger LED usr1*/
    Open device driver control file
    Write 1 into file
    /* Tamper */
    if(Val == 1){
        //open temporary file
        //Write Val into file
        //Close file
    }
    /*Increment Val*/
    Val++;
    /*General extra processing*/
    i = 1000;
    while(i)i--;
    /*Reset LED usr1 Trigger*/
    Write 0 into file
    Close driver control file
    return Val;
}
```

It is important to note that the file writing taking place in the tamper only occurs once during execution (i.e. when the counter is 1). The rest of the time, when the routine is called, the condition is not met and the extra file is not written. Hence, for the majority of the time the routine is called, the only modification from a logic standpoint is an extra evaluation of a given condition.

Operational Results

Figure 15:
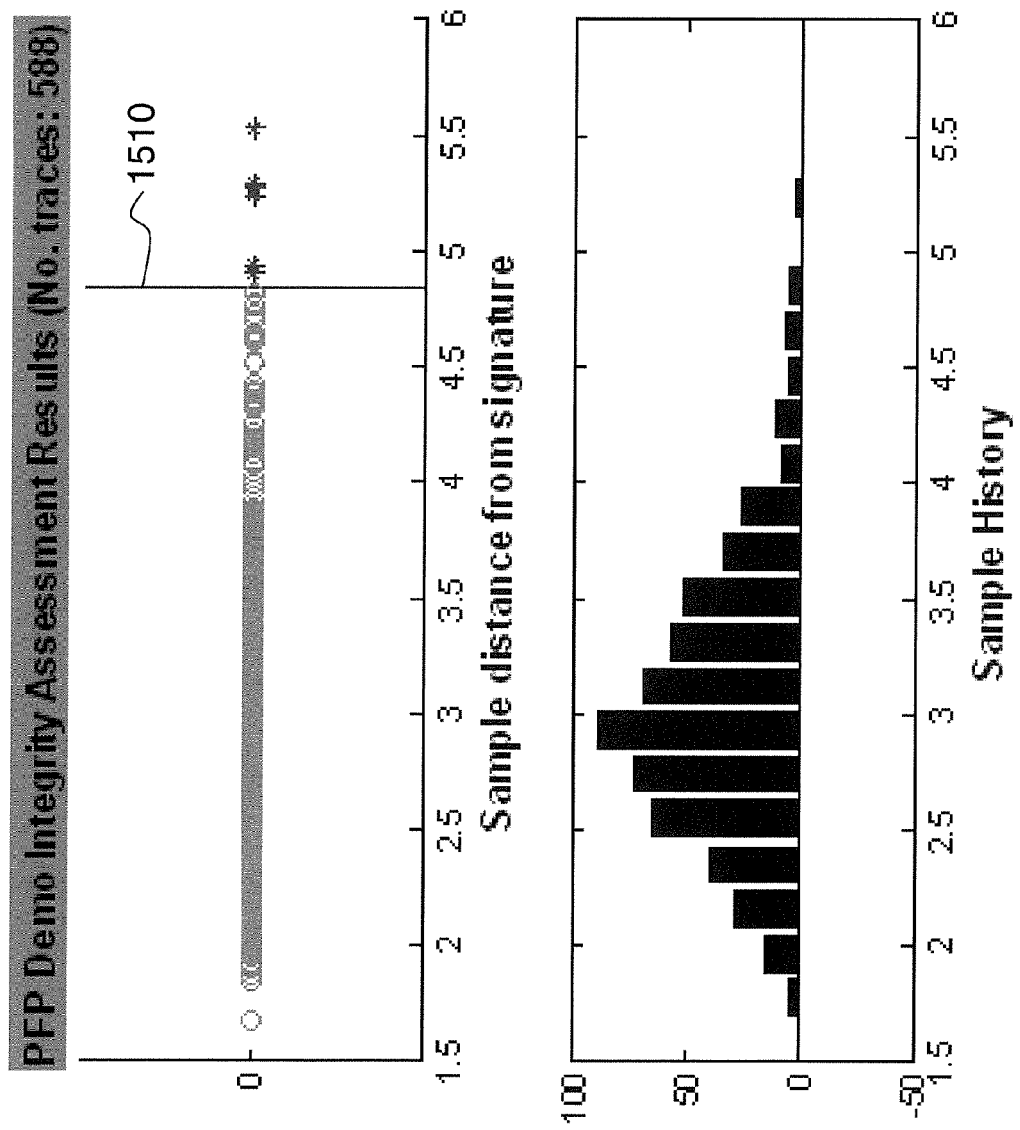
FIG. 15 is a graphical representation of sample distributions resulting from execution of the original untampered routine.

The results from running the monitor when the original untampered version of the routine is executing are shown in FIG. 15.

We can see that for the duration of the test, we had only a few instances that went past the threshold 1510, which is consistent with the designed probability of false alarm.

Figure 16:
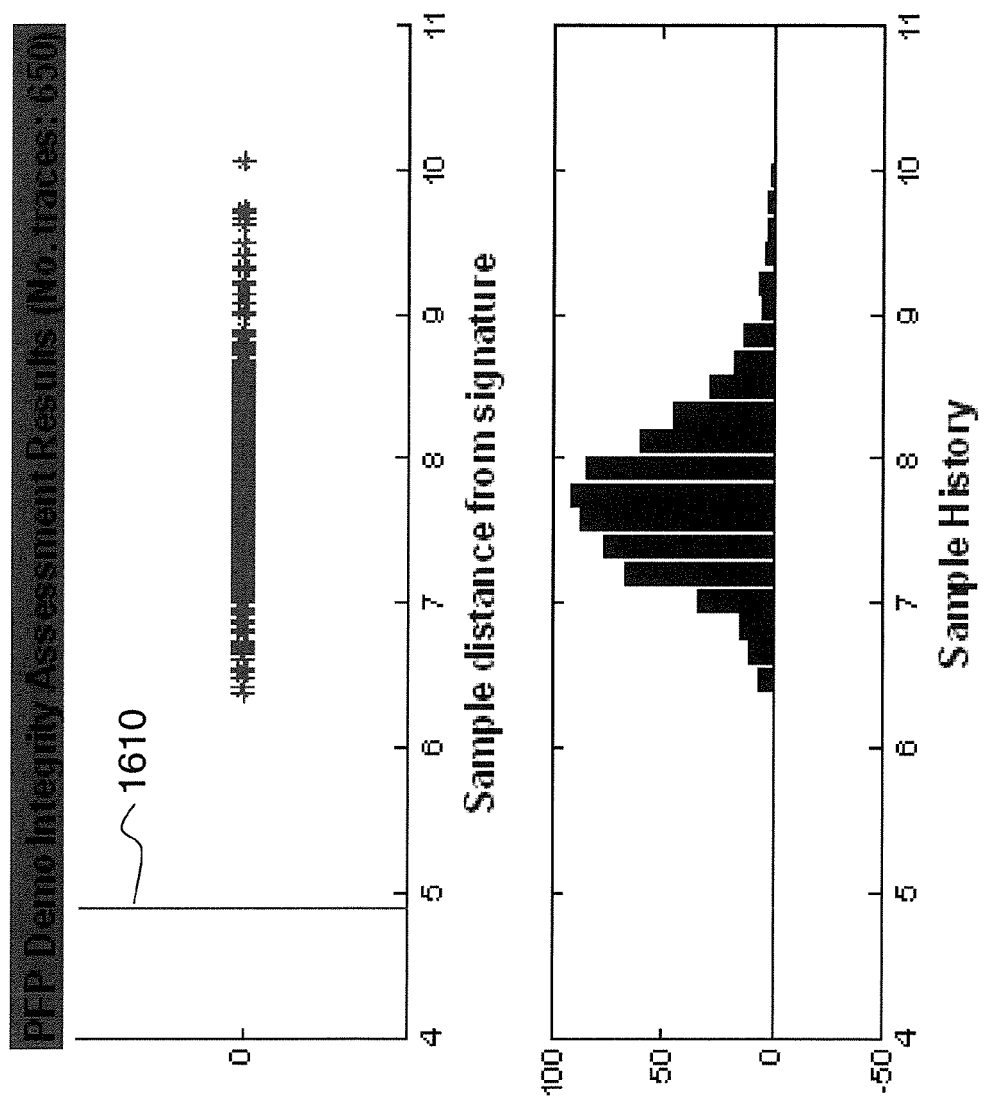
FIG. 16 is a graphical representation of sample distributions resulting from execution of the tampered routine.

The results from running the monitor with the tampered version of the app are shown in FIG. 16. Notice that no instance is misclassified as authorized execution and every single execution of the tampered app would be flagged as an intrusion above threshold 1610. It is also important to note that due to the conditioned execution of the tamper, only once during the execution instances used in these results was the file actually written. The rest of the time, only a condition was checked, and when it was not met, normal execution resumed.

Platform Characterization and Evaluation of Minimum Sensitivity

Figure 17:
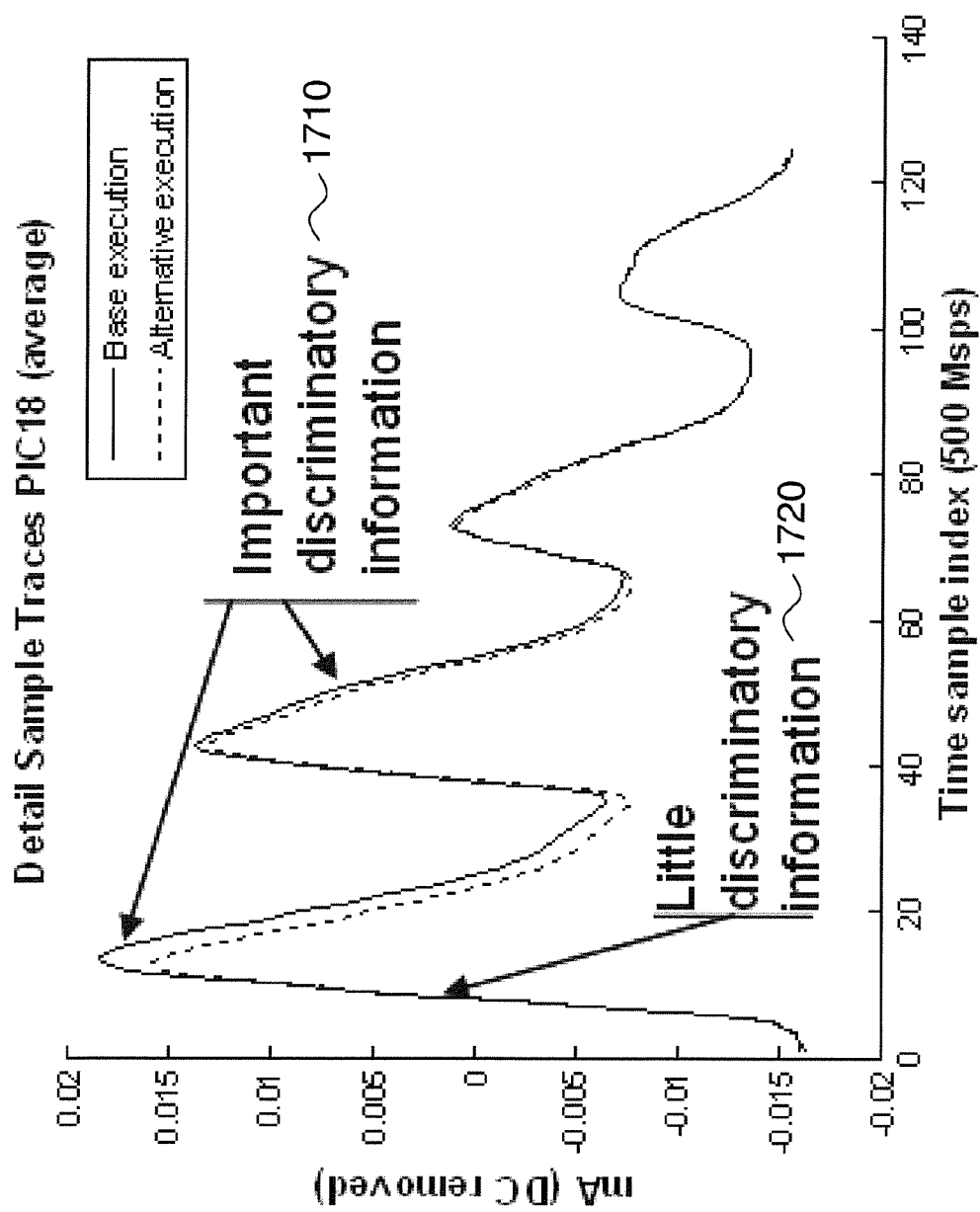
FIG. 17 is a graph of sample trace detail showing different sections of the traces containing different levels of discriminatory information.

The fine-grained measurements of the power consumption can lead to redundant information that adds very little discriminatory information, but that can add significant noise and uncertainty to the signatures. In the time domain this looks like FIG. 17. In this case, we would like to focus our attention on the sections of the traces (dimensions) that have the largest variance 1710 between the two executions, in contrast to the sections, e.g. 1720, which show little variance between the two executions. On the other hand, when characterizing a specific software routine that takes random parameters, the effect of these random parameters is to introduce noise to the signatures, which ends up reducing performance and increasing the probability of false alarm. In this case, we would like to focus our attention to the dimensions (e.g. 1720) that remain constant during the execution of the target software, while ignoring the ones that add noise. In this case, we would like to ignore the dimensions that display large variance (e.g. 1710).

In order to improve the performance of PFP, it is necessary to reduce the number of features analyzed by concentrating on only the ones that carry the most information. This is accomplished by pre-characterizing the features that carry the most information for a given platform as part of the training and then eliminate redundant information during preprocessing before passing the traces to the detectors.

Technical Background

In traditional pattern recognition systems, the process of selecting a subset of features that maximizes a specific criterion (in the case of PFP we want to maximize discriminatory information PFP), is known as optimal feature selection. In clustering systems, this is normally accomplished by projecting the traces, x, to a transformed space with fewer dimensions from the most useful (or informational perspective) by means of a linear transformation.

This transformation is described as $$y = Wx$$

Where W is a carefully designed linear transformation matrix that when applied to test traces, yields a transformed trace with lower dimensionality that maximizes a particular criteria. There are different criteria to identify the optimal transformation. Because we are trying to optimize feature selection in terms of discriminatory information, it is natural to follow an information theoretical approach. This optimization has been performed before and can be found in several sources in the pattern recognition literature, for example see J. T. Tou and R. C. Gonzalez. "Pattern Recognition Principles". Addison-Wesley Publishing Company, 1974.

Principal Component Analysis

A well know approach to determine the appropriate W that optimizes the entropy (or information) in the traces is known as Principal Component Analysis (PCA). We assume that the covariance matrices of the different classes, $C_i$, are normally distributed and identical $C_i = C$. Hence, the eigenvectors can be considered as the information bearers for the traces under consideration. Some of these vectors carry more discriminatory information in the classification sense than others, which can be safely eliminated without much performance penalty. It should be no surprise that the optimal feature vectors are tied to these eigenvectors and are used to create the transformation matrix W by aggregating eigenvectors in descending order according to the corresponding eigenvalue. Because in PFP we only need a single point per clock cycle, the transformation matrix W is given by the eigenvector of the covariance matrix associated to the largest eigenvalue.

The linear transformation can be interpreted as a projection of the test trace into a transformed space of lower dimensionality from the most informative perspective. PCA can be applied to in different ways, depending of the specific objective. From a clustering perspective, it is preferred to construct W using the eigenvectors associated with the smallest eigenvalues, as this would yield a tighter cluster in the transformed space. On the other hand, it is also possible to use the eigenvectors associated with the largest eigenvalues when traces from different executions are used. When applied this way, PCA will select the features that present the largest variance between classes. With the assumption that the covariance matrices are identical, these eigenvectors will represent the features that contain the maximum discriminatory information between the specific traces used for PCA.

Linear Discriminant Analysis (LDA)

PCA selects a feature subset in ascending, or descending, order in terms of variance to optimize trace entropy. It does not consider, however, the specific differences between classes to select an optimal set of features that maximizes the distance between distributions Linear Discriminant Analysis (LDA) maximizes the divergence between distributions, which is a measure of distance between probability distributions. Divergence is closely related to the concept of relative entropy in information theory.

Using specific information from different classes and divergence as optimization criterion, LDA identifies the optimal transformation matrix to project the traces from the unique perspective that yields the maximum separation between them. This is because the transformation vector W is normal to the optimal discriminating hyper-plane between both distributions.

Following the assumption that traces are normally distributed, it can be shown [TOU] that the transformation matrix that yields a divergence extremum is given by the only eigenvector of $C^{-1}\delta\delta^T$ associated with a non-zero eigenvalue. This vector is given by $$W_0 = C^{-1}(\mu_1 - \mu_0)$$

where $W_0$ provides the optimal projection to separate both classes while $\mu_0$ and $\mu_1$ are the respective centroids for the two training classes. LDA can be extended to M discriminating classes. In this case, there will be M−1 eigenvectors associated with non-zero eigenvalues.

Platform Power Consumption Characterization

As mentioned before, not all samples in a test trace are equally important to determine whether an execution deviation has taken place or not. Because of the large oversampling ratio and the nature of the power traces, there are certain sections of the traces that carry more discriminatory information than others. For PFP, the goal is to identify a linear transformation that reduces the dimensionality of the traces by removing redundancy while emphasizing the dimensions that carry the most information.

Figure 18:
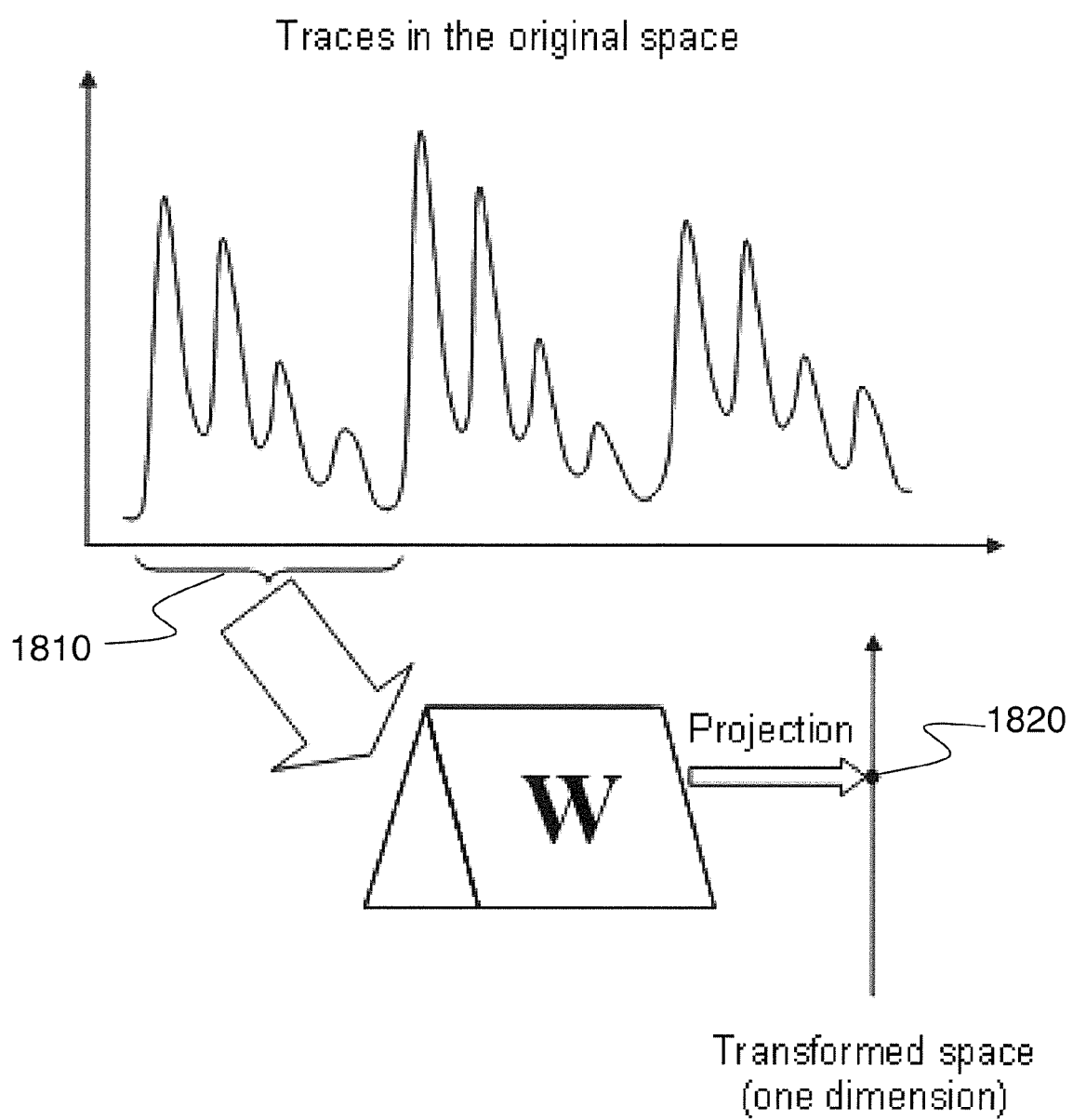
FIG. 18 is a schematic representation of a platform characterization using a linear projection from the most informative perspective.

The idea is to transform discriminatory features to reduce dimensions by using a linear projection of the traces using an optimal transformation matrix. In the time domain, trace sections corresponding to a full clock cycle 1810 are reduced to a single point 1820 in the transformed space, as depicted in FIG. 18. Classifiers also have to be designed to operate in the transformed space, reducing the number of dimensions that need to be considered during normal monitoring operation.

Characterization is performed under controlled conditions in the lab and is required only once per platform. As described in the previous sections, there are two general approaches to identify the optimal transformation matrix: PCA and LDA.

Platform Characterization Using PCA

In order to create a transformation matrix using PCA, it is necessary to observe the power consumption of the processor during random clock cycles. The traces are aligned for every clock cycle to clearly show the sections of the traces that are affected the most by the dynamic behavior of processor execution. Once the traces are aligned, PCA is used to identify the transformation vector that accounts for the most variance in the traces.

Performing platform characterization using PCA is relatively easy to implement and well suited for complex platforms in which controlling the contents in the pipeline results too difficult.

Platform Characterization Using LDA

Performing platform power consumption characterization using LDA requires the development of two carefully tailored routines. These routines must execute the specific instructions with specific addresses and parameters in the right sequence to create two sets of traces that show predetermined differences during a specific clock cycle. Training traces from the execution of both routines provide the two classes for which LDA will find the optimal discriminating hyperplane, which will in turn become the optimal transformation vector.

The objective of the special characterization routine is to execute a carefully crafted sequence of instructions to properly load the pipeline such that in a specific clock cycle there is a known change during each execution stage (fetching, latching, execution, etc). The changes should be relatively small, preferably due to a few changing bits in the respective registers. The characterization routine is not unique, but it is platform specific as it depends on the architecture, instruction set, etc. of the platform being characterized. Different processors will likely require a different sequence.

Once the traces from the execution of both sequences are captured and synchronized, LDA is used to find the optimal transformation vector W. It is expected that platform characterization using LDA will provide the best performance, given the availability of two known classes, but its implementations is more complex than PCA.

Platform Power Consumption Characterization Reference Implementation Results

For this reference implementation, we use a motherboard with a PIC18LF4620 8-bit microcontroller from Microchip Technology Inc., similar to the ones used in the PICDEM Z Demonstration Kit, intended as an evaluation and development platform for IEEE 802.15.4. This is a popular embedded microcontroller without a memory management unit.

The processor motherboard is slightly modified in order to enhance power consumption features. From the board, a total of six decoupling capacitors are removed totaling a cumulative 6 microF. The function of these capacitors is to mitigate the stress placed on the power supplies by the strong current peaks caused by digital processors. It is important to note that removing decoupling capacitors would not be necessary if the current sensor is placed closer to the processor power pins, or if the effect of the resulting LP filter is cancelled using signal processing.

Figure 19:
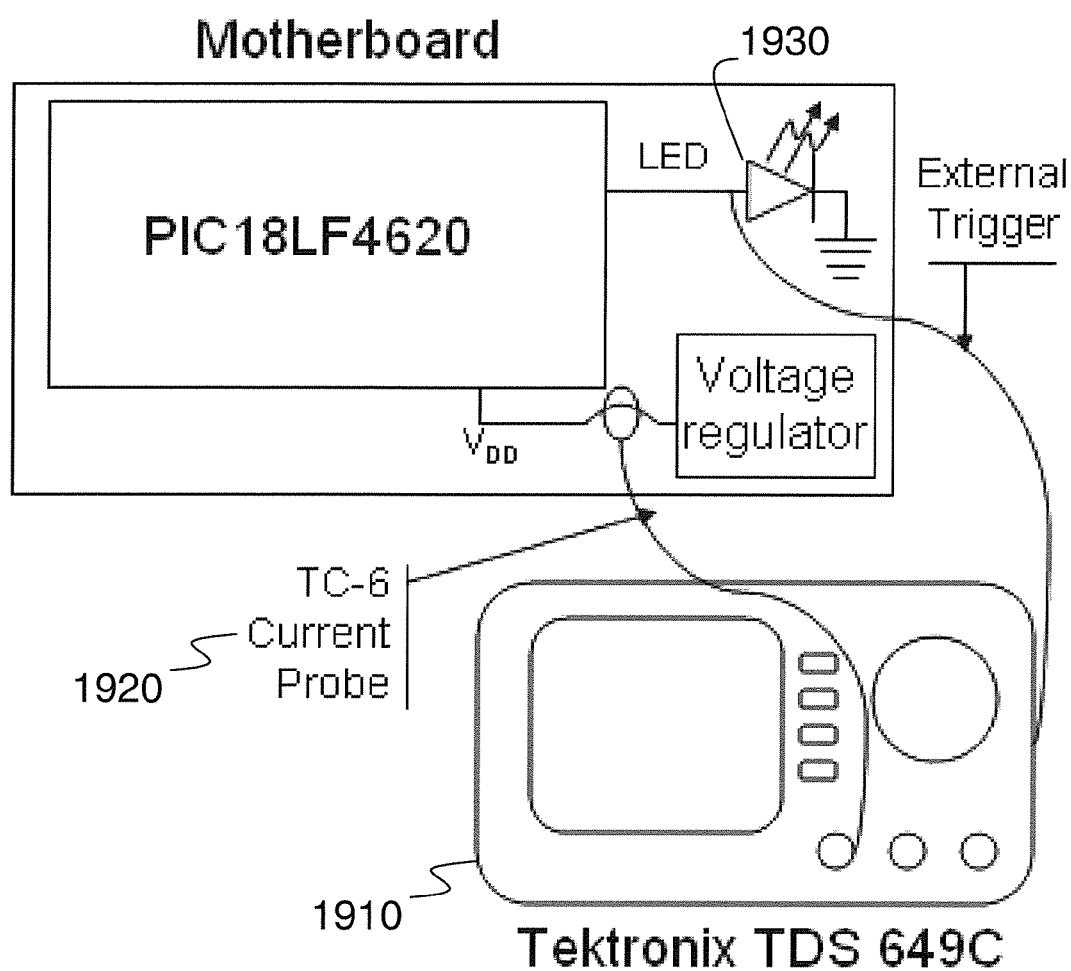
FIG. 19 is a schematic diagram showing a reference measurement setup for platform power consumption characterization and monitoring using PFP.

Trace collection is performed using a Tektronix TDS 649C real-time oscilloscope 1910 and a Tektronix TC-6 current probe 1920. The probe is connected right passed the voltage regulators on the mother board. The oscilloscope is configured to 500 MS/s and 10 mV. The trigger is driven by LED1 1930, and configured for falling-edge, 40 mV level, and no pre-trigger samples are kept. A total of L=30,000 samples are collected after every trigger event. The measurement setup is depicted in FIG. 19. Traces are captured and transferred to a host computer using GPIB for their posterior analysis.

A sample routine is developed for this experiment with a dual purpose 1) to provide training routines to perform the platform characterization and 2) to provide a reference change to measure the performance of the approach. We start by describing the evaluation usage of the routine and provide baseline performance for comparison. The test routine is shown in LISTING 4 and executed in an infinite loop. In this routine, the contents of Register W are toggled from 00 to 0f using different instructions. Notice that the actual logic in the routine has no impact on the performance of power fingerprinting. This routine was chosen because it is easy to control the number of bit transitions that happen. The results, however, do not depend on the specific software being executed. Therefore, this routine provides a representative example.

---

LISTING 4.

```
BYTE i;     //addr 00
BYTE j;     //addr 01
BYTE k;     //addr 10
BYTE l;     //addr 11
// Initialize the system
BoardInit( );
// Initialize data variables
_asm
movlw 0x07
movwf i, 0      //addr 0x00
movlw 0x0f
movwf j, 0
movlw 0x0f      //Set for minimum change
movwf k, 0      //addr 0x10
movlw 0x1f
movwf l, 0      //addr 0x11
movlw 0x00
_endasm
//Target code infinite loop
while(1){
    TMR0H = 0x00;   //Restart TIM0
    TMR0L = 0x00;
    LED_2 = 1;      //Trigger
    LED_2 = 0;
    _asm
        nop
        iorwf   j, 0, 0   //w = 0f
        andlw   0x00      //w = 00
        movf    j, 0, 0   //w = 0f
        andlw   0x00      //w = 00
        movf    k, 0, 0   //w = 0f Change in k (one bit)
        movlw   0x00      //w = 00
        xorwf   j, 0, 0   //w = 0f
        movlw   0x00      //w = 00
```

-continued

LISTING 4.

```
    iorwf    j, 0, 0    //w = 0f
    xorlw    0x00       //w = 00
    nop
    ... x 10
    nop
    _endasm
}
```

The routine, as shown in LISTING 4 represents the base execution. Preceding the target code, we create a trigger using an LED on the board. The trigger is used to synchronize trace capture with the oscilloscope. The "NOP" instruction between the trigger and the target code is included as a buffer to isolate the target traces form any residual effects from the trigger. Once inside the main loop, Register W is toggled from 00 to 0f creating four bit transitions in that register every instruction. The alternative, or modified, code has one fewer bit transition. In Line 15, we change the contents of variable j from 0 f to 07. This way, when the target code is executing, in Line 35, the parameter k is loaded onto Register W which goes from 00 to 07, with only three bits transitioning in the register for that instruction. Note that there is just one bit difference between this modified code and the base execution which loads Register W with a 0f and that everything else in the execution is kept the same, including instructions, parameters, and addresses. Note that this one-bit change actually affects two clock cycles, as there is one less transition coming into that instruction and one less coming out of it. Trailing the target code there is a string of "NOP" instructions before the loop is repeated.

Figure 20:
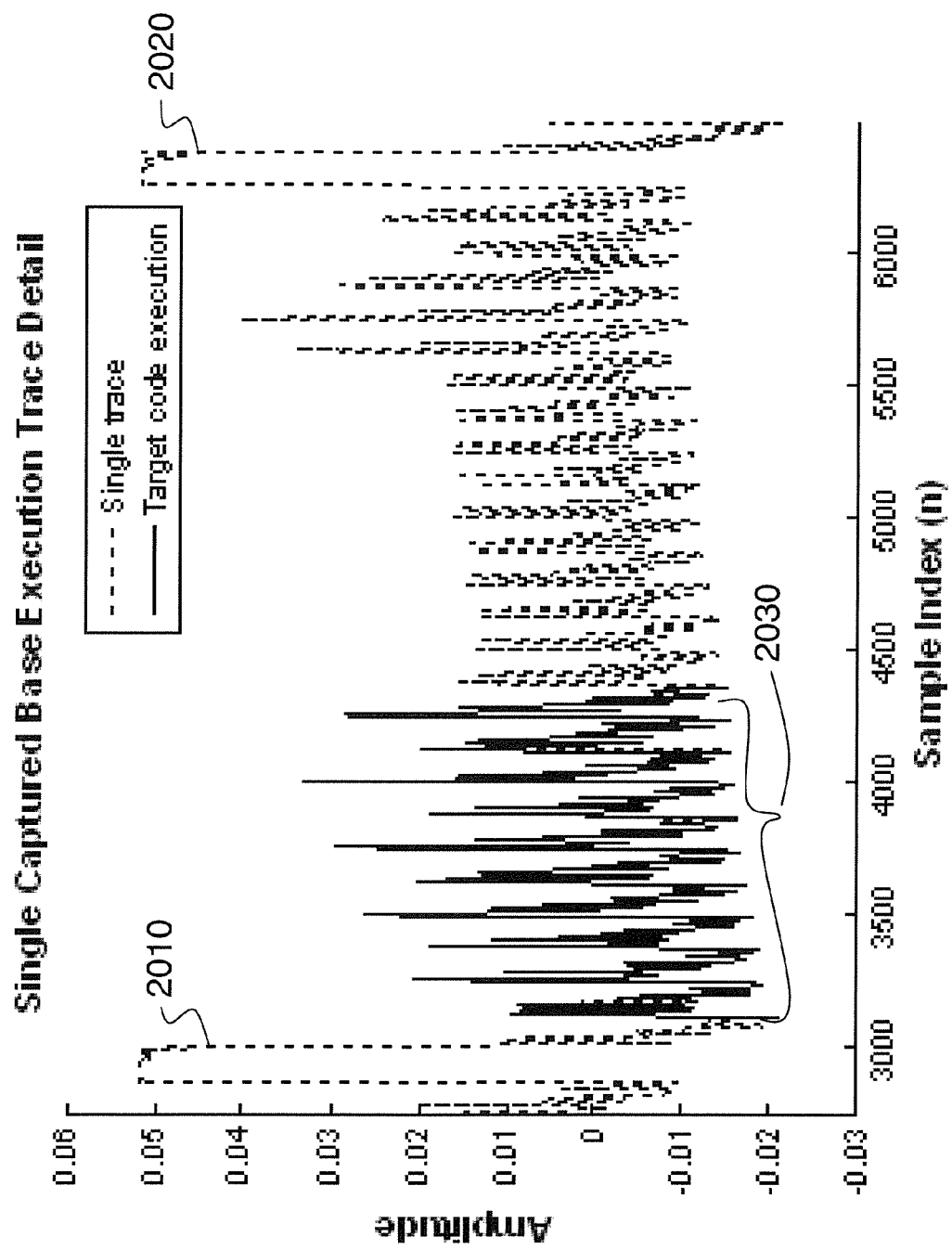
FIG. 20 is a graph showing a sample trace from baseline code execution to evaluate ability to detect minimum power consumption change.

A detail of a typical trace is shown in FIG. 20. In this figure we capture one full execution cycle of the target code. The trigger effects on the power traces are clearly visible as two square steps 2010 and 2020. Individual instruction cycles are also noticeable. They can be identified as groups of four spikes that repeat every 125 samples. Using timing information from the processor's documentation, we can determine the section of the trace that corresponds to the execution of the target code. In FIG. 20, this section is highlighted as a solid line 2030 that spans ten instruction cycles. This is in agreement with the actual code, which consists of ten assembly instruction, each taking one bus cycle to execute.

Figure 21:
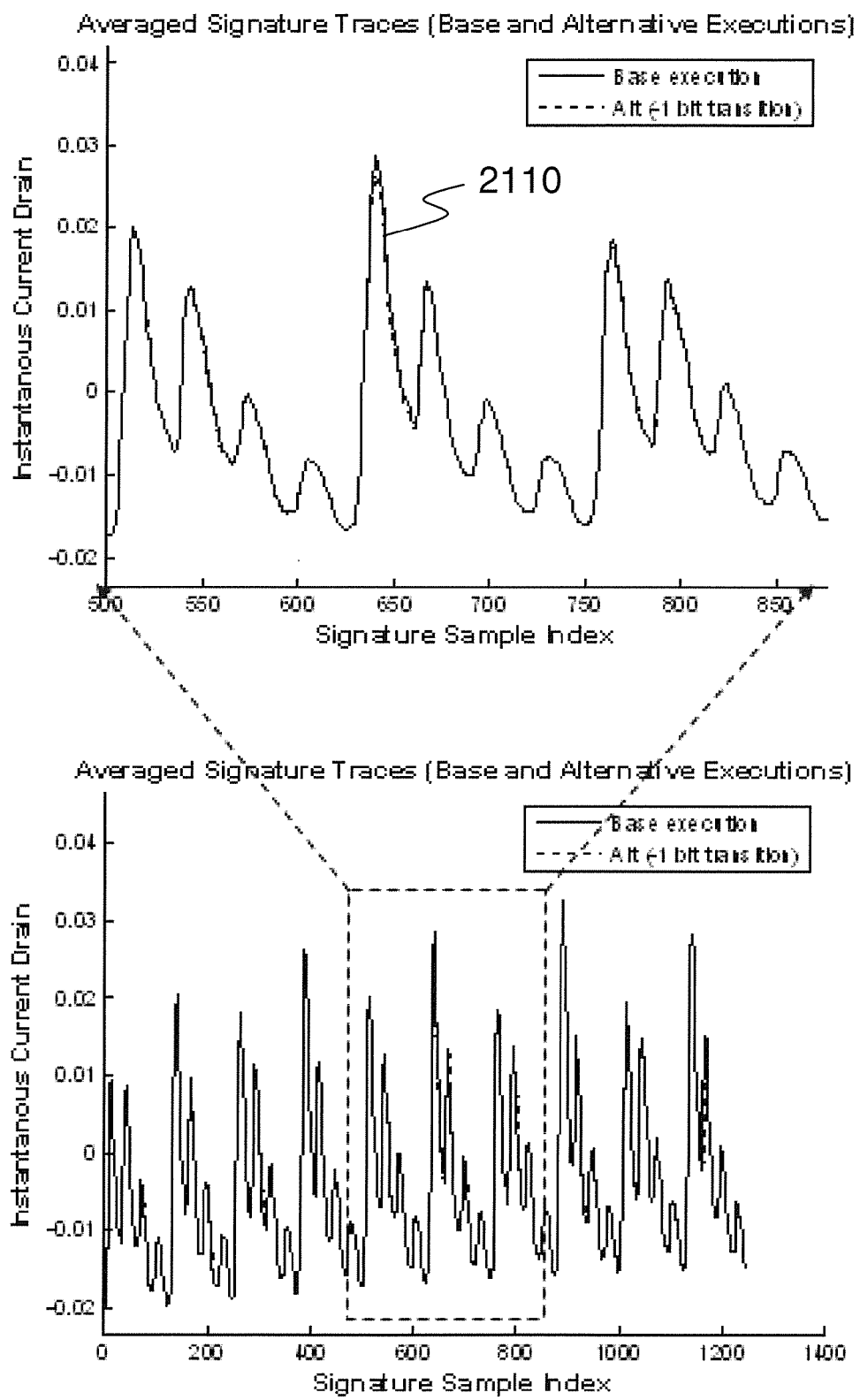
FIG. 21 is a graphical representation of an average signature from baseline code execution, where each point represents a projection on an n-dimensional Euclidean space.

Several traces are captured from each of the base and alternative executions and the traces from each execution are averaged together to provide a clean picture of both executions showing the total effect of one less bit transition. The averaged traces are shown in FIG. 21. In this picture, the ten clock cycles corresponding to the execution of the base code are shown and it appears that the traces from each execution are aligned. Around sample index 650, however, there can be seen a small difference between the two traces. The difference (at 2110) is more noticeable in the top of FIG. 21, which provides a closer look. Along with the closeness of the centroids from both scenarios, it is also evident that traces are largely correlated due to over sampling and also that only certain sections of the traces carry useful discriminatory information.

For comparison purposes, we provide the results of a naive classification approach in the time domain without platform pre-characterization. We use a basic minimum-distance classifier. In this approach each captured trace of length L=1250 (the length of the target code) represents a point in an L-dimensional Euclidean space. The Euclidean distance is taken from the base execution centroid to each incoming test trace. For classification purposes, the base centroid and test traces represent a single point, or vector, in a multidimensional Euclidean space with 1250 dimensions. The test traces are different from the training ones used to obtain the base centroid. This is to avoid a bias in the evaluations of a minimum-distance classifier to accurately discriminate between the different scenarios.

Figure 22:
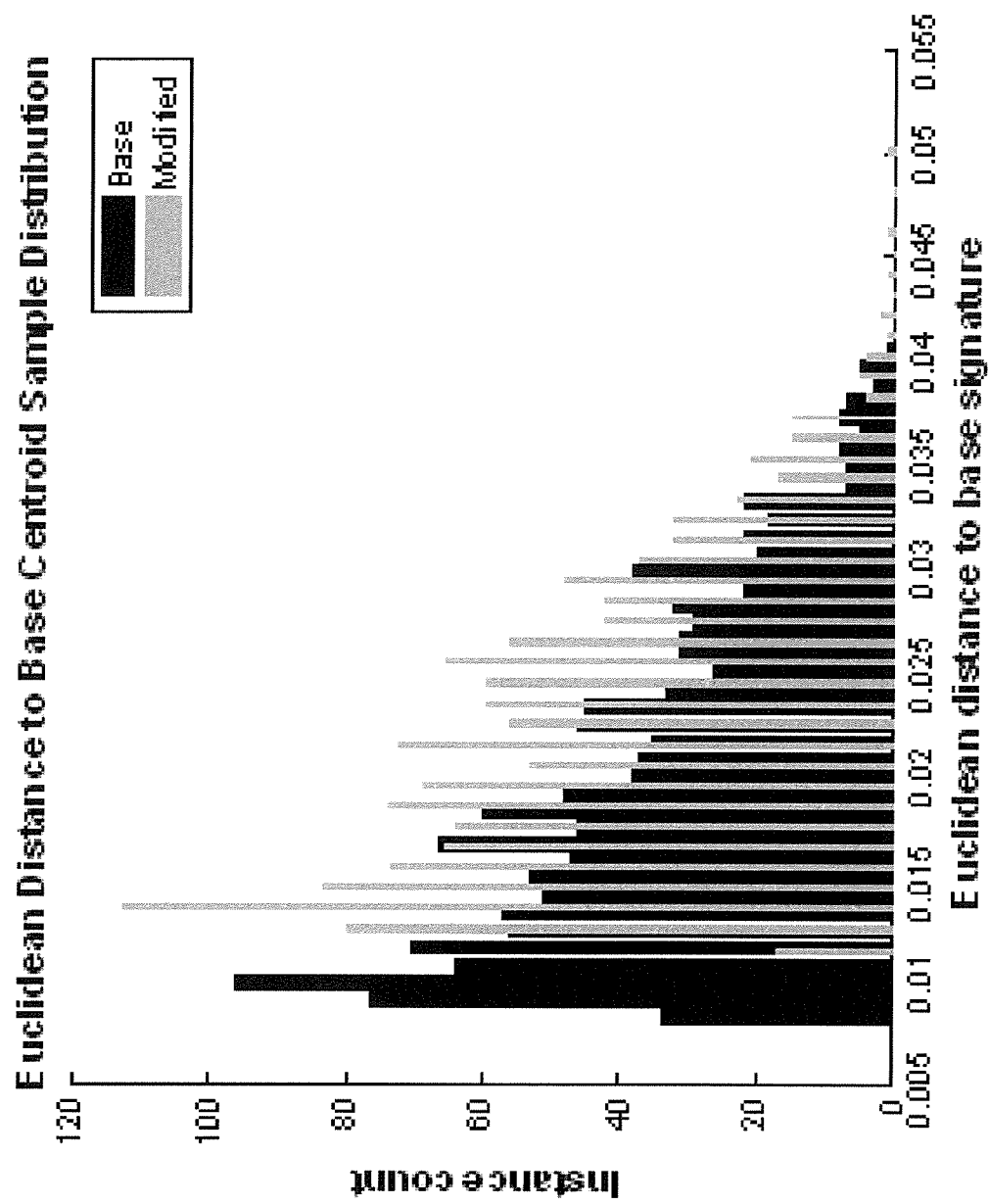
FIG. 22 is a graph showing sample distribution of Euclidean distances from the average signature extracted from the execution of the baseline code.

Test traces from the execution of both routines have the Euclidean distance distributions shown in FIG. 22. In this naive example, the performance of power fingerprinting is not encouraging, as there is barely any difference between the distributions, which substantially overlap. This poor performance is expected considering the small differences in power consumption between the base and alternative scenarios.

The first results for platform characterization are obtained from applying PCA. For this process we use all clock cycles corresponding to the execution of our target code in the routine shown in LISTING 4. The trace corresponding to the full execution of the trace is divided into different sections corresponding to a single clock cycle execution. The subsections are then aligned and PCA is used to find the transformation vector W corresponding to the eigenvector that accounts for the most variance. In this case, as explained before, we take the oversampled trace for one clock cycle and we reduce it to a single point.

Figure 23:
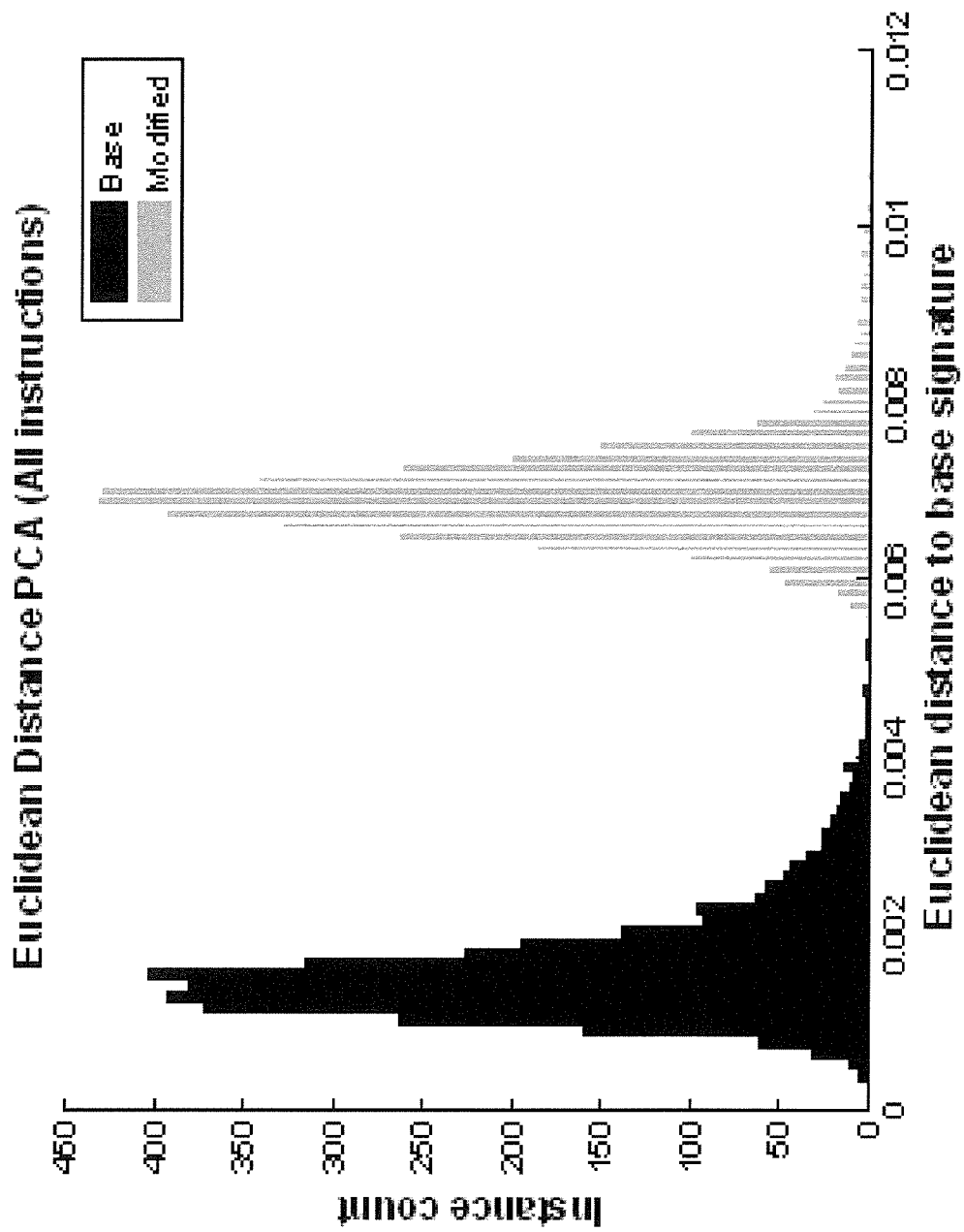
FIG. 23 is a graph showing sample distribution of Euclidean distances from the baseline signature in the transformed space obtained using PCA.

After performing the platform characterization using PCA the test traces from the evaluation routine are processed again to demonstrate the performance improvements of platform pre-characterization. The minimum distance distributions from the transformed test traces to the signature in the new PCA transformed space are shown in FIG. 23.

A clear separation is seen between the bulk of the distributions, which represents a clear improvement with respect to the naive classification performance shown in FIG. 22.

Results with Platform Characterization Using LDA

In order to obtain the training traces necessary to apply LDA, we execute the base routine and a slightly modified version. We obtain the special platform characterization traces by comparing two sets of traces: from the base execution, which is once again the code in LISTING 4 and a slightly modified version of it shown in LISTING 5. The changes in execution are carefully selected to cause one less bit transition on each execution stage compared to the base execution. In this modified version, the instruction in Line 36 is changed from xorwf with opcode 0001 10da to iorwf with opcode 0001 00da (the optional arguments d and a, control the destination and RAM access bit, respectively, and are kept with the same value in both cases). During execution the difference in the opcodes will cause one-less bit transition when latching the instruction word. The parameter in the instruction changed from j, located at address 0x01, to i, located at address 0x00 in Access RAM. Once again, the change will create one-less bit transition when executed. Furthermore, notice that the contents of the j and i also differ in one bit. This will also translate into one less bit transition when parsing the parameter, when executing the instruction and when writing the results.

LISTING 5. Modified routine for platform characterization

```
    ...
    35  movlw    0x00       //w = 00
    36  iorwf    i, 0, 0    //w = 07
```

| LISTING 5. Modified routine for platform characterization |
| --- |
| 37    movlw        0x00        //w = 00 |
| ... |

Figure 24:
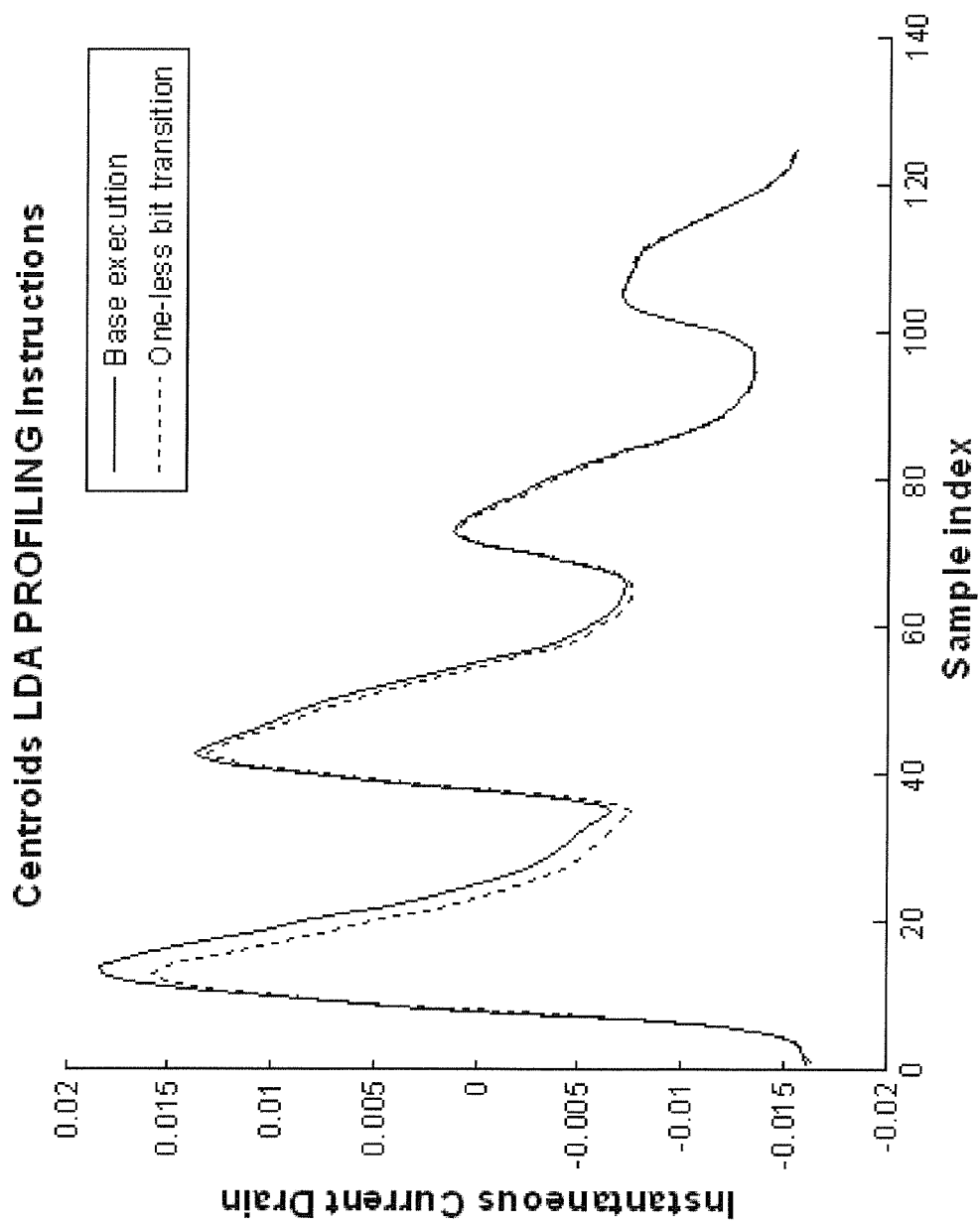
FIG. 24 is a graph showing centroids of traces from profiling instructions for LDA.

For platform characterization we use only traces corresponding to the execution of Line 36 in Listing 5. The average of these traces (for each execution, the base execution and the one-less bit transition) is shown in FIG. 24.

Figure 25:
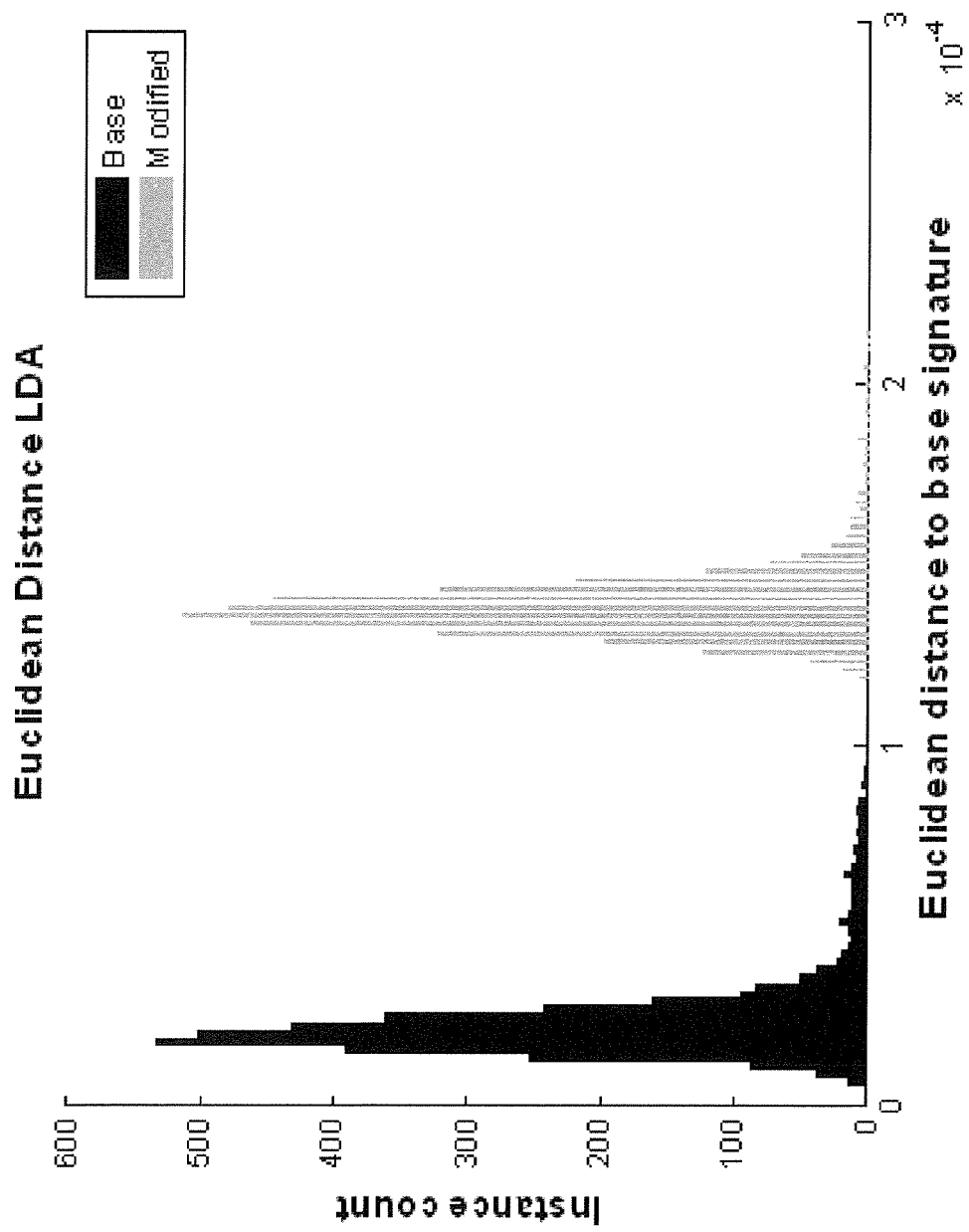
FIG. 25 is a graph showing sample distribution of Euclidean distances from the baseline signature in the transformed space obtained using LDA.

Using these traces, we perform LDA to identify the optimal discriminating hyperplane and the linear transformation that project our traces from the most informative perspective. The test traces from the evaluation routine are processed again to demonstrate the performance improvements of platform pre-characterization. The minimum distance distributions from the transformed test traces to the signature in the new LDA transformed space are shown in FIG. 25.

Detecting Deviations from Authorized Software Execution in Software-Controlled Radio Platforms and Other Embedded Systems Dynamic power consumption of a processor can be monitored to determine whether it corresponds to the expected execution or a deviation has occurred.

Platform Description

Figure 26:
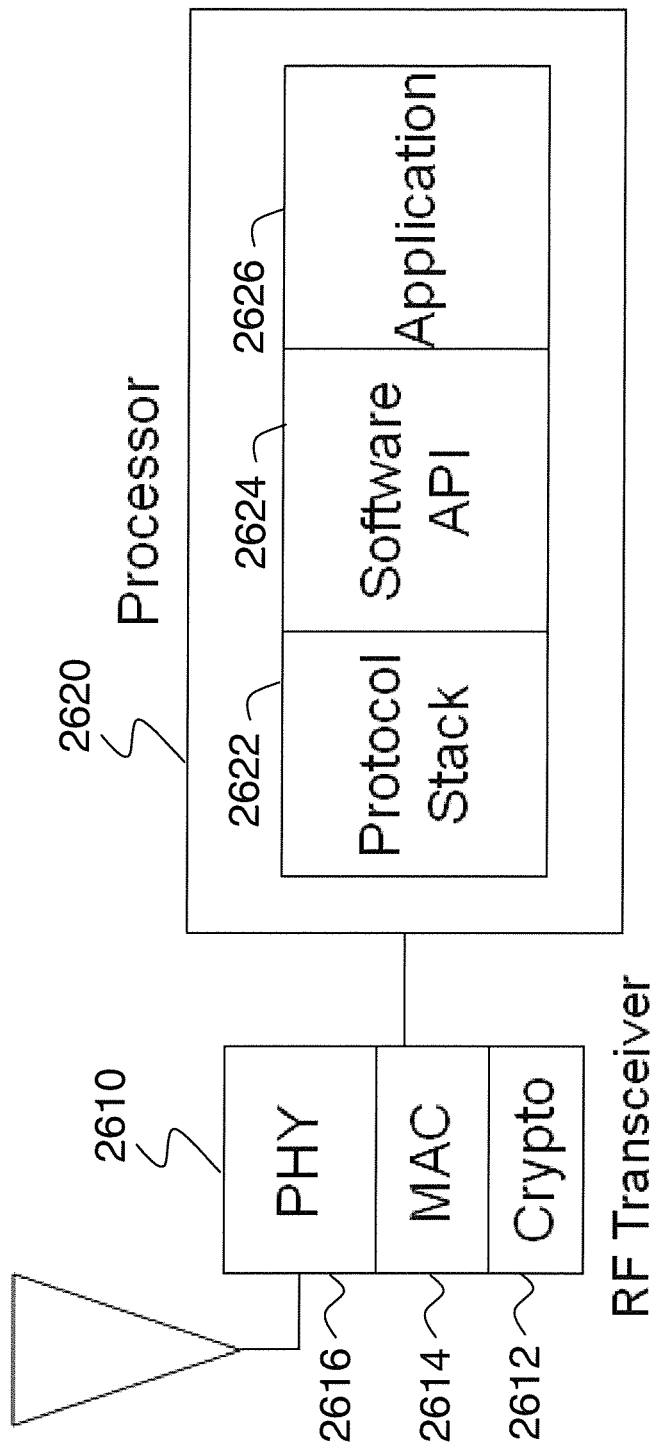
FIG. 26 is schematic block diagram of an exemplar target platform for detecting deviations from authorized software execution.

The exemplar target platform for illustrating this use of power fingerprinting (PFP) is a software-controlled radio, in which the specific configuration of the radio behavior is controlled by software. A generic block diagram of the intended platform is shown in FIG. 26.

In this platform, the behavior and configuration of the RF Transceiver 2610 is controlled by the processor 2620. The application 2626 represents the highest layer and implements the intended functionality for the processor. In order to interact efficiently with the RF Transceiver 2610, there is a set of Application Program Interfaces (APIs) 2624 that abstract the complexity of the interactions with the hardware to the main application. These APIs, together with the required drivers and protocol stack implementation 2622, provide a board support package for the specific transceiver. The protocol stack 2622 arranges the data to be transmitted in the prearranged format, adding required headers and preparing the payload so the intended receiver can extract the information. It is also in charge of extracting the information received from remote devices and presenting it to the application layer 2626. The cryptographic module 2612 can be implemented in the RF transceiver or in software as part of the protocol stack. FIG. 26 shows it as part of the transceiver. The location of the cryptographic module 2612 presents no practical difference in the approach. The MAC 2614 and PHY 2616 layers of the RF Transceiver 2610 are in charge of medium access and physical transmission and reception of the information.

The described approach characterizes the execution of the Application software 2626, in particular the execution of the API calls 2624 that impact the behavior of the cryptographic module 2612. In this approach, the specific code executed as a result of an API call is used to determine whether encryption was used and the type of encryption used. For example, if the application calls for a specific kind of encrypted transmission, this approach asserts the execution of the code that invokes the encryption. In case of malicious or accidental tampering, this approach provides a reliable indicator of the modification.

Signature Extraction

Traces of length L captured during the $i^{th}$ execution of authorized code a are represented by $$r_a^{(i)}[n]; n=0,\ldots,L-1$$

In order to avoid potential low-frequency interference from other board components, a basic no-multiplier high-pass filter is introduced by calculating the difference between trace samples $$d_a^{(i)}[n]=r_a^{(i)}[n]-r_a^{(i)}[n-1]$$

Several captured traces from the execution of the authorized code are used to create a signature, our target fingerprint. N traces are averaged to form the target signature and reduce the effects of random noise in the individual traces $$s_a[n] = \frac{1}{N}\sum_{i=0}^{N-1} d_a^{(i)}[n];$$

$$n = 0,\ldots,L-1$$

Feature Extraction

The process of extracting discriminatory features consists of simple time-domain correlation against the target signature. The correlation, however, is performed on $j>0$ partial sections of the signature and the trace, each section has a length w=floor{L}. This partial correlation is performed to avoid spreading potential differences in the power traces across a full-trace correlation.

The cross correlation for different sample lags, $0 \le k \le w$, of section j of the traces is given by:

$$\rho_{s_a d_b^{(i)}}(j,k) = \frac{1}{(w-1)\sigma_s \sigma_d} \sum_{n=(j-1)w}^{jw} s_a[n] d_b^{(i)}[k+n] - w\bar{s}\bar{d}$$

where $\bar{s}$ and $\sigma_s$ are the sample mean and standard deviation of the corresponding section in $s_a$ and $\bar{d}$ and $\sigma_d$ are the sample mean and standard deviation of the corresponding section in $d_b^{(i)}$.

In order to compensate for any clock drifts, we keep the maximum correlation values for different lags. This action reduces the dimensionality of our traces to only a sequence of j peak correlation values for every trace:

$$\hat{\rho}_{s_a d_b^{(i)}}(j) = \max_k \{\rho_{s_a d_b^{(i)}}(j,k)\}$$

Under ideal conditions and with b=a, $\hat{\rho}_{s_a d_b^{(i)}}(j)=1$ for every section j. Any deviation from the power consumption characteristics would be reflected by a reduced correlation factor. The actual discriminatory feature or test statistic used in this work to evaluate traces is the minimum peak correlation value for that specific trace $$x_b^{(i)} = \min_j \{\hat{\rho}_{s_a d_b^{(i)}}(j)\}$$

$$X_b = x_b^{(i)};$$

$$i = 0,\ldots,N-1$$

The random variable $x_b^{(i)}$ indicates the maximum deviation from the signature of instance i of code b. Using $X_b$ we can design appropriate detectors using different criteria depending on the statistical information we can gather from the system a priori.

Response to Integrity Violations and Layered Security

PFP is a very effective approach to detect execution deviations in cyber systems. In order to have a complete solution, however, it is necessary to have a structured policy to handle integrity violations when the PFP monitor detects a deviation from expected execution.

There are three clearly defined phases in computer security:

Prevention. Includes active mechanisms to deter, discourage and prevent attackers from carrying on attacks to disrupt the system, disclose information, etc.

Detection. Because perfect absolute prevention is not feasible, it is necessary to perform constant monitoring of the integrity of the system Response. The set of policies set in place to react to successful attacks.

The architecture for integrating PFP into a comprehensive defense-in-depth security approach will now be described. In this approach PFP provides a robust solution for the "Detection" phase to complement a number of different techniques to prevent and deter potential attacks. The appropriate reaction to different successful attacks is defined in the "Response" phase and is described according to the security policy described below.

While achieving system security requires a process and not just isolated mechanisms or technologies we will concentrate on describing the areas where PFP can complement traditional security mechanisms to provide continuous or intermittent monitoring for integrity assessment and intrusion detection. Before describing the role of PFP it is important to mention that the security process involves several steps including:

Design. Follow sound design approaches and design the systems to facilitate security enforcement, reduce vulnerabilities, enforce access control, etc. A typical example is to design the system such that security functions are isolated from the rest of the functionality and where access control features are inherently enforced.

Development. Follow best development practices to produce maintainable products with reduced vulnerabilities.

Deployment. Make sure only authorized modules are deployed. This requires strong authentication and non-repudiation approaches.

Operation. Maintain a secure environment by enforcing strong access control and other security policies.

Monitoring. Constantly assess the integrity of the system. PFP, antivirus, and Network intrusion detection systems.

Response. Define the policies and procedures to be followed when an attack is successful. Policies should be developed considering the criticality of the systems and should be strictly enforced.

This section describes an architecture to integrate a PFP monitor into a comprehensive security solution that includes complementary security mechanisms where the vulnerabilities of one layer are covered by the next. The approaches and technologies included in the different layers include: encryption of data at rest, strong authentication, access control, tamper-resistance, firewalls, sandboxes, virtualization, and physical protection. The architecture also provides a mechanism to define and enforce security policies to react to integrity violations detected by PFP.

Figure 27:
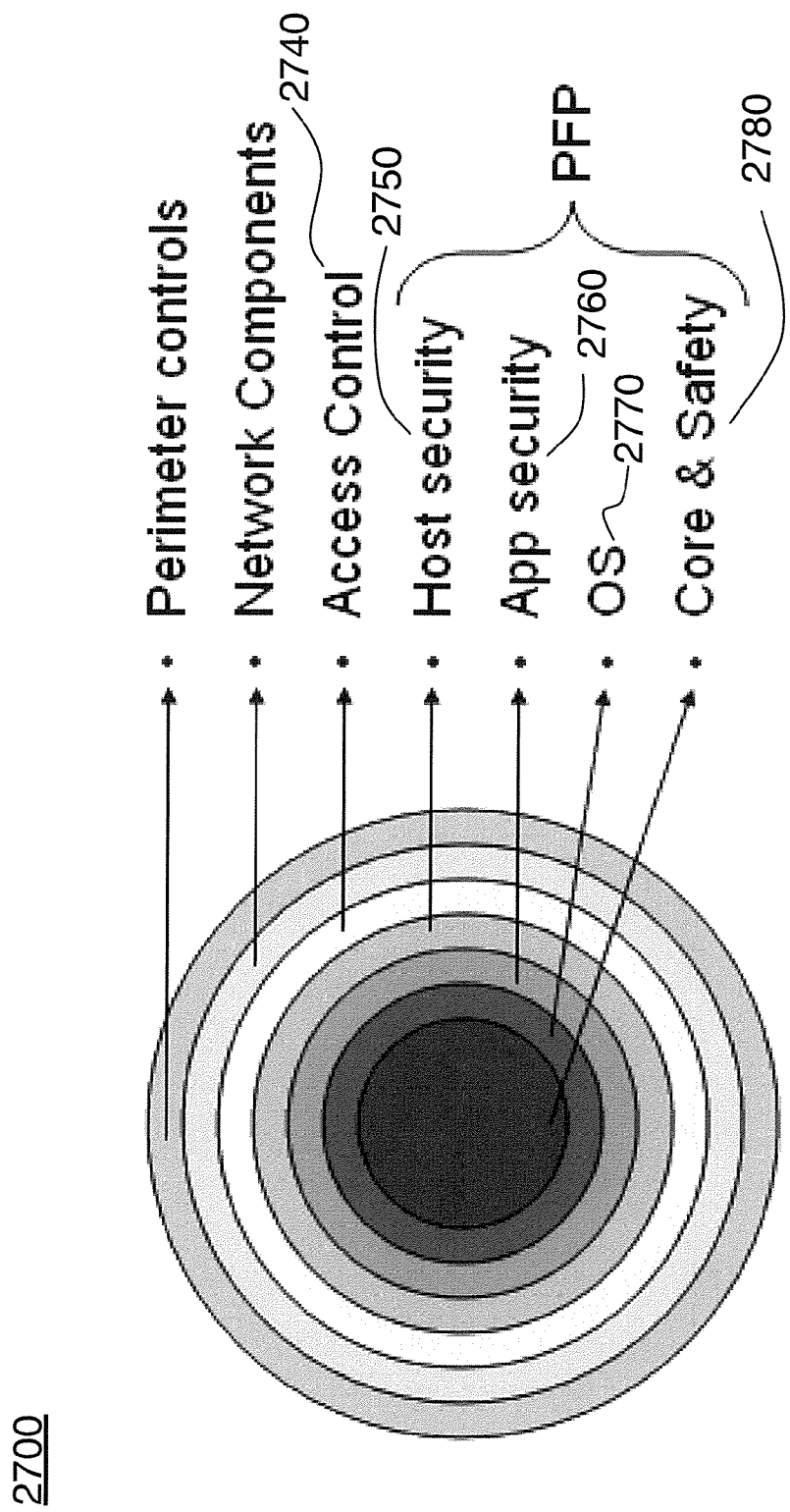
FIG. 27 is schematic diagram showing different layers in a defense-in-depth approach to cyber security.

The architecture defines a layered security solution where a PFP monitor provides a last line of defense by detecting when an intruder manages to get through all other defense mechanisms. FIG. 27 shows the different layers 2700 in a defense-in-depth approach. The different layers are intended to slow an adversary and make it progressively more difficult to breach a defensive layer without being noticed. In the outer layers are the external defense mechanisms, such as internet firewalls, physical protection of the equipment and passwords and security policies (i.e. to prevent social engineering attacks). The inner layers correspond to different defenses that reside within the host 2750. They start with access control 2740 and encryption of data at rest. They continue with different security mechanisms intended to protect the applications 2760 and the operating system 2770. At the core 2780, there are controls for the most basic kernel and safety operations.

Figure 28:
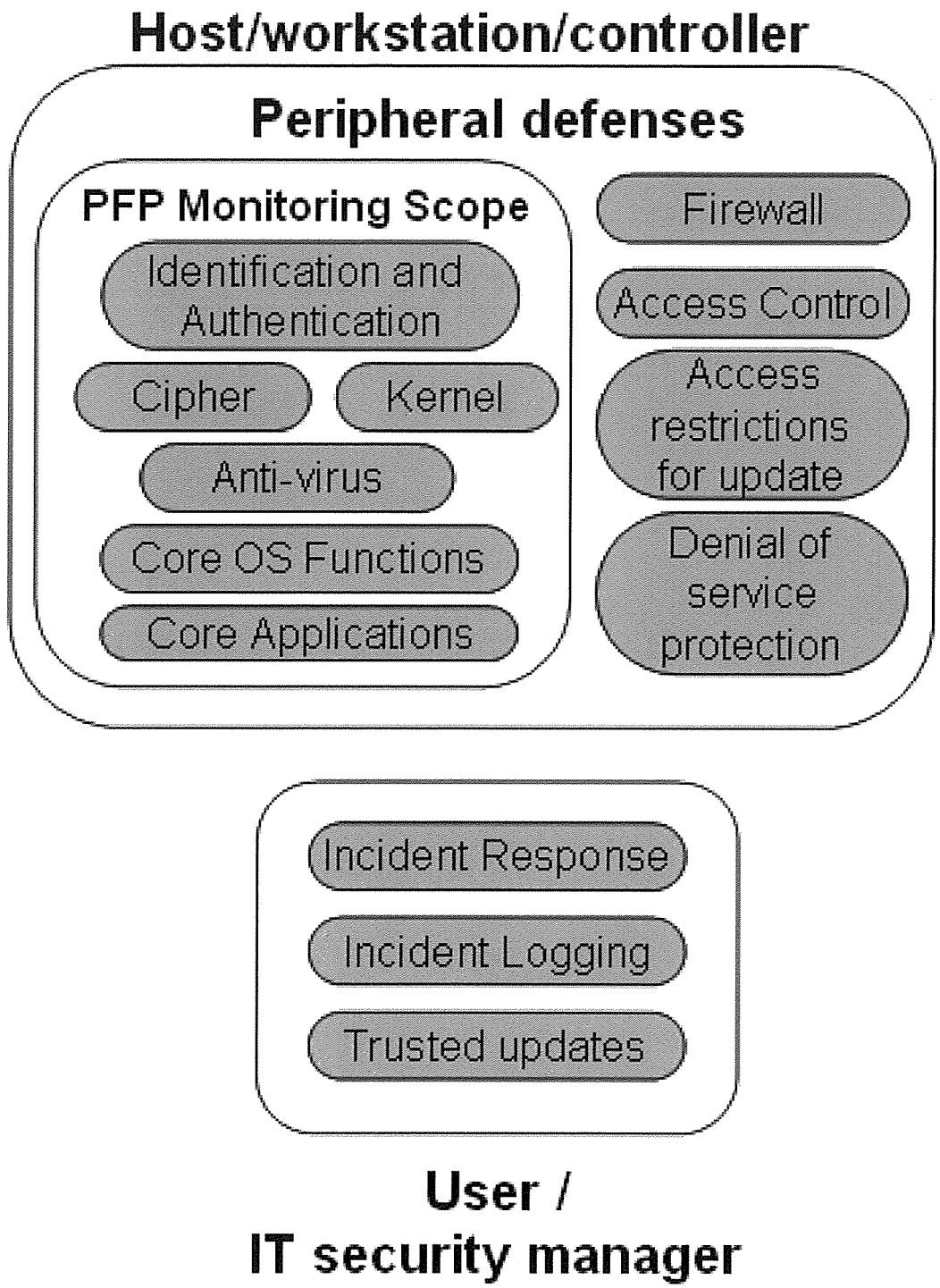
FIG. 28 is a schematic diagram showing PFP monitoring scope within a layered defense-in-depth security solution.

PFP can effectively monitor the integrity of different layers. At the core level 2780, PFP can assess the integrity of kernel and safety operations that all other mechanisms depend on. It can also be expanded to monitoring the integrity of core applications in the operating system 2770, as well as the integrity of critical user-level applications 2760. Notice that PFP can monitor the integrity of all the modules that reside within the processor scope, including antivirus modules and encryption modules, as shown in FIG. 28.

Integrating PFP into a defense-in-depth approach for cyber security allows faster handling of potential incidents before they can achieve their goals and cause damage.

The power signatures from the execution of other security modules, such as encryption and antivirus, are extracted and evaluated at runtime. From the PFP perspective, signatures from a kernel module and an antivirus program are extracted the same way and using the same techniques.

It is important to note that PFP can be extended to any other device to monitor its execution integrity. This includes devices that can be used to implement different security layers such as firewalls, digital security locks, etc.

The last stage of cyberdefense with PFP is to define the appropriate policies to handle different anomalies detected by the monitoring and assessment operations. Because the appropriate reaction to successful intrusions depends on several factors unique to each platform and application, we cannot generalize the response to different intrusions detected by the PFP monitor. Therefore, it is necessary to follow an architecture that accepts and enforces different security policy definitions which can be adjusted to different systems while maintaining and reusing the basic operational principles and structures.

Distributed PFP Monitor Network to Monitor Malware Dynamics and Behavior

This section describes the operation of a wide network of nodes with PFP capabilities that are deployed across different geographical or logical regions to monitor the spread of malware, detect targeted attacks, and discover the potential intentions of malicious adversaries. This approach is applicable to discovering furtive remote attacks on specific logical or geographical areas.

One of the main advantages of using PFP for this application is its stealth, which prevents adversaries from detecting the monitoring activities themselves, giving them a false sense of furtiveness (believing they have not been detected) and tricking them into carrying on with their activities, disclosing intentions and capabilities. This application of PFP is a powerful tool for intelligence gathering.

Operation.

Figure 29:
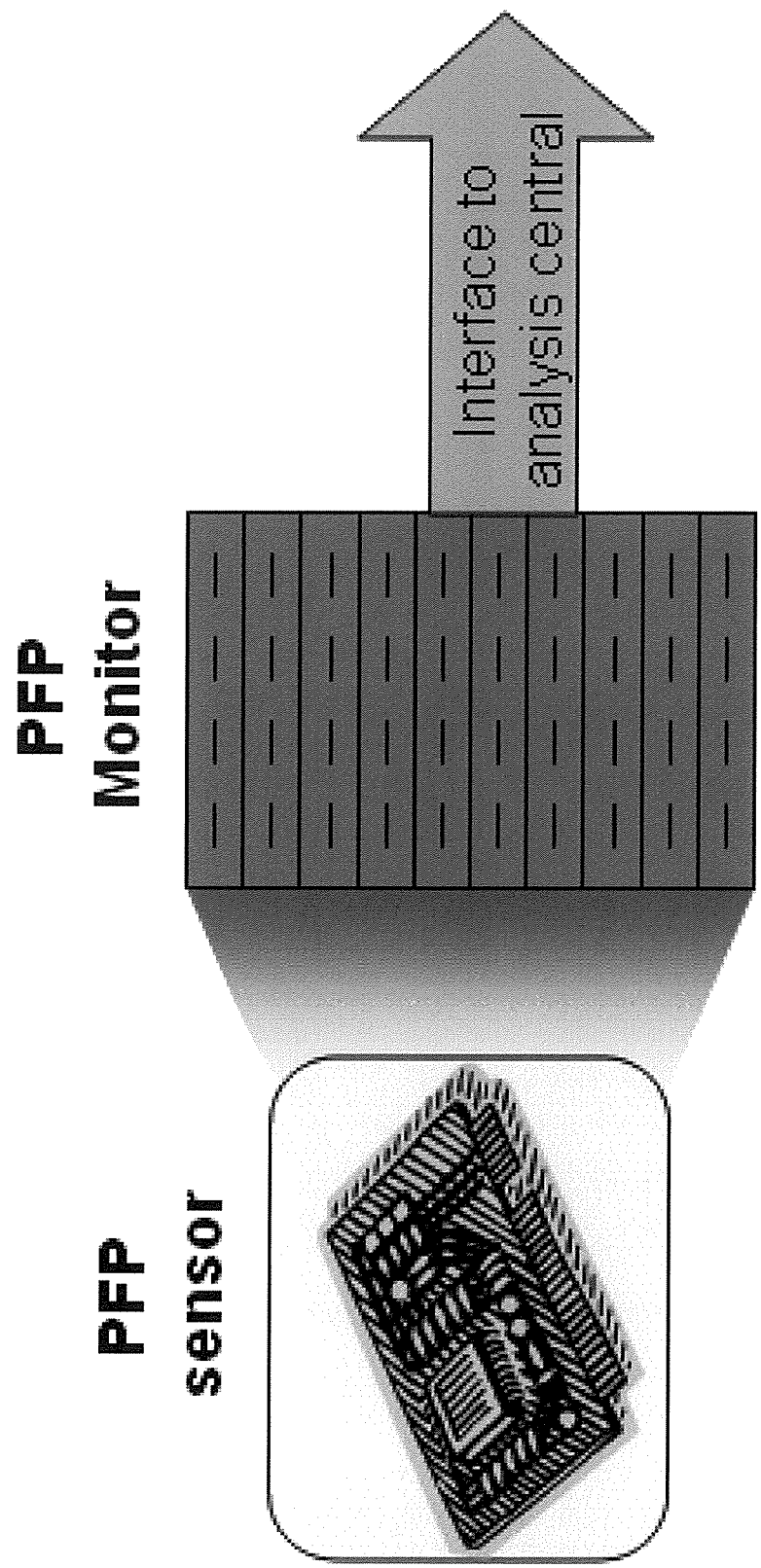
FIG. 29 is a schematic diagram showing PFP Honeypot node for monitoring and intelligence gathering.
Figure 30:
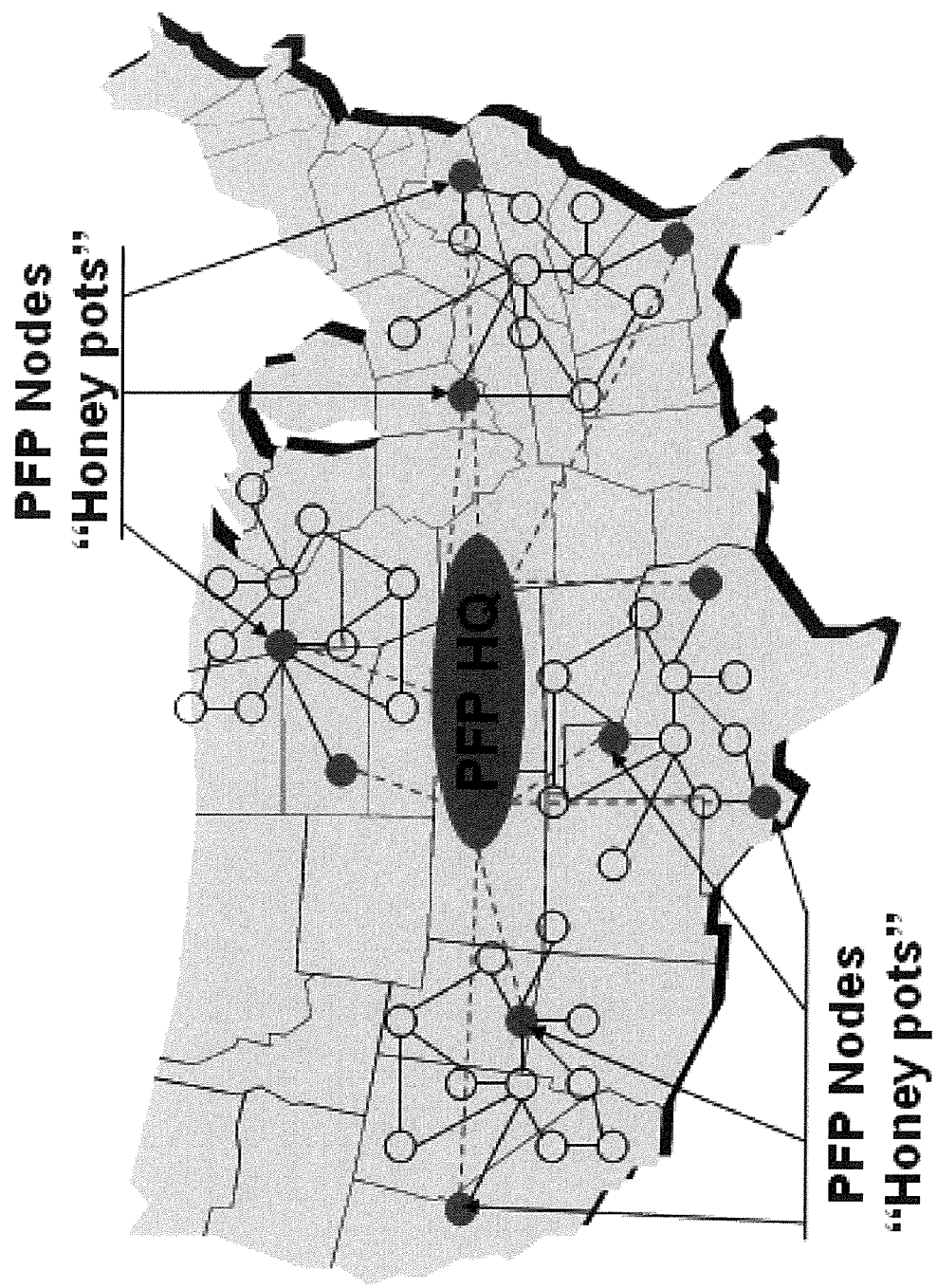
FIG. 30 is a schematic diagram showing a PFP Honeypot network.

Stealth monitoring is achieved thanks to the low footprint of PFP and negligible impact on memory and latency on the target system. The distributed network of PFP nodes is implemented using the following steps:

1. Enable representative nodes with PFP (Fit them with a PFP monitor and extract trusted signatures from their target components). The monitor can be rack mounted and resourceful, as the target nodes only act as a honey pot.
2. Deploy a network of the PFP enable nodes on the target geographical or logical areas of interest.
3. Monitor each node individually for integrity violations and intrusions as depicted in FIG. 29.
4. Periodically submit the integrity results to a centric location for logging and analysis.
5. In the event of an integrity violation, the report should include:
   (a) a copy of the power traces that experienced the violation
   (b) the ordered sequence of untampered module execution that executed prior to the violation
   (c) the ordered sequence of modules that execute after the violation This application of PFP is depicted in FIG. 30. The figure shows PFP honey pots in different geographical networks. It is important to note, however, that network separation can be logical, as in different sections of the same network, or socio/political, as in networks for different government agencies or corporate divisions.

The links between the honey pots and the centralized analysis location, represented on FIG. 30 as dotted lines, can be implemented as a separate network (e.g. dedicated wireless links) or made using available wide-area networks, such as the public switched telephone network (PSTN) or the Internet. In any case, strong non-repudiation mechanisms, in charge of providing proof (high assurance authentication) of the origin and integrity of the traces, must be placed to maintain trustworthiness in the system as a whole.

Application of PFP to Supply-Chain Trust Analysis

Outsourcing device manufacturing and production to foreign and untrusted foundries and manufacturers opens the door to potential security breaches and tampering. Even with trusted providers, there is the potential for foreign or disgruntled personnel to try to disrupt the operation and functionality of critical systems.

Figure 31:
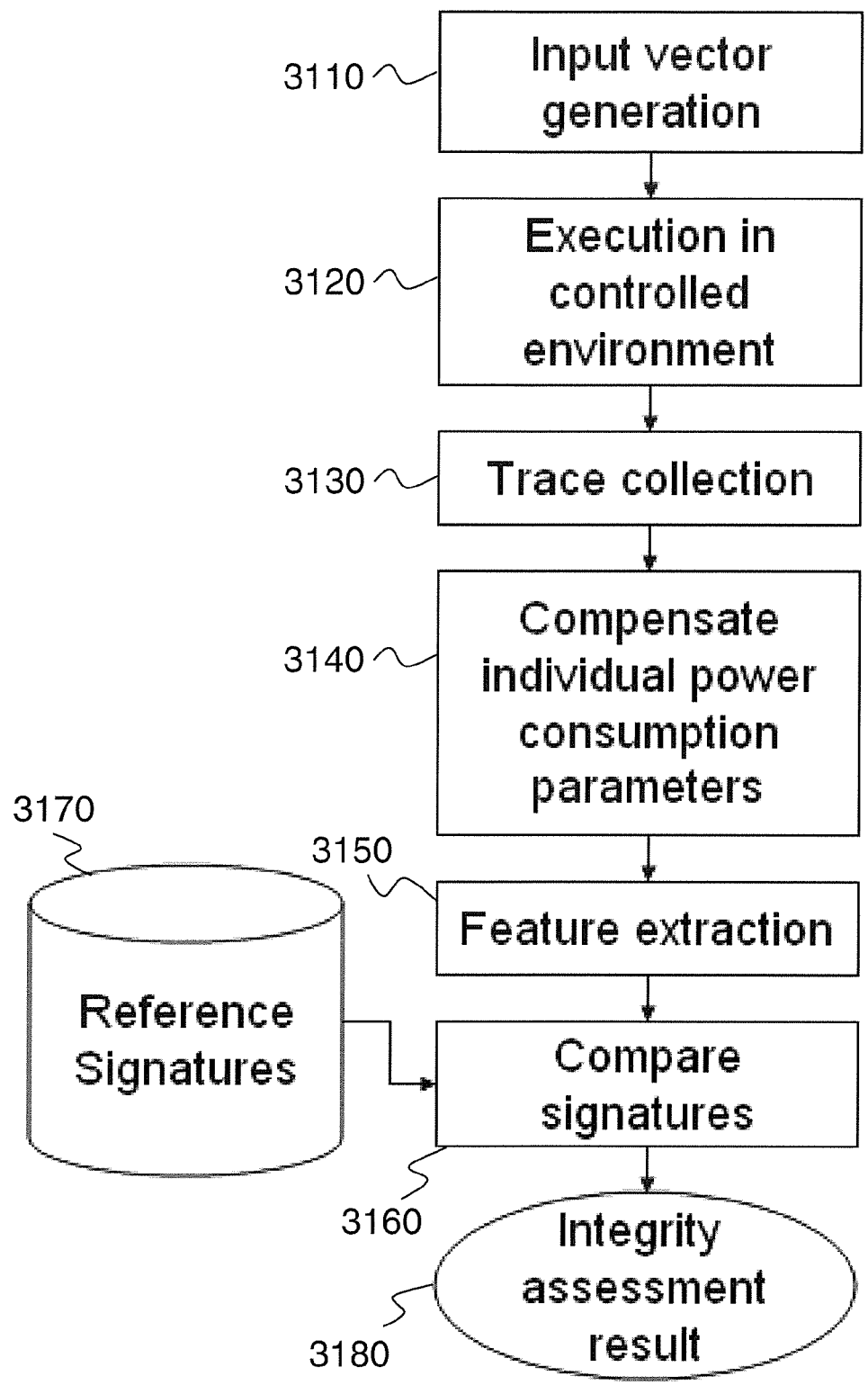
FIG. 31 is a flow diagram of a supply-chain trust analysis using PFP.

PFP provides a mechanism to detect unauthorized modifications and other tampering in software, firmware, and hardware introduced by untrusted links in the supply chain throughout the system's lifecycle. Integrity assessment of new shipments and untrusted devices using PFP requires the steps shown in FIG. 31. Input vector generator 3110 is used to provide the necessary inputs for the execution of the target device under a controlled environment 3120 during which power traces are collected 3130. The parameters of the individual characteristics of the power consumption are compensated 3140 before performing feature extraction 3150. The resulting features are compared 3160 against stored reference signatures 3170 and from this comparison the final assessment result is obtained.

Detecting the integrity of digital devices using PFP is not a destructive process and requires only minimal collaboration from the device being assessed. Furthermore, the fine-grained measurements of the power consumption provide significant visibility into the internal execution status of the device, making it extremely difficult for a modification to go unnoticed. For instance, PFP can detect tampering that activates only under certain conditions (also known as logic and time bombs) due to partial activation of the extra functionality or execution flow during condition checks. The ability of PFP to detect extra or missing functionality does not depend on the purpose or intentions of the insertions themselves.

Another advantage of PFP is that a specific execution path verified with PFP can be trusted even if malicious activity is not triggered. In other words, if PFP does not detect a significant deviation from the signatures, it means that no tampering or extra functionality has happened in that particular execution path.

A key element in performing supply-chain trust Analysis with PFP is executing the untrusted device under a controlled environment 3120. This controlled environment includes predefined inputs 3110 that force a specific state sequence and, for programmable devices, the specific software to be executed. For some systems it may be necessary to develop support scaffolding to control and isolate the execution of specific components. The specific input vectors depend on the functionality of the device or software module and they are expected to exercise the critical execution paths for the operation of the device. The same input vectors used to extract the signatures need to be used to assess the integrity of the untrusted devices.

Because of slight process variations during manufacturing, different devices will show different power consumption characteristics. These variations in power consumption need to be compensated 3140 before feature extraction 3150 to avoid erroneous assessments. This compensation is performed by means of an adaptive filter whose taps are dynamically modified to match the specific characteristic of the power consumption traces. This adaptive filter allows the PFP monitor to concentrate on the power consumption resulting from bit transitions in the device register during execution and eliminate differences in the traces due to manufacturing variations.

Figure 32:
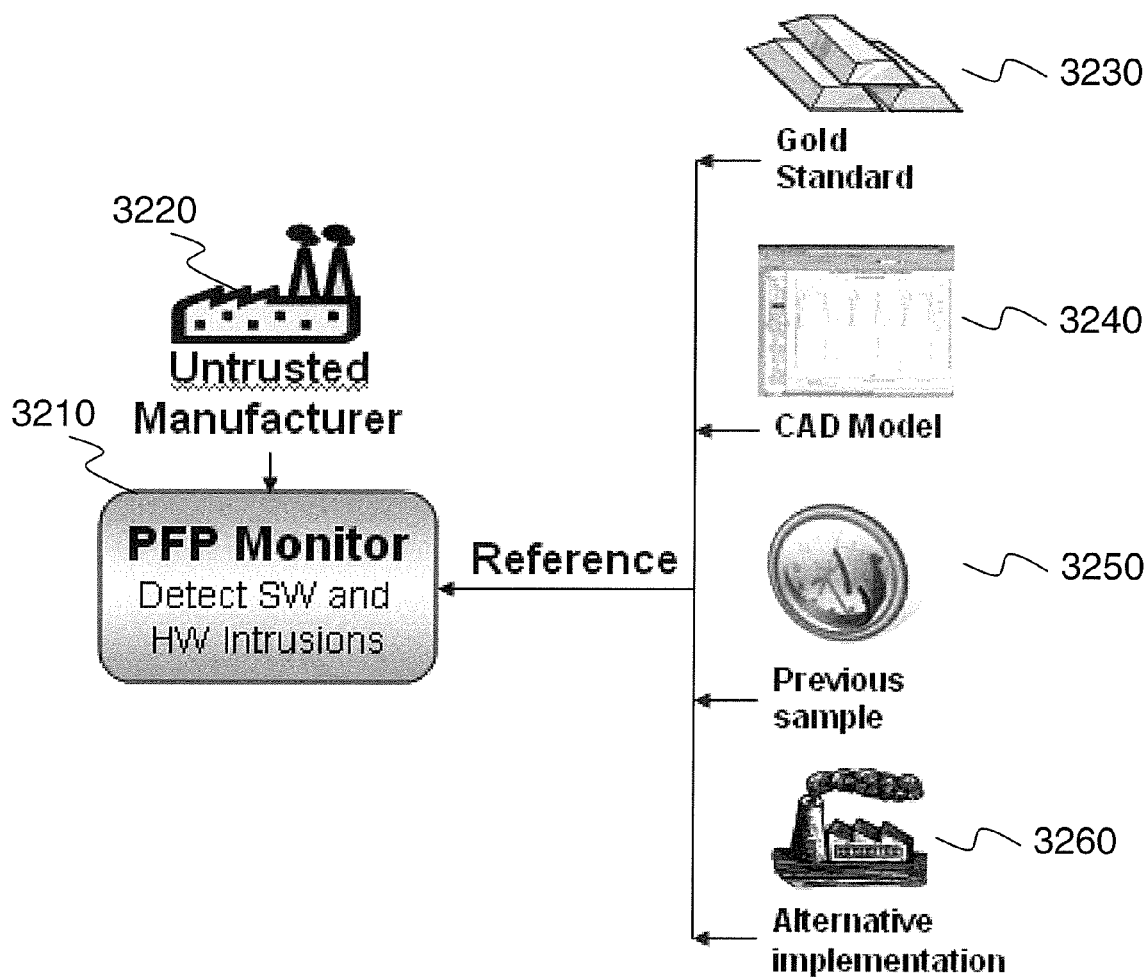
FIG. 32 is a schematic diagram showing potential sources of reference signatures for supply-chain trust analysis using PFP.

The most critical aspect for effective supply-chain trust analysis using PFP is the availability of reference signatures 3170. There are different potential sources for such signatures as depicted in FIG. 32. The best reference would be provided by an identical trusted implementation (a gold standard) 3230. In many occasions, however, such trusted implementation is not available. In these cases a reference signature can be extracted using alternative methods with varying degrees of error and trustworthiness. For instance, two relatively simple alternative reference sources include a previous implementation of the device (one that has been time tested) 3250 or an alternative implementation from a different supplier 3260. In these cases, the signatures are extracted from the execution of the alternative implementations, reducing the chances of two identical modifications by different providers. Signatures from the former approach can miss unidentified modifications present in the previous version. In the latter approach, an attacker could create an identical modification in both versions from the different suppliers to avoid detection.

Using a CAD model 3240 to obtain the signatures requires more effort, but it can be done in-house without relying on foreign foundries. In order to extract the signatures using a CAD model it is necessary to simulate the execution of the device using deterministic input vectors. The simulator needs to be accurate in teams of power consumption to the register transfer level.

Digital Rights Management and Execution Limited Leases

Another novel application for PFF is the enforcement of Digital Rights and the creation of execution instance-limited leasing to enable licensing based on the number of executions.

This approach is implemented by extracting signatures from the execution of protected software and monitor at run-time the power fingerprints to enforce the sole execution of authorized modules. For example, a software system can be licensed to include only a set of functional modules with a subset of the modules reserved for a higher license tier. The fingerprints from all modules are extracted before release. At execution time a PFP monitor matches the execution of different modules with the authorized licenses. When a module not licensed executes, as a result of a stolen password or a breach in protection, the PFP monitor could inform the issuing agency about the violation. Furthermore, it is possible to enable a trusted execution-instance-limited leasing approach for protected software. In this case, the PFP monitor keeps count of the number of times the licensed software has been executed and informs the issuing agency when the lease has expired.

A similar approach can be taken for licensed media content. Using a PFP monitor, it is possible to detect the reproduction of specific files on known media players using PFP. In this case, the protected media data takes the place of the predetermined input during PFP characterization. If the same media is reproduced on the specific player, the power signatures will match. Therefore, PFP can be used to detect the reproduction of unauthorized licensed media.

Failure Prediction Based on PFP

Hardware components undergo an inevitable aging process, which is accelerated by operation in harsh environments or when the systems operate under continuous environmental stress. This aging is reflected on the power consumption characteristics of the platform. PFP can be used to monitor not only the correct execution of software but also the integrity of the hardware platforms. A PFP monitor can continuously track the power consumption characteristics of the hardware and predict failure before it actually happens, dictating when a specific system or element must be replaced.

Figure 36:
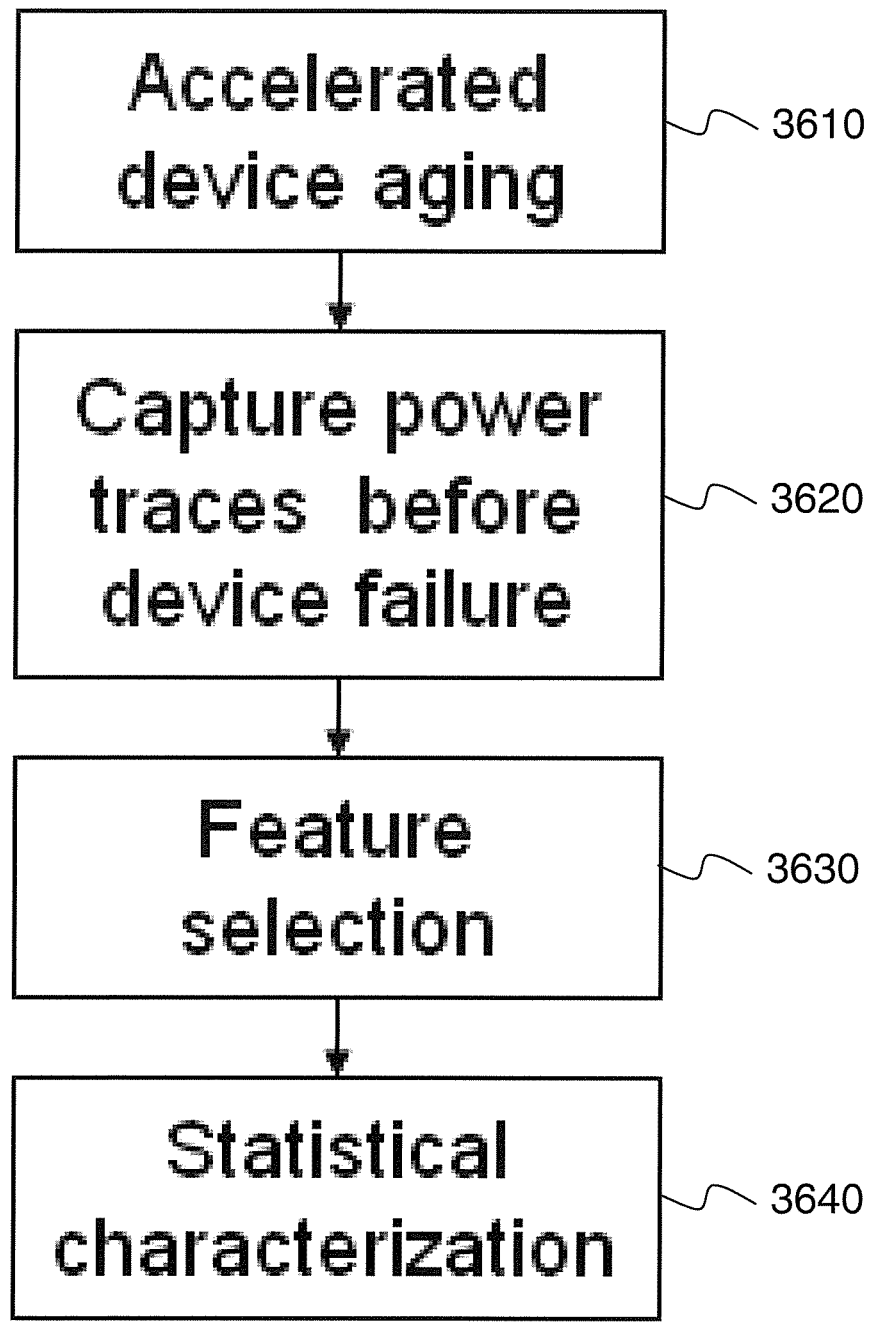
FIG. 36 is a flow chart of a process to extract features that preclude device failure for PFP.

Tracking the power consumption characteristics in PFP is implemented using an adaptive filter. It is necessary to compensate for differences in power consumption from when the signatures are extracted or due to environmental conditions. The same tracking mechanism can be used to monitor the status of the hardware and compare the power consumption characteristics to predetermined patterns captured in laboratory testing of the devices. The process to identify the failure features is depicted in FIG. 36. In this process, accelerated aging 3610 can be achieved by exposing the target device to abrupt temperature changes. The characterization process takes place in intervals, with one round of accelerated aging followed by trace capture 3620 during the execution of a test routine. The traces are collected for posterior analysis and the process is repeated until the device fails. Once the device fails the set of traces is examined to determine the specific features that are exhibited before failure 3630. The features are extracted from other similar devices to provide statistical diversity and isolate the generic features 3640.

Embedding Module Identification Information into Synchronization Signaling

The PFP requires proper synchronization with the software being executed in order to provide a correct assessment. There are two levels of synchronization in PFP: clock cycle level and routine level. The former can be easily achieved by tracking the distinct cycles in the power consumption that occur at the clock cycle rate or, for simple platforms, by probing the clock signal itself. The latter synchronization is more difficult to achieve and the process is facilitated by embedding in the routine itself a trigger, or identifier, that informs the PFP monitor the execution of a specific routine.

In this section we present a mechanism to embed an identification of the node being executed into the triggering and signaling mechanisms. This mechanism not only helps with informing the PFP monitor which specific routine is about to execute, but also provides robust synchronization signaling to for more accurate anomaly detection and behavioral signature extraction.

Figure 33:
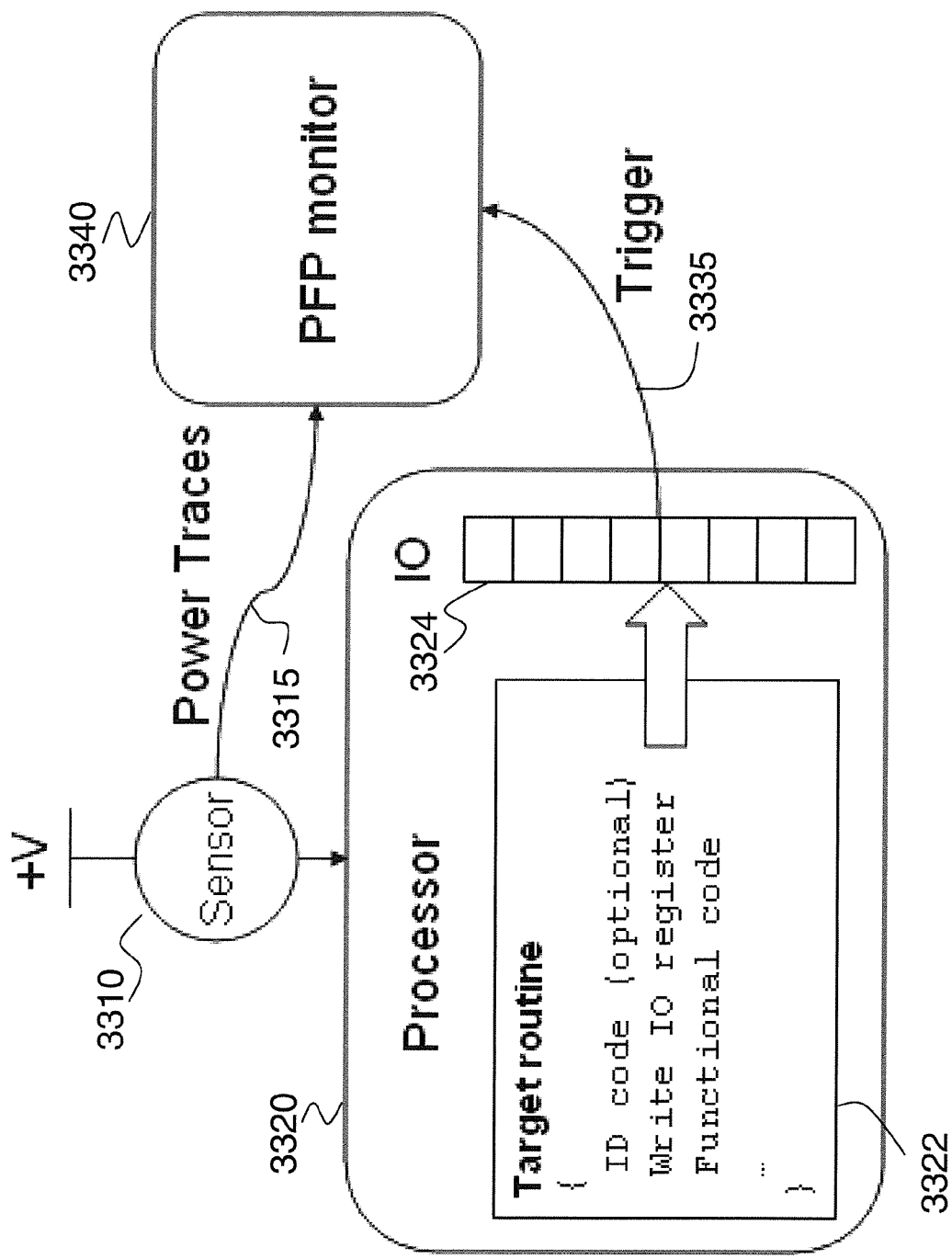
FIG. 33 is a diagram showing use of an IO register to provide synchronization and identification signaling to a PFP monitor.
Figure 34:
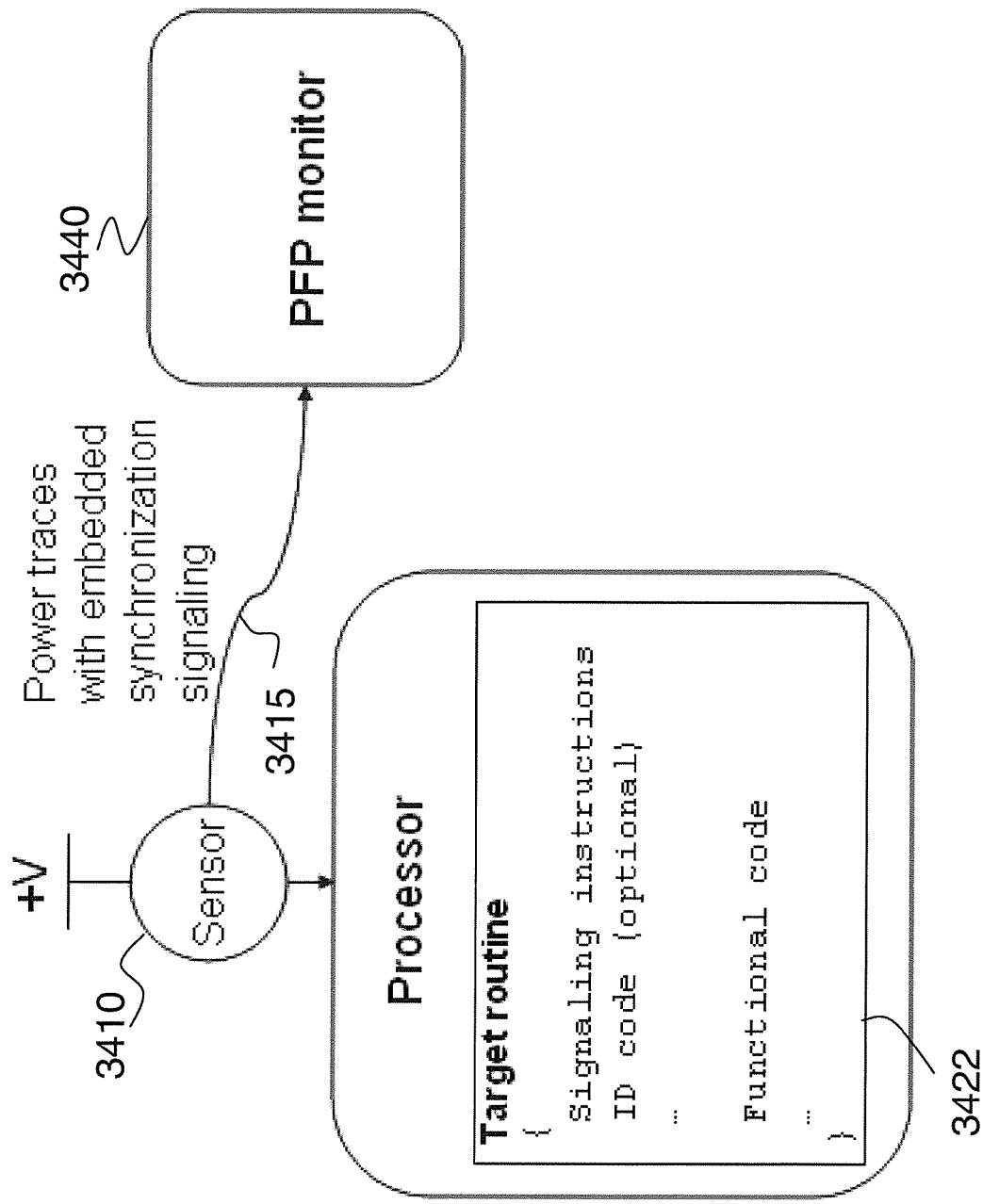
FIG. 34 is a diagram showing embedding of PFP synchronization and identification signaling into power traces.

The ultimate goal is to provide an identification code for the different modules being characterized that is inserted into the synchronization and triggering artifacts for PFP. There are two main approaches to provide synchronization and identification signaling for PFP: 1) creating an adjacent physical signal, as shown in FIG. 33, and 2) embedding a signal in the power consumption itself, as shown in FIG. 34. For the former, a binary identification code is written in a physical IO register 3324 before the execution of the routine 3322. The register is then transmitted 3335 to the PFP monitor 3340, which captures the power traces 3315 from the sensor 3310, in either a parallel or serial fashion. The length of the code and register depends on the number of routines that need to be monitored. In the simplest sense, a single-bit register, such as an LED, can be used to signal the execution of the target routine. In the case of a separate physical signaling the trigger is encoded as a binary number on the signaling register, as shown in FIG. 33.

The second approach requires the synchronization signaling to be embedded on power consumption itself by inserting a carefully crafted sequence of instructions 3422 that yield a distinctive power consumption pattern. This approach is depicted in FIG. 34. The instructions on the synchronization routines are chosen such that the bit transitions in their codewords, addresses, and parameters yield a specific number of bit transitions that ultimately drive the power consumption and signal the PFP monitor 3340 that a specific sequence is about to execute to capture the right set of traces 3415 coming from the sensor. More bit transitions result in higher current drain. When developing the sequence the length and characteristics of the pipeline need to be taken into consideration. Similar to the previous approach, the length of the sequence of instructions (code) depends on the number of critical routines that need to be identified. By creating different distinct power consumption patterns, the sequence itself is chosen to yield different signatures codes used to identify different modules.

It is important to notice that synchronization signaling is a required element for effective PFP, as it allows to concentrate the assessment efforts on the sections of the code that matter the most. Embedding an identification code in the signaling facilitates the assessment process but it is not a necessary requirement. This is because using a single trigger will allow the PFP monitor to capture the right set of traces and signal classification techniques can be used to determine which specific routine was executed or whether no reliable match can be established (an anomaly).

Improved PFP Monitoring by Combining Signals from Different Board Elements

Signals from different elements of the system can be used by a PFP monitor and be combined to provide improved performance and reliability. Sources of multiple signals include multiple processors, co-processors, peripherals, or other special-purpose elements introduced with the sole purpose of enhancing PFP (e.g. the IO registers used for triggering).

Figure 35:
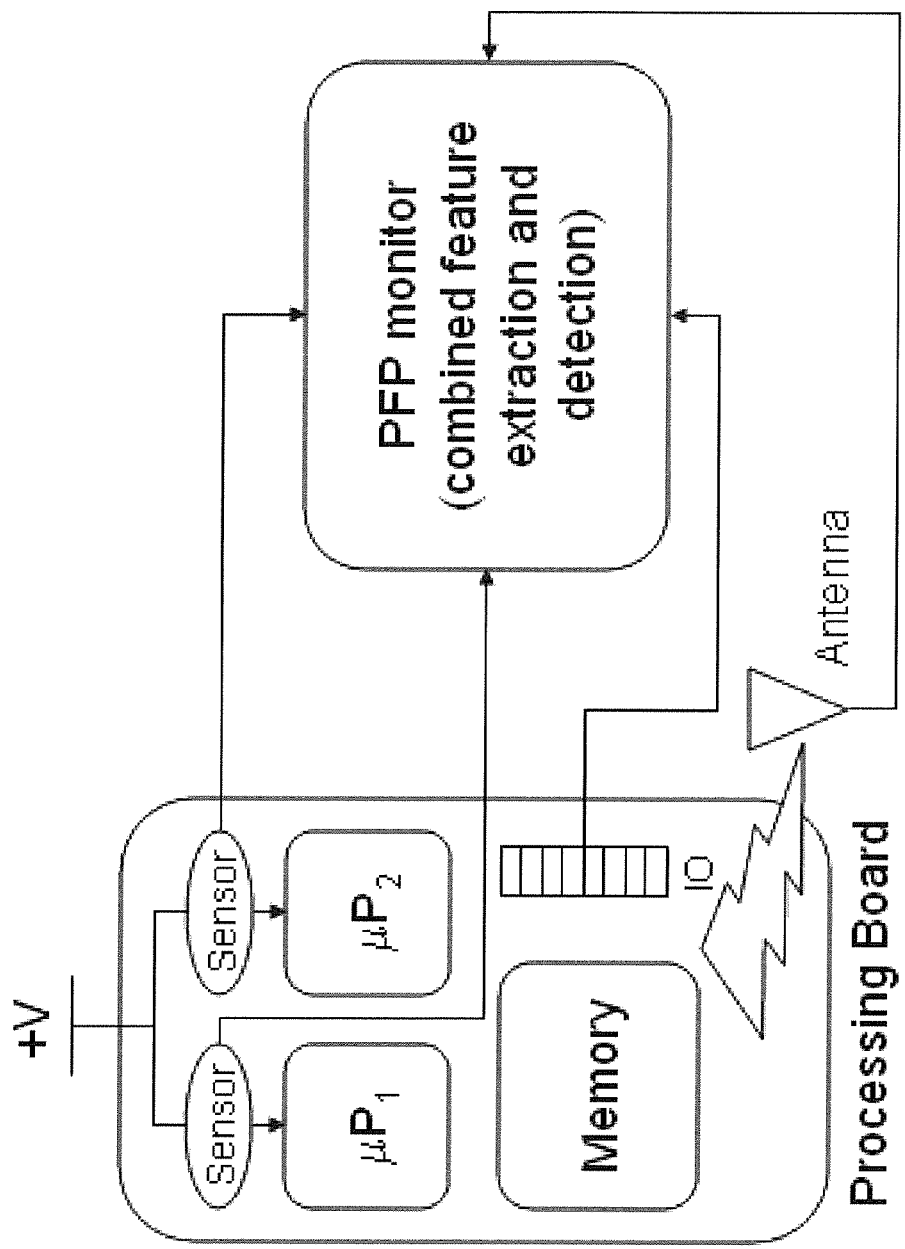
FIG. 35 is a diagram showing a sample setup for combining multiple signals for PFP integrity assessment.

There are different ways to combine signals from different sources in PFP. One of the main approaches includes capturing power traces from different processors or other digital circuits to perform integrity assessment on multiprocessor and multicore boards. Another approach is to monitor other elements of the systems (power consumption or other side and direct channels) to gather extra context information to be used during integrity assessment. The extra context information can be used to improve synchronization and facilitate behavioral characterization. The context information can be generated as a product of normal system operation or deliberately introduced at design time (e.g. the IO registers used for triggering). A sample setup of a PFP monitor that combines multiple signals is depicted in FIG. 35.

Additional signals can be captured from direct support IO registers, from the power consumption of different elements, or from other side-channels such as electromagnetic radiation. Combining signals from different sources requires a specially designed detector that can support the different features. The specific combination mechanisms depend on the system functionality and support platform. For example, in a multi-core processor, power traces from each core can be scanned in order to find the traces corresponding to a target routine. Another example, in a software-defined radio, the activation of the power amplifier (PA) can be detected by monitoring the power consumption and occurs when a radio transmission is taking place. The activation of the PA can be used as a trigger mechanism for the routines involved in preparing the data to be transmitted (notice that in this case, the routines execute before the trigger occurs).

Using Malware Signatures to Enhance PFP Performance

Even though the main application of PFP is anomaly detection, there are important benefits of using available information from known malware to improve assessment performance. When a new trend of malware is identified, it is possible to extract its PFP signature and add it to the library of known signatures. These malware signatures can be used to improve the performance of PFP integrity assessment by providing traditional signature-based detection of installed malware, similar to traditional antivirus software. The monitor would need to be made aware of the individual nature of each signature (white list and black list) in order to avoid incorrect assessments. Malware signatures can also be extracted from behavioral patterns in the execution. For instance, certain malware types, such as exhaustion attacks have very distinct execution patterns that can be easily identified using PFP.

The process of extracting signatures from malware is similar to the process to extract signatures from trusted software, in which the target modules are executed repeatedly in a controlled environment and different signal processing techniques are applied to the resulting power traces to select the features with the best discriminatory properties. It is important to note that malware characterization is facilitated once the malware has been identified, isolated, and executed in a controlled environment.

Automatic Characterization and Signature Extraction

In order to efficiently characterize a new software system, or a new version of an existing system, it is necessary to have tools to automatically characterize a trusted reference and extract the PFP signatures that uniquely identify that specific software's execution. In a sense, this process is similar to automated testing because it requires the execution of specific modules under controlled conditions. Different from automatic testing, however, PFP characterization is only concerned with "observing" several execution instances of different modules and does not try to evaluate any requirements or properties.

The purpose of this section is to describe an approach to facilitate the characterization of complex systems and software architectures and make it feasible to extract signature from realistic implementations of cyber systems of practical complexity. Without this automatic approach, it would take too long to characterize and extract the unique signatures from complex systems (i.e. commercial systems) to be used in power fingerprinting.

Figure 37:
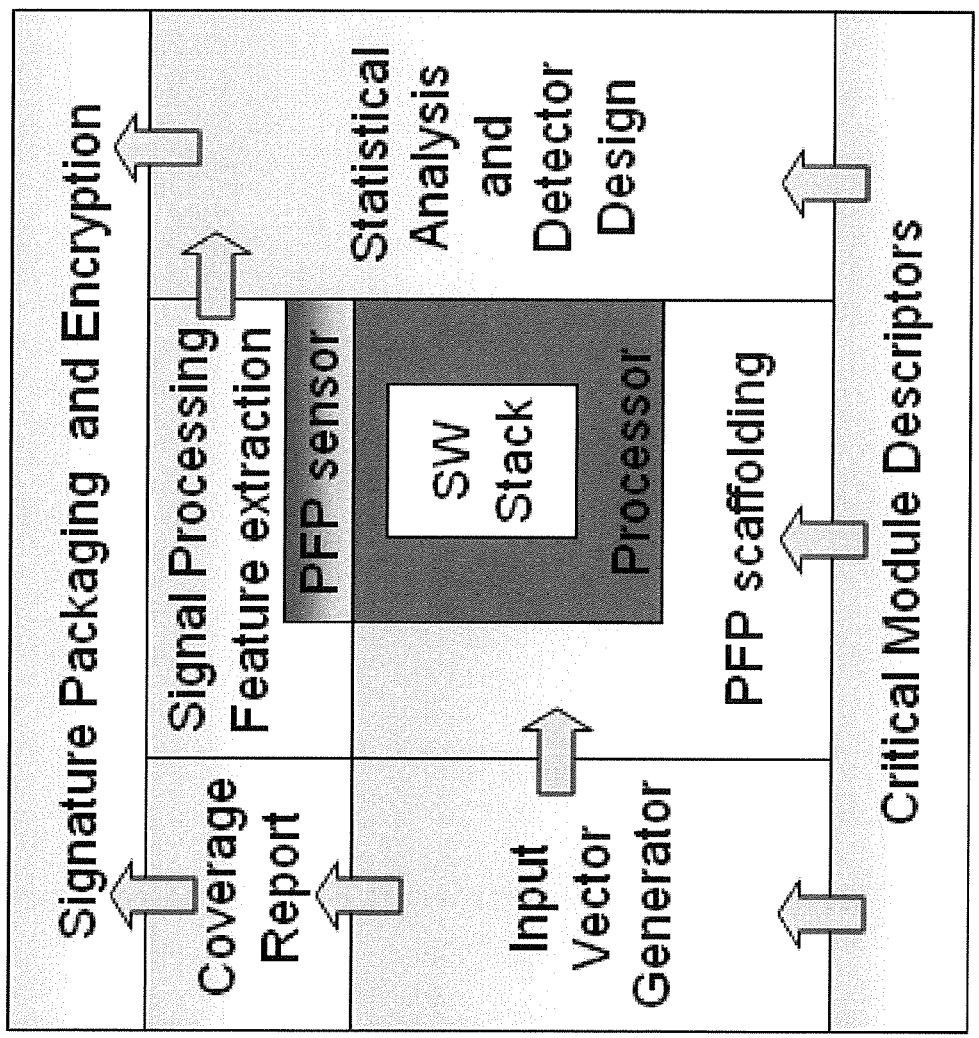
FIG. 37 is a schematic diagram showing relationships between the different system elements interacting for automatic characterization and feature extraction.

The main goal is to automate the process of characterization for the different modules by using scaffolding similar to what is normally used in software testing, as well as by using a variety of statistical analyses and signal processing to identify the best discriminatory features that form the fingerprints. The process starts when a new software stack needs to be characterized. The tools necessary for this process include: critical module descriptors, signal processing tools for feature extraction, detector design tools, scaffolding for module execution (similar to testing scaffolding), input vector generators, report generation, and signature packaging. In order to facilitate the understanding of the approach, we provide a high-level view of the process that describes the details and interrelationships between the different subsystems. The relationships are depicted in FIG. 37.

- Descriptors include required information about the critical modules, including unique identifiers, dependencies, input analysis (breakdown of different input classes), execution mode (dynamically linked, priority, kernel module, etc).
- Information from the descriptors is used to implement the scaffolds to control the isolated execution of the target modules. The scaffolds allow the system to enter deterministic values as inputs to control the execution of the modules.
- The information in the descriptors about the functionality and the different input types is used to determine a suitable set of input vectors.
- Coverage analysis is performed to identify the execution paths that have been exercised, yielding a metric of the level of protection for the system.
- Once the system is loaded, the operator (which can be an automatic system) executes the different modules with support from the scaffolds and providing the appropriate input vectors. While the modules are being executed, the PFP monitor captures measurements of the power consumption.
- The power traces captured by the monitor are then processed using different signal processing techniques for extracting discriminatory features. There is a predefined set of features to be extracted for each component in different domains and using different techniques.
- After several traces are captured and the respective features are analyzed, statistical analysis is performed to design optimal detectors to discriminate normal activity from anomalies based on the specific requirements for the application.
- Signatures and detectors are then packaged together to be deployed along with the monitors that will be assessing the integrity of the target systems.

The following sections include more detailed descriptions necessary to successfully implement the approach described above.

Descriptors

Descriptors contain meta-information about the specific modules to be characterized. They are used to develop scaffolding artifacts to isolate the execution of individual modules and to provide a controlled environment to exercise the different execution paths.

The descriptors are expected to be provided in a markup language that is easily read by humans and machines, such as the Extensible Markup Language (XML), but the contents, language, and structure will depend on the specific tools used for automating the characterization process and can be proprietary.

The minimum required information that needs to be contained in a module descriptor for PFP characterization includes:

Unique indentifiers to describe each module. The unique identifiers should be human readable and provide the necessary information to uniquely locate the module in question. Elements in the human readable part includes Company, Product, Class, Module, and Version.

Dependencies. The required software and hardware dependencies of the module.

State Dependencies. The elements of the internal state that affect the behavior of the module and that need to be controlled to provide consistent and deterministic execution.

Interface analysis. Provides a breakdown of the different input classes and the required input classes to exercise the different execution paths Execution mode. Describes in what mode the module will be executed when deployed, i.e. static, for statically linked modules; dynamic, for dynamically linked modules; Kernel or protected mode, for the operation mode that the processor will adopt when executing the module; and priority level.

Input Vector Generators

The function of the input vector generators is similar to their counterparts in software testing, to provide the appropriate inputs to force the component to into a specific state sequence that includes the different execution paths. Different from testing, however, the goal for PFP input vectors is not to find implementation errors, but simply to exercise the different execution paths.

Depending on the nature of the target system, it will sometimes be necessary to store the input vectors and distribute them along with signatures for utilization during assessment (i.e. integrity auditing). The decision whether to keep the input vectors depends on the nature of the features selected and whether traces due to random inputs can be removed.

The input vectors can be generated using different techniques, including search-based (random search, hill-climbing, genetic algorithm, etc.), partial scan, linear programming, and random and pseudo-random approaches The actual identification of effective test vectors, however, remains a largely heuristic approach that depends on the specific functionality of the target module and its input domain, as well as the information available about the module's structure. There will be some cases when specific knowledge of the execution structure of the module (what execution paths exist and the state sequences necessary to execute them) is necessary to find meaningful input vectors within a reasonable time. Furthermore, sometimes the direct input of an expert human analysis may be required to provide guidance to the automatic tools in order to identify and generate meaningful, effective test vectors.

One key element of test vector generation for PFP is that the objective is to execute the different paths that are expected to occur once the device is deployed, not to find errors. This is a relatively risky approach, because a valid execution state can be reached that has not been characterized and, hence, is flagged as an anomaly. The advantage is that it reduces the search space to only a few states. For most critical systems, the execution space is relatively small and the expected execution states are a subset.

Coverage Report

Using the information from the input vector generator is possible to generate a coverage report based on the execution paths traversed by the specific input vectors. Using structural information from the target modules, it is possible to calculate a PFP coverage metric as a percentage of the existing paths in the module and the ones traversed using the generated input vectors. This report is only an indication of the expected coverage for PFP. The report still needs to be completed by identifying the number of execution paths that actually yielded acceptable PFP signatures.

The report is provided at the end to provide the users the information about the specific modules that can be monitored using PFP.

Scaffolding

With the descriptors and the software stack, the process of scaffolding to isolate the execution of the critical modules and their different pieces is performed. This is similar to the process of scaffolding for automated testing. The purpose of scaffolding is to execute the target modules in a controlled environment similar to the one that will be found once the whole system is deployed in order to collect the power traces during its execution. Because the modules are expected to have different execution paths that depend on the inputs, the scaffolds need to facilitate the use of different inputs.

For the case where physical inputs are needed, the scaffolds need to provide the appropriate physical interfaces to provide the necessary inputs.

This is a partially manual process and depends on the characteristics of the target modules. Fortunately, most of the elements necessary for the scaffolds overlap in functionality with the traditional scaffolds for automatic testing (e.g. unit, integration, and system testing), adding only a little bit of extra work.

It is important to note that for non-software implementations, the scaffolding will have similar requirements, although the final implementation will be different. In these cases, the modules will be limited by the sections that can be independently exercised. For highly integrated systems, this may represent a challenge.

Signal Processing and Feature Extraction

With the power traces corresponding to the execution of the different modules and their individual execution paths captured using the power/instantaneous current sensor, the discriminatory features that uniquely identify the execution of the target module need to be extracted. The exact set of techniques and signal analysis necessary to identify practical signatures depends on the specific characteristics of the target modules.

We just describe a framework for the parallel execution of a number of different feature extraction and signal processing techniques to reduce the overall time required to characterize a target module.

There is no known effective procedure to determine the optimal discriminatory features for a given problem. There are, however, several techniques that can be evaluated and from which the best discriminatory features are selected. The set of discriminatory features that are extracted is determined using a combination of heuristic approaches and experience. Included among these features are: Time-domain correlation, Euclidean distance, cyclostationary analysis, frequency analysis, etc. The process to select the best discriminatory features include calculating all the different features in the set in parallel and ranking them based on intra-class variance. The Mahalanobis distance is a sample metric for such an evaluation of features.

The process of feature selection and detector design, explained below, are tightly related, as the statistical propertied of the feature extraction results determine the necessary analysis to determine an optimal detection threshold.

Statistical Analysis and Detector Design

Statistical analysis is performed on the different features obtained from the power traces captured during independent execution instances of the target module. The goal of the statistical analysis is to select the features with the best discriminatory qualities and to determine the threshold levels, or areas within which an observed set of features will be considered as generated by the target module (a detector).

In PFP, being an anomaly detection approach, the probability of false alarm (PFA) is an important operational metric that determines the performance of the system. PFA is defined as the probability that a normal execution instance of the target module falls outside the acceptance area and is classified as an anomaly. A PFP detector needs to be designed to minimize the PFA while maximizing the probability of correctly identifying the target module. This is a classic hypothesis testing problem and the Neyman-Pearson criterion can be applied to detect a threshold. There are, however, several other approaches that can be applied.

Given sufficient samples, an arbitrary PFA can achieved in PFP. In practical systems, however, this is not feasible and a finite, practical PFA level must be determined. The PFA that can be tolerated depends on the specific module and the nature of the application where it is expected to operate.

Ideally, signatures from different instances from the same execution need to fall within the distance for minimum sensitivity calculated during platform characterization. In the event that this desired feature cannot be achieved, there are several ways to make PFP deliver accurate assessments. One simple approach is to average several traces to get rid of some noise Signature Packaging and Encryption Once the target modules have been characterized, the resulting signatures, feature extraction techniques, and thresholds are packaged for deployment along with the devices. The packaging and delivering mechanism depends on the characteristics of the device and the application. The complete signatures extracted using the selected features need to be stored and passed to the monitors. For example, in case of simple time-domain correlation, the complete vector needs to be stored.

In order to protect the signatures at rest or during transportation, it is necessary to encrypt them to avoid giving potential attackers an exact reference of the signatures the monitor is looking for. This encryption can be performed using a variety of mechanisms for private or public key encryption. It is important to note, however, that even if a potential attacker acquires the signatures, it would be still very difficult to match the signatures perfectly while carrying on malicious behavior.

Secure Signature Update

When a deployed system being monitored using PFP is updated, it is also necessary to update the PFP signatures in a reliable and secure way in order to maintain effective integrity assessment. This is a critical step, as the trustworthiness of the assessment depends on appropriate signature management. For this update process to be secure it is necessary to verify the signature's integrity and authenticity. In this section we describe the necessary mechanism to provide secure PFP signature update.

For widely deployed PFP monitors, signatures should be distributed along with other software updates. For centralized PFP monitors, updates can be delivered separate from the software updates. The main challenge in PFP signature updating is authentication (i.e. making sure the sender is an authorized entity and that the signature itself is correct and has not been tampered with or altered in any way). The challenge is not as difficult in the case of centralized PFP monitors, where signatures can be distributed using physical media or trusted networks and where preparations can be made in anticipation of the transfer of sensitive signatures.

In the case of widely distributed PFP monitors, where signature exchange cannot be made using physical means or alternative trusted networks, signature update needs to be performed along with the actual software update. In this case, there are several vulnerable points that could be exploited by an attacker with enough knowledge of the PFP system. For example, if not properly authenticated, the update process can be disrupted by a man-in-the-middle attack.

Secure Signature Update Process and Operation.

Known approaches for secure content distribution commonly used in over-the-air programming and distribution of software updates can be adapted to PFP signature updates. Secure signature update can be seen from two different perspectives: the authentic signature originator and the PFP monitor. From the signature generation side, it is necessary to provide effective authentication information along with the signature and encrypt the signature pieces with a rotating key scheme.

Other techniques that can be applied to enable secure signature update include:
  Scramble both the sample buffer and the signature elements
  Public or symmetric-key encryption
  Change the encryption key to be used for descrambling the signature and traces according to a known sequence (PN Sequence) that updates its index after each signature update.

Protection Against Side-Channel Attacks

PFP uses the same principles for integrity assessment that are exploited for malicious side-channel attacks. Hence, in order to prevent potential adversaries from exploiting PFP infrastructure to perform side channel attacks, it is necessary to protect the traces provided by the sensor by restricting access to them. This is especially important when the power traces are transmitted using a wireless connection. This section describes a mechanism to protect the unauthorized access to power traces, which can be misused in side-channel attacks.

Operation.

Protection for trace access is accomplished by encrypting or scrambling the traces using a shared key between the PFP sensor and the PFP monitor. From this perspective, there are two basic modes of operation for PFP: embedded monitor (sensor and digitizer) and external monitor.

Figure 38:
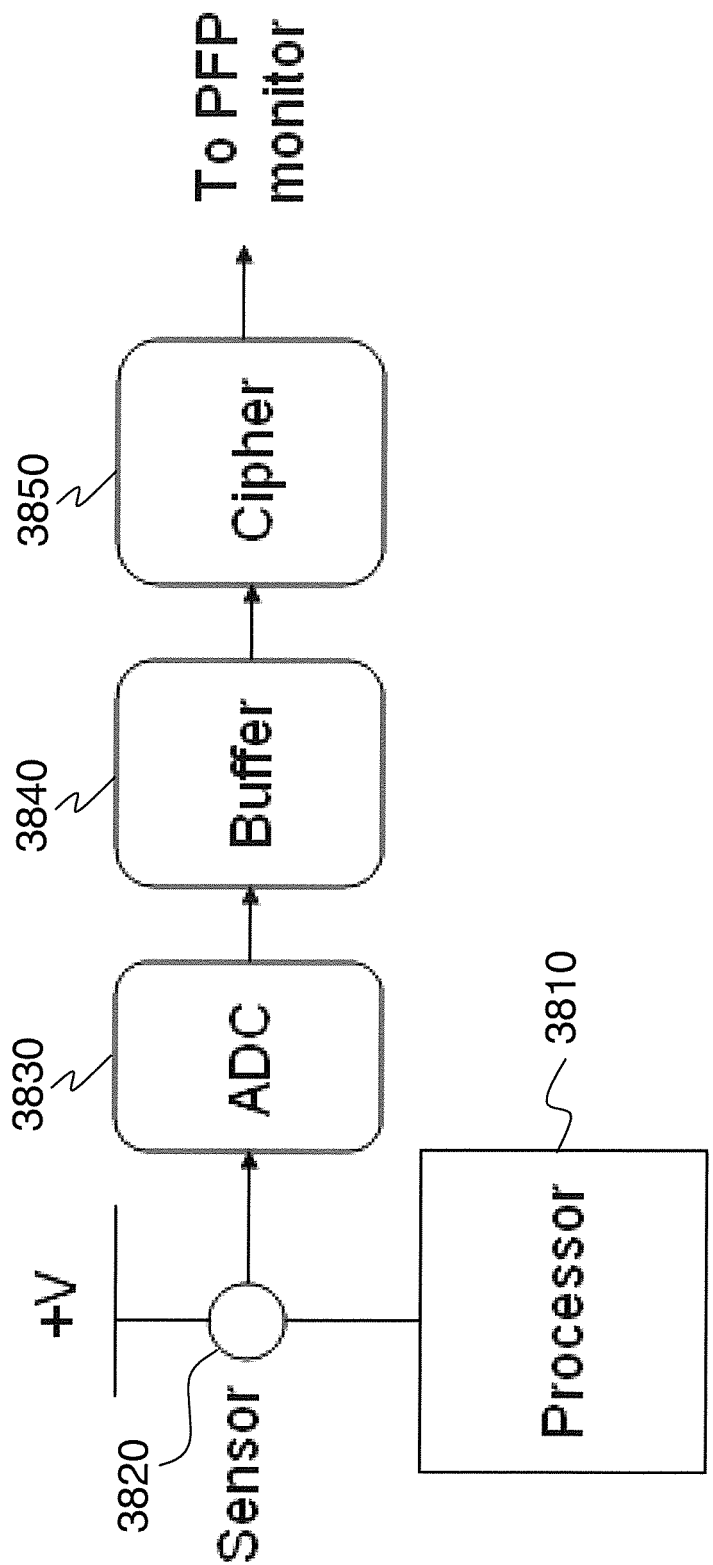
FIG. 38 is a diagram of a structure for preventing side-channel attacks from exploiting an embedded PFP monitor.

In embedded operations, traces are encrypted or scrambled with a strong private key (symmetrical key encryption). Performing this encryption step is especially important when the power traces are transmitted wirelessly for external processing. The encryption process is described in FIG. 38. The analog output of the processor 3810 is monitored by sensor 3820 and converted by an analog-to-digital converter 3830 and fed into the cipher 3850. The cipher 3850 can hide the appropriate information from side-channel attackers in several ways, including block encryption of the bit samples or scrambling them (effectively a transposition cipher where the key is a permutation).

Figure 39:
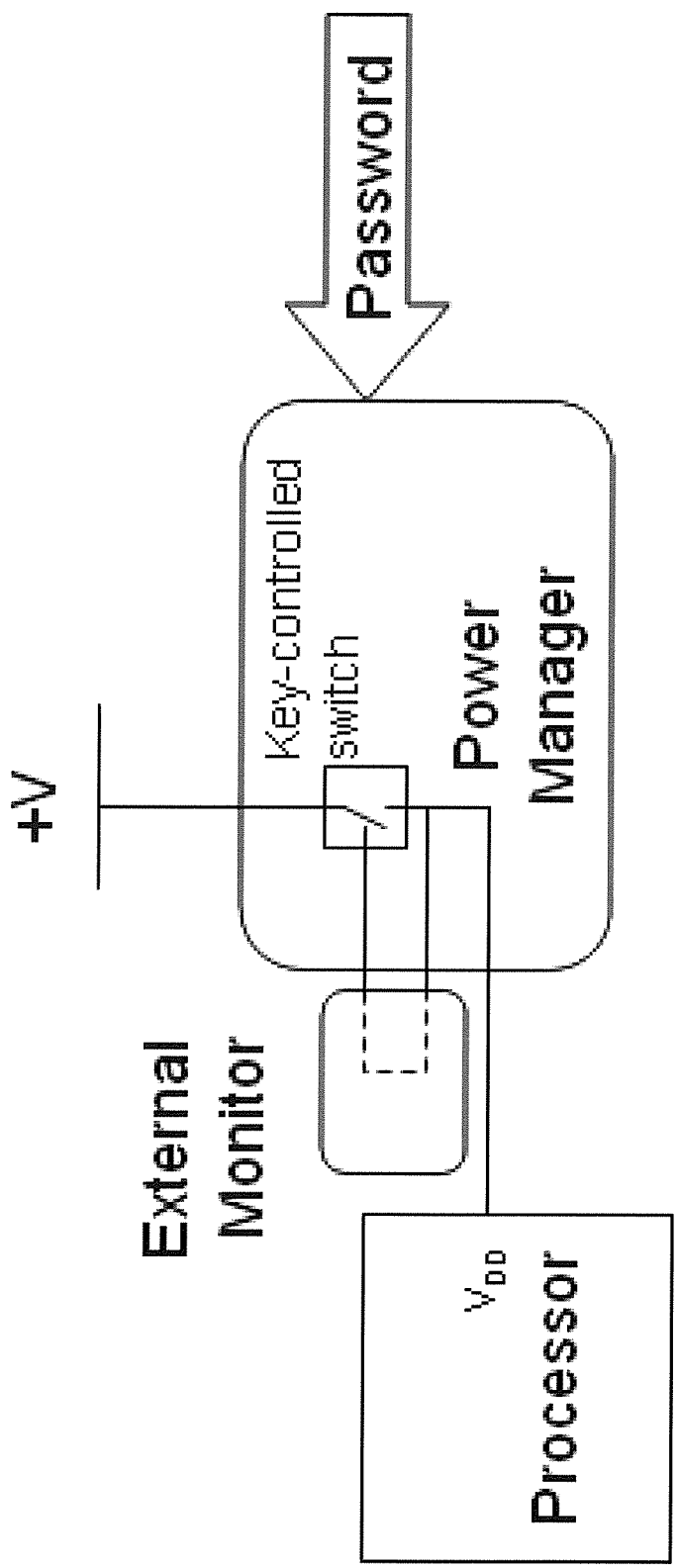
FIG. 39 is a diagram of a structure for preventing side-channel attacks from exploiting an external PFP monitor.

For external monitors, the physical connection that gives access to the traces is enabled by a digital switch that requires a password. In this case, the contact points for the external monitor are provided by the power management chip on the platform. The power management chip can be as simple as a voltage regulator, but for most commercial processors used in modern smart-phones, the power management chips are much more complex. When the appropriate monitor is connected, the PFP-enabled power manager reads the password from the external monitor once connected and then reroutes the power supply current to go through the external sensor which allows the external monitor to capture the instantaneous current drain or power consumption. FIG. 39 shows a graphical representation of this process.

It is important to note that the solutions here described are not intended to prevent attackers from carrying on side channel attacks against our target systems. Instead they are intended for preventing the exploitation of PFP monitoring facilities for side-channel attacks. With these measures in place, a potential attacker would have to make the same hardware modifications to a board with PFP monitoring as to one without it.

While the invention has been described in terms of preferred embodiments, those skilled in the art will recognize that the invention can be practiced with modification within the spirit and scope of the appended claims.

The invention claimed is:

1. A method, comprising:
receiving a signal representing power consumption of a first electronic device measured with one or more sensors during operation associated with authorized code;
identifying a portion of the signal corresponding to a user-inserted marker associated with the authorized code, the portion of the signal being associated with a signature portion from a signature representing power consumption of a second electronic device during operation associated with the authorized code and associated with the user-inserted marker; and
synchronizing the portion of the signal with the signature portion based on the user-inserted marker.

2. The method of claim 1, further comprising:
comparing, after the synchronizing, the portion of the signal and the signature portion to extract a feature.

3. The method of claim 1, wherein the portion of the signal is a first portion of the signal, the signature portion is a first signature portion, the method further comprising:
identifying a second portion of the signal corresponding to a physical signal produced by the first electronic device during operation associated with the authorized code, the identifying is based on detection of the physical signal,
the synchronizing including synchronizing the second portion of the signal with a second signature portion from the signature based on the physical signal.

4. The method of claim 1, wherein the portion of the signal is a first portion of the signal, the signature portion is a first signature portion, the method further comprising:
identifying a second portion of the signal corresponding to a physical signal produced by the first electronic device during operation associated with the authorized code, the physical signal corresponds to a change in an electrical level of a pin of a processor of the first electronic device, the identifying is based on detection of the physical signal,
the synchronizing including synchronizing the second portion of the signal with a second signature portion from the signature based on the physical signal.

5. The method of claim 1, wherein:
the user-inserted marker is an instruction within the authorized code that causes an identified power consumption sequence by the first electronic device when the instruction is executed by the first electronic device,
the identifying is based on the identified power consumption sequence.

6. The method of claim 1, wherein:
the user-inserted marker is an instruction within the authorized code that causes a change in an average current drain for a period of time by the first electronic device, during operation of the first electronic device, to define an identified power consumption sequence,
the identifying is based on the identified power consumption sequence.

7. The method of claim 1, wherein the signal is a first signal, the method further comprising:
comparing the portion of the first signal to an associated signal section from a second plurality of signal sections to determine whether the first electronic device executed authorized code during operation, the second plurality of signal sections defined based on a second signal representing power consumption of the second electronic device during operation of the authorized code.

8. The method of claim 1, wherein the signal is a first signal, the method further comprising:
comparing the portion of the first signal to an associated signal section from a second plurality of signal sections to determine whether first electronic device executed authorized code during operation, the second plurality of signal sections defined based on a second signal representing power consumption of the second electronic device during operation of the authorized code; and
sending a signal indicative of an intrusion when the first electronic device did not execute authorized code during operation.

9. The method of claim 1, wherein:
the first electronic device, during operation, uses an operating system with indirect access to physical signals associated with the signal,
synchronizing the portion of the signal with the signature portion based on the user-inserted marker includes waiting for execution of processes associated with the operating system and the indirect access.

10. A method, comprising:
receiving a signal representing a user-defined marker;
revising an authorized code based on the user-defined marker to produce a revised code;
causing a processor to execute the revised code for each execution path within the revised code from a plurality of execution paths within the revised code;
receiving, for each execution path from the plurality of execution paths, a signal representing power consumption of the processor measured with one or more sensors during execution of the revised code to define a plurality of signals representing power consumption;
processing each signal from the plurality of signals representing power consumption to define a composite signal having a random characteristic reduced; and
extract a feature from the composite signal to define a signature for the revised code.

11. The method of claim 10, wherein causing the processor to execute the revised code includes:
receiving pre-defined input associated with the revised code; and
defining the plurality of execution paths within the revised code based on the pre-defined input.

12. The method of claim 10, wherein:
the processing includes averaging the plurality of signals, the random characteristic includes random noise of the processor.

13. The method of claim 10, wherein the plurality of signals representing power consumption are associated with a first time period, the method further comprising:
receiving a signal representing power consumption of processor during operation and during a second time period after the first time period; and
comparing a portion of the signal for the second time period to an associated section from signature to determine whether the processor executed authorized code during operation.

14. The method of claim 10, the plurality of signals representing power consumption are associated with a first time period, the method further comprising:
receiving a signal representing power consumption of processor during operation and during a second time period after the first time period;
comparing a portion of the signal for the second time period to an associated section from signature to determine whether the processor executed authorized code during operation; and
sending a signal indicative of an intrusion when the first electronic device did not execute authorized code during operation.

15. The method of claim 10, wherein:
the user-defined marker is associated with an instruction within the authorized code that causes an identified power consumption sequence by the processor when the instruction is executed by the processor.

16. A method, comprising:
receiving a signal representing power consumption of a first electronic device measured with one or more sensors during operation, the signal associated with a plurality of signature signals representing power consumption of a second electronic device during operation of authorized code, each signature signal from the plurality of signature signals being uniquely associated with an aspect of the authorized code from a plurality of aspects of the authorized code; and
comparing the signal to the plurality of signatures to extract a feature.

17. The method of claim 16, wherein each aspect from the plurality of aspects of the authorized code is associated with a domain from a plurality of domains for plurality of the signature signals, the plurality of domains include a time domain of a signature signal from the plurality of signature signals and a frequency domain of a signature signal from the plurality of signature signals.

18. The method of claim 16, wherein:
the signal is included within a plurality of signals, each signal from the plurality of signals representing power consumption of the first electronic device during operation and uniquely associated with a time period from a plurality of time periods
each aspect from the plurality of aspects of the authorized code is associated with a domain from a plurality of domains for plurality of the signature signals, the plurality of domains include a frequency domain of a signature signal from the plurality of signature signals, and
the frequency domain of the signature being defined by averaging a power spectral density (PSD) of each signal from at least two signals from the plurality of signals.

19. The method of claim 16, wherein:
the signal is included within a plurality of signals, each signal from the plurality of signals representing power consumption of the first electronic device during operation and uniquely associated with a time period from a plurality of time periods
each aspect from the plurality of aspects of the authorized code is associated with a domain from a plurality of domains for plurality of the signature signals, the plurality of domains include a frequency domain of a signature signal from the plurality of signature signals, and
the frequency domain of the signature being defined by an error metric based on a signature signal from the plurality of signature signals and a power spectral density (PSD) of each signal from at least two signals from the plurality of signals.

20. The method of claim 16, wherein:
the signal is included within a plurality of signals, each signal from the plurality of signals representing power consumption of the first electronic device during operation and uniquely associated with a time period from a plurality of time periods,
each aspect from the plurality of aspects of the authorized code is associated with at least two signals from the plurality of signals.

* * * * *